(12) United States Patent
Robinson et al.

(10) Patent No.: US 11,067,736 B2
(45) Date of Patent: Jul. 20, 2021

(54) DIRECTIONAL PRIVACY DISPLAY

(71) Applicant: RealD Spark, LLC, Beverly Hills, CA (US)

(72) Inventors: Michael G Robinson, Boulder, CO (US); Graham J. Woodgate, Henley-on-Thames (GB); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 14/751,878

(22) Filed: Jun. 26, 2015

(65) Prior Publication Data

US 2015/0378085 A1    Dec. 31, 2015

Related U.S. Application Data

(60) Provisional application No. 62/017,337, filed on Jun. 26, 2014.

(51) Int. Cl.
*G02B 30/00* (2020.01)
*F21V 8/00* (2006.01)
(Continued)

(52) U.S. Cl.
CPC ......... *G02B 6/0048* (2013.01); *G02B 6/0068* (2013.01); *G02B 30/26* (2020.01);
(Continued)

(58) Field of Classification Search
CPC .. G02B 6/0055; G02B 6/0011; G02B 6/0068; G02B 6/0048; G02B 27/286;
(Continued)

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CN | 1142869 A | 2/1997 |
| CN | 1377453 A | 10/2002 |

(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.

(Continued)

*Primary Examiner* — Stephone B Allen
*Assistant Examiner* — Jyotsna V Dabbi
(74) *Attorney, Agent, or Firm* — Penny L. Lowry

(57) ABSTRACT

A directional privacy display may include a waveguide; and an array of light sources and spatial light modulator that operate in a time sequential manner. The waveguide may include light extraction features arranged to direct light from an array of light sources by total internal reflection to an array of viewing windows and a reflector arranged to direct light from the waveguide by transmission through extraction features of the waveguide to the same array of viewing windows. First and second phases may be temporally multiplexed with respective primary and secondary images and primary and secondary angular illumination distributions. An efficient and bright privacy display may be provided with obscured primary image visibility for off-axis observers.

26 Claims, 51 Drawing Sheets

(51) Int. Cl.
*G02F 1/13* (2006.01)
*H04N 13/32* (2018.01)
*G02B 30/26* (2020.01)
*H04N 13/30* (2018.01)

(52) U.S. Cl.
CPC ............ *G02F 1/1323* (2013.01); *H04N 13/32* (2018.05); *G02B 6/0055* (2013.01); *H04N 2013/405* (2018.05)

(58) Field of Classification Search
CPC .............. G02B 27/281; G02B 27/283; G02B 27/2214; G02B 27/26; G02B 27/2228; G02B 27/2257; G02B 27/22; G02B 27/225; G02B 27/2264; G02B 30/26; G02B 5/3033; G02B 5/3083; G02B 5/305; G02B 5/3058; G02F 1/1323; G02F 1/1335; G02F 1/133504; G02F 1/133606; G02F 1/133613; H04N 13/0418; H04N 13/0404; H04N 13/0409; H04N 13/0497; H04N 13/0434; H04N 13/0459; H04N 13/0431; H04N 13/32; H04N 2013/405; F21V 7/04–048
USPC ........... 359/462, 464; 348/55; 362/602, 612, 362/625
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |

(56) References Cited

U.S. PATENT DOCUMENTS

| | | |
|---|---|---|
| 8,752,995 B2 | 6/2014 | Park |
| 9,197,884 B2 | 11/2015 | Lee et al. |
| 9,350,980 B2 | 5/2016 | Robinson et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0121047 A1* | 5/2007 | Chung .............. G02F 1/1323 349/141 |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0090959 A1* | 4/2011 | Wiegand .............. H04N 19/36 375/240.12 |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |

(56) References Cited

U.S. PATENT DOCUMENTS

| | | |
|---|---|---|
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308185 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0036361 A1 | 2/2014 | Woodgate et al. |
| 2014/0043323 A1 | 2/2014 | Sumi |
| 2014/0126238 A1 | 5/2014 | Kao et al. |
| 2014/0240828 A1 | 8/2014 | Robinson et al. |
| 2014/0340728 A1 | 11/2014 | Taheri |
| 2014/0368602 A1 | 12/2014 | Woodgate et al. |
| 2015/0138059 A1* | 5/2015 | Large .................. H04N 13/32 345/102 |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| CN | 1910399 B | 5/2013 |
| CN | 103238090 A | 8/2013 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| GB | 2426352 A | 11/2006 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | 2000044618 A | 2/2000 |
| JP | 2000200049 A | 7/2000 |
| JP | 2001093321 A | 4/2001 |
| JP | 2001281456 | 10/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005116266 | 4/2005 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | 2007171500 A | 7/2007 |
| JP | 3968742 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 20110216281 | 10/2011 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 A | 9/2005 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2005071449 A2 | 8/2005 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |

OTHER PUBLICATIONS

AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.

(56) References Cited

OTHER PUBLICATIONS

CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-16150248.9 European Extended Search Report of European Patent Office dated Jun. 16, 2016.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
Robinson et al., U.S. Appl. No. 15/098,084 entitled "Wide angle imaging directional backlights" filed Apr. 13, 2016.
Robinson et al., U.S. Appl. No. 15/165,960 entitled "Wide Angle Imaging Directional Backlights" filed May 26, 2016.
Robinson et al., U.S. Appl. No. 15/290,543 entitled "Wide angle imaging directional backlights" filed Oct. 11, 2016.
Robinson, U.S. Appl. No. 13/300,293 entitled "Directional flat illuminators" filed Nov. 18, 2011.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
International search report and written opinion of international searching authority in co-pending PCT/US2015/038024.
JP-200980150139.1 1st Office Action dated Feb. 11, 2014.
JP-200980150139.1 2d Office Action dated Apr. 5, 2015.
JP-2013540083 Notice of reasons for rejection dated Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).
Robinson et al., U.S. Appl. No. 15/097,750 entitled "Wide angle imaging directional backlights" filed Apr. 13, 2016.
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.

(56) References Cited

OTHER PUBLICATIONS

PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
Robinson et al., U.S. Appl. No. 14/751,878 entitled "Directional privacy display" filed Jun. 26, 2015.
Dogruel, "A Method for concealment of displayed data", Displays Devi, DEMPA Publications, Tokyo, JP, vol. 24, No. 3, Oct. 1, 2003 (Oct. 1, 2003), pp. 97-102.
EP15811293.8 European Office Action dated Mar. 19, 2021.

* cited by examiner

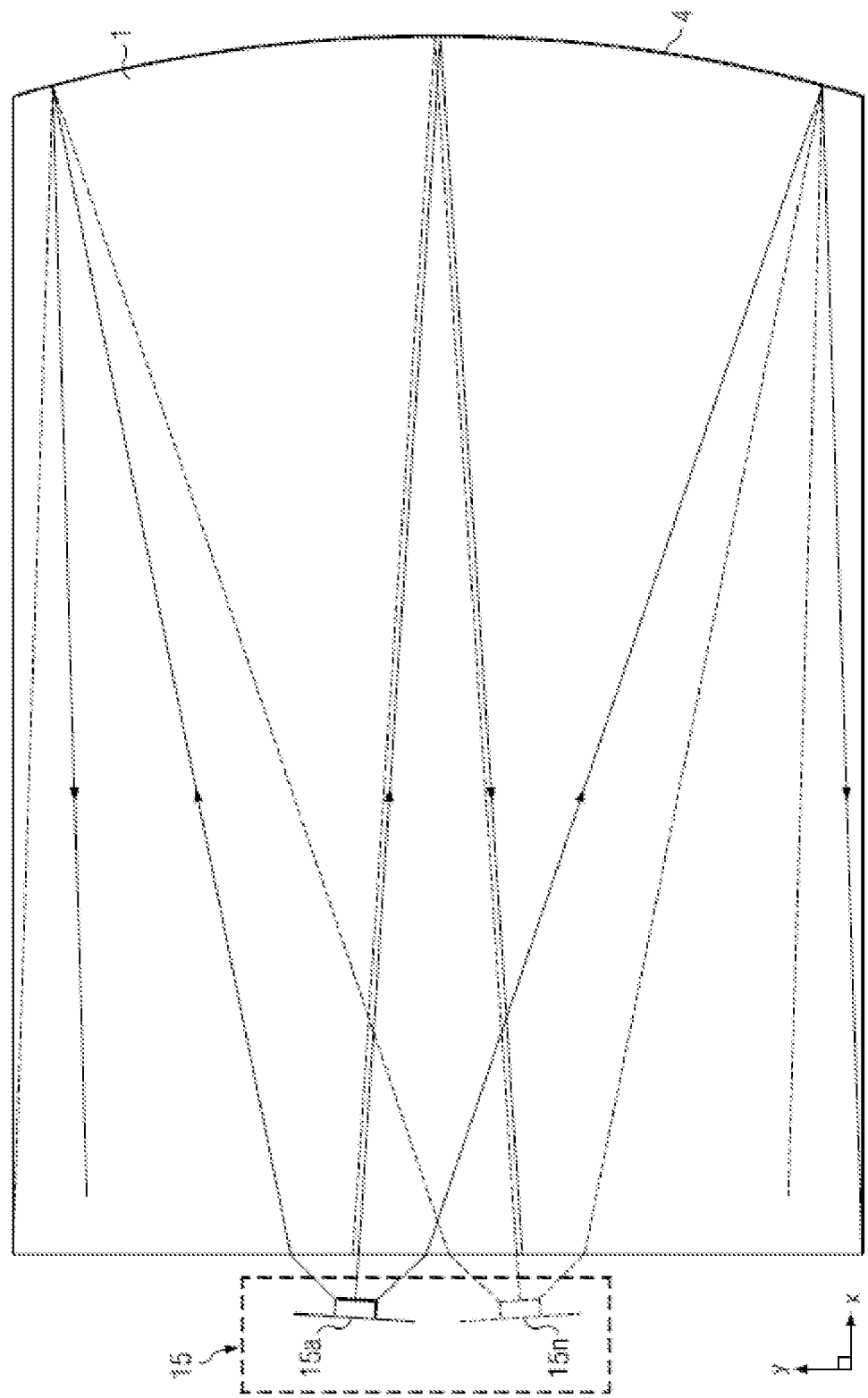

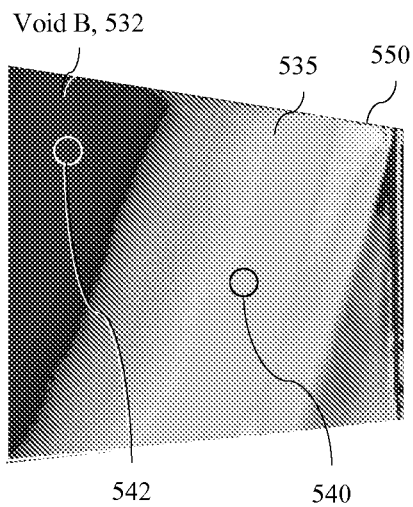
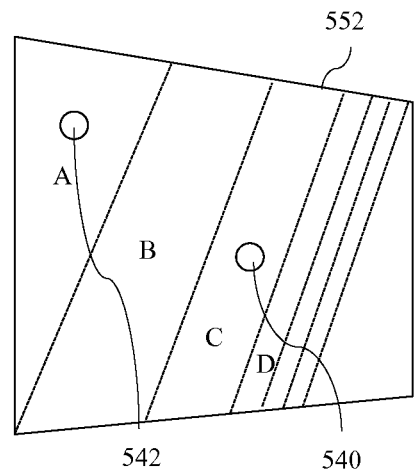
FIG. 41  FIG. 42
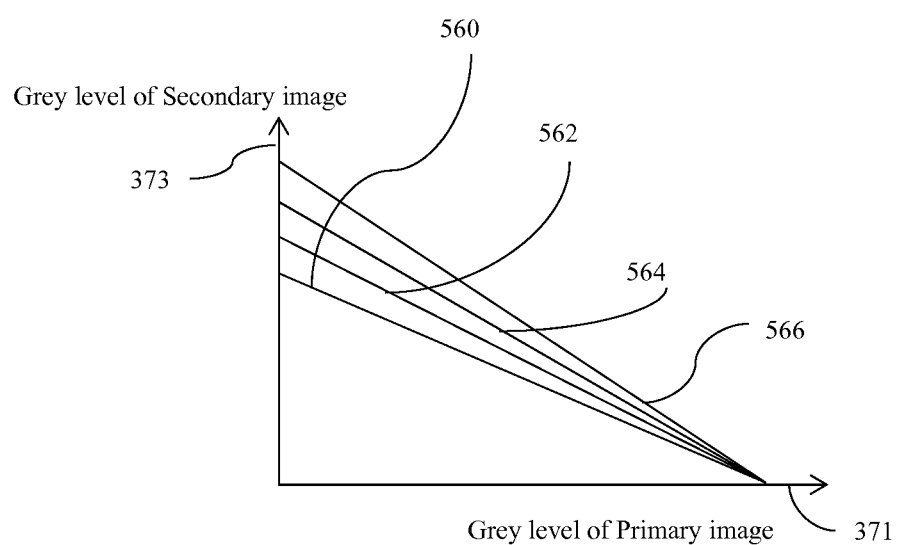
FIG. 43

DIRECTIONAL PRIVACY DISPLAY

CROSS-REFERENCE AND PRIORITY CLAIM TO RELATED APPLICATIONS

This application is related to U.S. patent application Ser. No. 13/300,293, "Directional flat illuminators," filed Nov. 18, 2011, U.S. patent application Ser. No. 13/836,443, "Crosstalk suppression in a directional backlight," filed Mar. 15, 2013, U.S. patent application Ser. No. 14/186,862, "Directional backlight," filed Feb. 21, 2014, U.S. Provisional Patent Application No. 62/167,203, entitled "Wide angle imaging directional backlights," filed May 27, 2015, U.S. Patent Provisional Application No. 62/167,185, entitled "Wide angle imaging directional backlights," filed May 27, 2015, all of which are incorporated herein by reference in their entireties. Additionally, this application is related to and claims priority to U.S. Provisional Patent Application No. 62/017,337, entitled "Directional privacy display," filed Jun. 26, 2014.

TECHNICAL FIELD

This disclosure generally relates to illumination of light modulation devices, and more specifically relates to light guides for providing large area illumination from localized light sources for use in privacy display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

Further spatially multiplexed displays provide repeating lobes of directional images, so that off-axis visibility is maintained and are not typically suitable for privacy display.

BRIEF SUMMARY

According to a first aspect of the present disclosure, there may be provided a directional display apparatus comprising: a directional backlight comprising a waveguide comprising first and second, opposed guide surfaces for guiding input light along the waveguide, and an array of light sources arranged to generate the input light at different input positions across the waveguide, wherein the first guide surface is arranged to guide light by total internal reflection, the second guide surface comprises a plurality of light extraction features arranged to deflect light guided through the waveguide out of the waveguide through the first guide surface as output light and intermediate regions between the light extraction features that are arranged to guide light along the waveguide, and the waveguide is arranged to direct the output light into optical windows in output directions that are distributed in a lateral direction in dependence on the input position of the input light; a transmissive spatial light modulator arranged to receive the output light from the first guide surface of the waveguide and to modulate it to display an image; and a control system capable of controlling the spatial light modulator and capable of selectively operating of light sources to direct light into corresponding optical windows, wherein stray light in the directional backlight is directed in output directions outside the optical windows corresponding to selectively operated light sources, the control system is arranged to control the spatial light modulator and the array of light sources in synchronization with each other so that: (a) the spatial light modulator displays a primary image while at least one primary light source is selectively operated to direct light into at least one primary optical window for viewing by a primary observer, and (b) in a temporally multiplexed manner with the display of the primary image, the spatial light modulator displays a secondary image while at least one light source other than the at least one primary light source is selectively operated to direct light into secondary optical windows outside the at least one primary optical window, the secondary image as perceived by a secondary observer outside the primary optical window obscuring the primary image that modulates the stray light directed outside the primary optical window.

Thus a display may provide a primary image to a first observer with high luminance and high contrast over a comfortable viewing range. A secondary observer outside the viewing range may observe a secondary image with lower luminance than the primary image, and further comprises reduced contrast, disruptive pattern or other obscuration effects. Advantageously, the desired primary image may difficult to perceive by the secondary observer, thus improving the security of use of the display in public environments. Further, reflections from the display surface may further obscure the image to the secondary observer. Such a display may be arranged to switch between a wide angle viewing mode and a privacy mode. Further such a display may achieve low power operation for extended time between battery charges. Very high luminance mode may be provided over a reduced angular range for substantially the same power consumption as wide angle mode operation. Further, such a display may be arranged to achieve autostereoscopic display operation.

Said at least one light source other than the at least one primary light source that may be selectively operated to direct light into secondary optical windows outside the at least one primary optical window may comprise plural light sources other than the at least one primary light source. Said plural light sources other than the at least one primary light source may be selectively operated to output light with differing luminous flux. The control system may be arranged to control the spatial light modulator and the array of light sources in synchronization with each other so that: (a) while the spatial light modulator displays the primary image, at least one additional light source in addition to the at least one primary light source may be selectively operated to direct light into an additional optical window, and (b) while the spatial light modulator displays the secondary image, the plural light sources include the at least one additional light source and other light sources, the additional light source being operated to output light with higher luminous flux than the other light sources. The at least one additional light source may change in different temporal phases of operation. Advantageously the appearance of the display to an off-axis observer may comprise regions of differing luminance across the spatial light modulator that disrupts the appearance of the primary image. Such disruption may be achieved without altering the image content and may be time varying. Thus a primary observer may see the primary image with minimized visibility of residual secondary image.

The secondary image may comprise an inverted copy of the primary image arranged to at least partly cancel the primary image that modulates the stray light directed outside the primary optical window, as perceived by the primary observer.

Advantageously the perceived image by the secondary observer may have substantially reduced contrast in comparison to the primary image perceived by the primary observer.

The control system may be arranged to control the spatial light modulator and the array of light sources so that the secondary image has the same luminance as the primary image that modulates the stray light directed outside the primary optical window. The inverted copy of the primary image may comprise a copy of the primary image inverted by an inversion function varies spatially across the image. The inversion function may vary spatially across the image in correspondence with a spatial variation of the luminance of the output windows.

The secondary image may comprise the inverted copy of the primary image superimposed by a disruptive pattern. The secondary image may comprise a disruptive pattern. The primary image may comprise an image for display to the primary observer superimposed by an inverted copy of the disruptive pattern arranged to at least partly cancel the disruptive pattern that modulates the stray light directed outside the secondary optical window, as perceived by the primary observer.

Advantageously the obscuration effect may combine reduced luminance, reduced contrast and disruptive image content that may be dependent on the primary image content to provide further obscuration in regions where the cancelling of the primary and secondary images are not complete due to angular variations of the contrast of the spatial light modulator.

The control system may be arranged to control the spatial light modulator and the array of light sources in synchronization with each other so that the spatial light modulator displays a primary image and the secondary image in a temporally multiplexed manner in time slots of unequal length.

Advantageously the luminance of the primary image may be increased in comparison to arrangements in which the time slots are of equal length.

The spatial light modulator may comprise an array of pixels and the control system may be arranged to control the spatial light modulator to control the drive level of each pixel during the temporally multiplexed display of the primary and secondary taking into account the desired grey level of the pixel and the expected hysteresis of the pixel.

Advantageously leakage of secondary image into the primary image may be reduced, for example to reduce the appearance of disruptive patterns from the secondary image in the primary image for the primary observer.

The primary image may be a two dimensional image. The primary image may be a three dimensional image comprising a left eye image and a right eye image, and the control system may be arranged to control the spatial light modulator to display the primary image by (a1) controlling the spatial light modulator to display the left eye image and the right eye image in a temporally multiplexed manner, and (a2) in synchronization with the control of the spatial light modulator, controlling the array of light sources to selectively operate different primary light sources to direct light into at least one primary optical window for viewing by the left and right eyes of the primary observer, when the spatial light modulator displays the left eye image and the right eye image, respectively. The secondary image may be a two dimensional image.

Advantageously autostereoscopic operation may be achieved in a privacy mode with low visibility of the autostereoscopic image to a secondary observer.

The second guide surface may have a stepped shape comprising facets, that are said light extraction features, and the intermediate regions. The directional backlight may further comprise a rear reflector comprising a linear array of reflective facets arranged to reflect light from the light sources that is transmitted through the plurality of facets of the waveguide, back through the waveguide to exit through the first guide surface into said optical windows. The light extraction features may have positive optical power in the lateral direction.

Advantageously a high luminance, high efficiency and com pact backlight may be provided for a directional privacy display. By means of control of an array of light sources, such a backlight may achieve controllable modes of operation including low power, high luminance, autostereoscopic and privacy operation.

The waveguide may further comprise an input end, the array of light sources being arranged along the input end. The waveguide may further comprise a reflective end for reflecting input light back through the waveguide, the second guide surface being arranged to deflect light as output light through the first guide surface after reflection from the reflective end. The reflective end may have positive optical power in the lateral direction. The waveguide may further comprise a reflective end that is elongated in a lateral direction, the first and second guide surfaces extending from laterally extending edges of the reflective end, the waveguide further comprising side surfaces extending between the first and second guide surfaces, and wherein the light sources may include an array of light sources arranged along a side surface to provide said input light through that side surface, and the reflective end comprises first and second facets alternating with each other in the lateral direction, the first facets being reflective and forming reflective facets of a Fresnel reflector having positive optical power in the lateral direction, the second facets forming draft facets of the Fresnel reflector, the Fresnel reflector having an optical axis that is inclined towards the side surface in a direction in which the Fresnel reflector deflects input light from the array of light sources into the waveguide.

The directional display apparatus may further comprise a sensor system arranged to detect the position of the head of the primary observer, the control system being arranged to control the light sources in accordance with the detected position of the head of the observer.

Advantageously the freedom of movement for the primary viewer may be increased, and the range over which a secondary observer may attempt to see the primary image may be reduced.

The sensor system may be arranged to detect a secondary observer outside the primary optical window, and the control system may be arranged, in response to detecting the secondary observer, to perform said control of the spatial light modulator and the array of light sources in synchronization with each other so that the spatial light modulator displays the primary image and the secondary image in a temporally multiplexed manner, and, in response to not detecting the secondary observer, to control the spatial light modulator and the array of light sources so that the spatial light modulator displays the primary image while at least one primary light source is selectively operated to direct light into at least one primary optical window for viewing by a primary observer, without displaying the secondary image in a temporally multiplexed manner.

Advantageously the contrast of the primary image may be increased in arrangements when no secondary observer is detected. According to a second aspect of the present disclosure there may be provided a method of obscuring a primary image that modulates stray light directed outside the primary optical window in a directional display apparatus comprising: a directional backlight comprising a waveguide comprising first and second, opposed guide surfaces for guiding input light along the waveguide, and an array of light sources arranged to generate the input light at different input positions across the waveguide, wherein the first guide surface is arranged to guide light by total internal reflection, the second guide surface comprises a plurality of light extraction features arranged to deflect light guided through the waveguide out of the waveguide through the first guide surface as output light and intermediate regions between the light extraction features that are arranged to guide light along the waveguide, and the waveguide is arranged to direct the output light into optical windows in output directions that are distributed in a lateral direction in dependence on the input position of the input light so that selectively operation of light sources causes light to be directed into corresponding optical windows, wherein stray light in the directional backlight is directed in output directions outside the optical windows corresponding to selectively operated light sources;

and a transmissive spatial light modulator arranged to receive the output light from the first guide surface of the waveguide and to modulate it to display an image; the method comprising controlling the spatial light modulator and the array of light sources in synchronization with each other so that: (a) the spatial light modulator displays a primary image while at least one primary light source is selectively operated to direct light into at least one primary optical window for viewing by a primary observer, and (b) in a temporally multiplexed manner with the display of the primary image, the spatial light modulator displays a secondary image while at least one light source other than the at least one primary light source is selectively operated to direct light into secondary optical windows outside the at least one primary optical window, the secondary image as perceived by a secondary observer outside the primary optical window obscuring the primary image that modulates the stray light directed outside the primary optical window.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination may be provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of a directional display device, in accordance with the present disclosure;

FIG. 41 is a photo of the luminance distribution an optical valve for a privacy operation viewing position, in accordance with the present disclosure;

FIG. 42 is a schematic diagram illustrating in a front view with a lateral angular offset isoluminance distribution regions for a privacy operation viewing position, in accordance with the present disclosure;

FIG. 43 is a schematic graph illustrating greyscale mapping distributions for different display regions of FIG. 42, in accordance with the present disclosure;

DETAILED DESCRIPTION

Figure 1B:
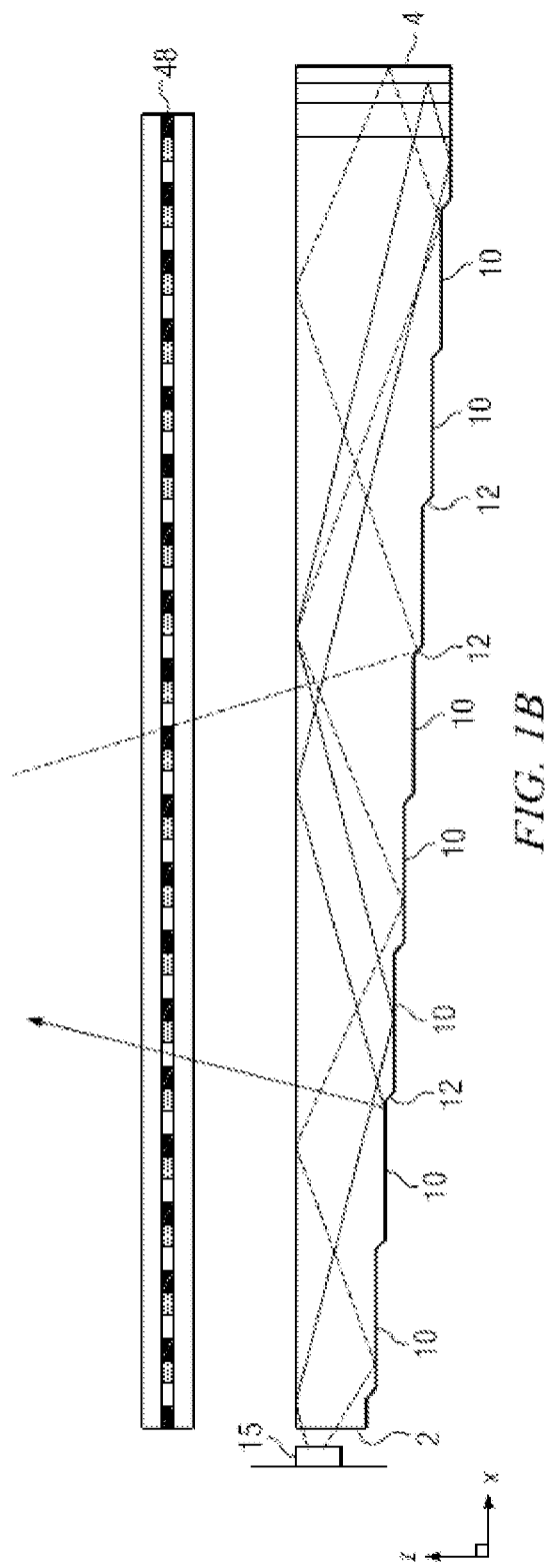
FIG. 1B is a schematic diagram illustrating a side view of light propagation in one embodiment of the directional display device of FIG. 1A, in accordance with the present disclosure.

Time multiplexed autostereoscopic displays can advantageously improve the spatial resolution of an autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

As used herein, examples of an imaging directional backlight include a stepped waveguide imaging directional backlight, a folded imaging directional backlight, or an optical valve.

Additionally, as used herein, a stepped waveguide imaging directional backlight may be an optical valve. A stepped waveguide is a waveguide for an imaging directional backlight including a waveguide for guiding light, further including a first light guiding surface; and a second light guiding surface, opposite the first light guiding surface, further including a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features may be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15*a*-15*n* in illuminator array 15 from the input edge center. Having independent illuminator elements 15*a*-15*n* along the input edge 2 then enables light to exit from the entire first light directing side 6 and propagate at different external angles, as illustrated in FIG. 1A.

Figure 2A:
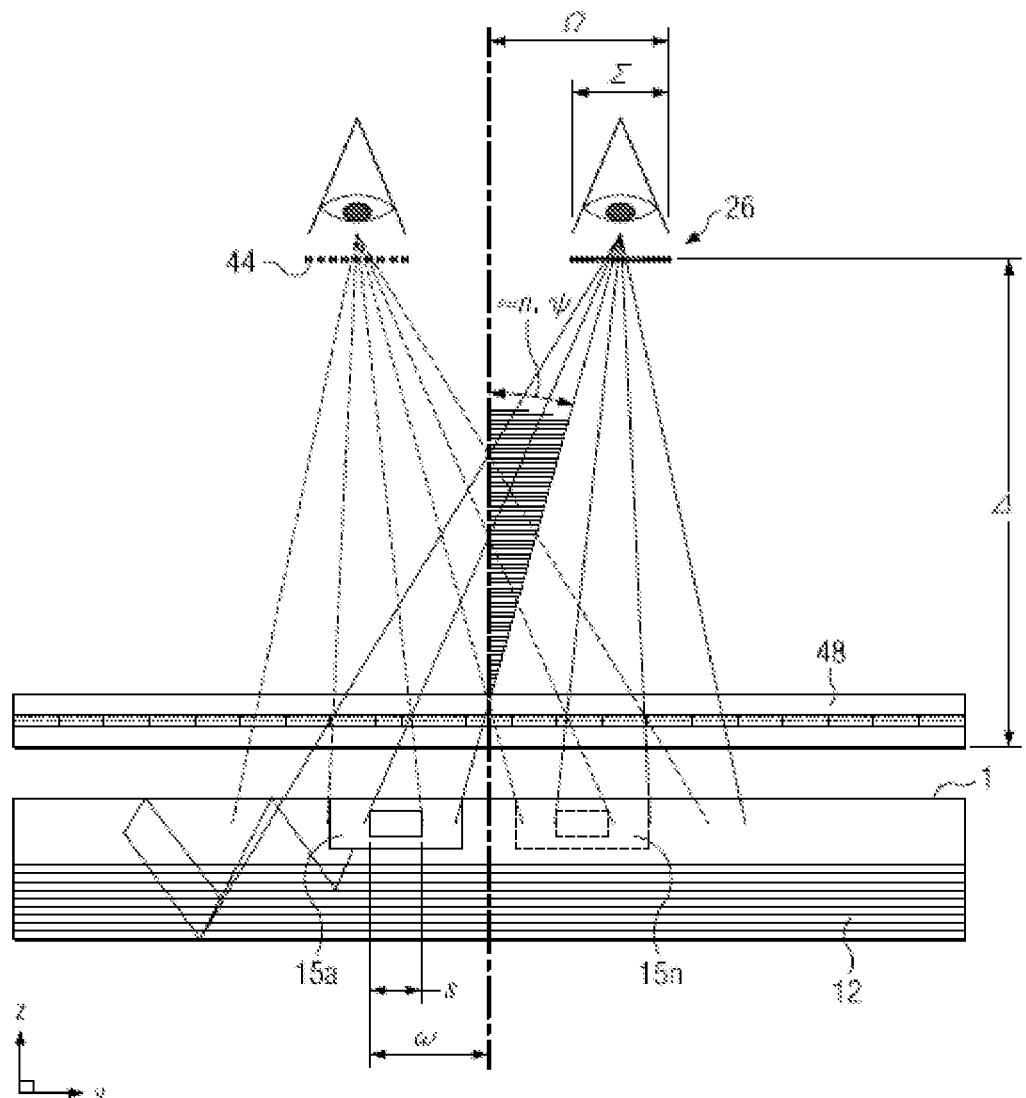
FIG. 2A is a schematic diagram illustrating in a top view of light propagation in another embodiment of a directional display device, in accordance with the present disclosure.
Figure 2B:
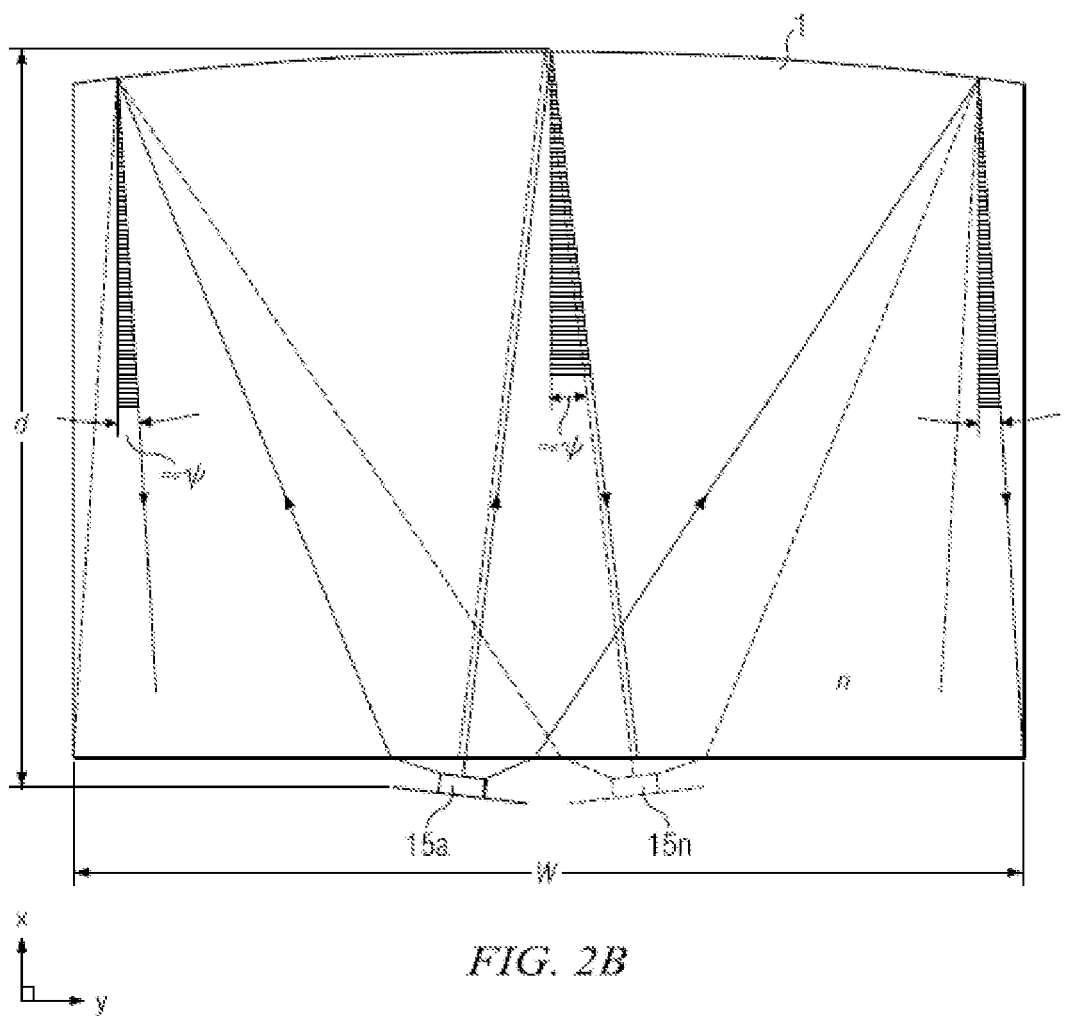
FIG. 2B is a schematic diagram illustrating light propagation in a front view of the directional display device of FIG. 2A, in accordance with the present disclosure.
Figure 2C:
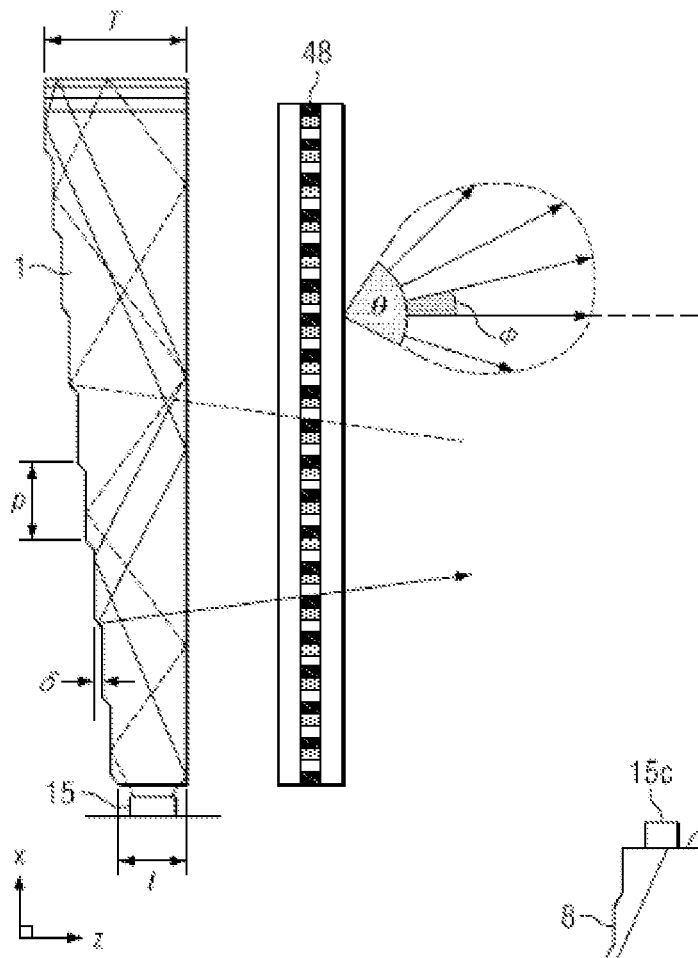
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15*a* through 15*n* of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. The cylindrical reflecting surface at end 4 may typically be a spherical profile to optimize performance for on-axis and off-axis viewing positions. Other profiles may be used.

Figure 3:
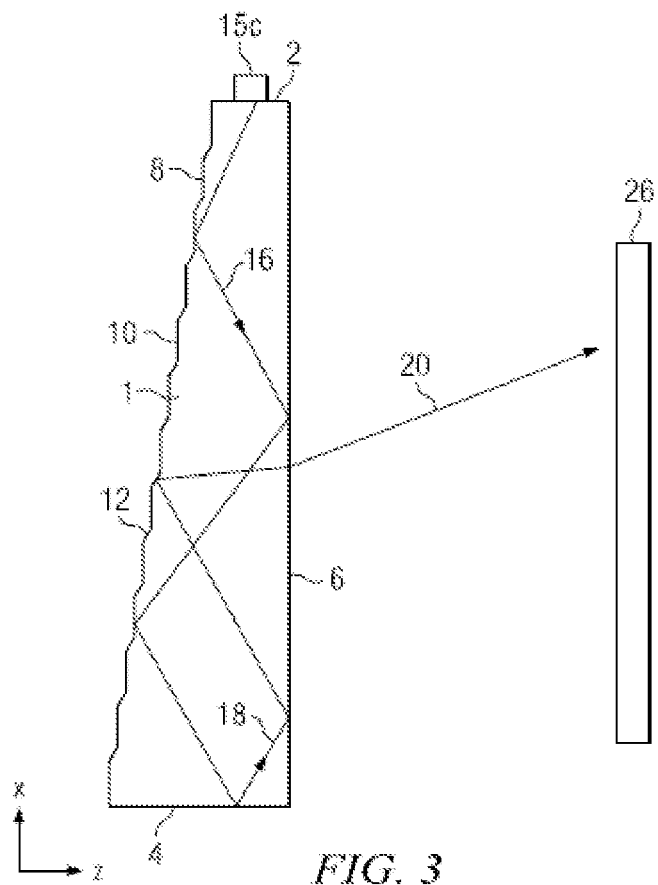
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15*c* of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
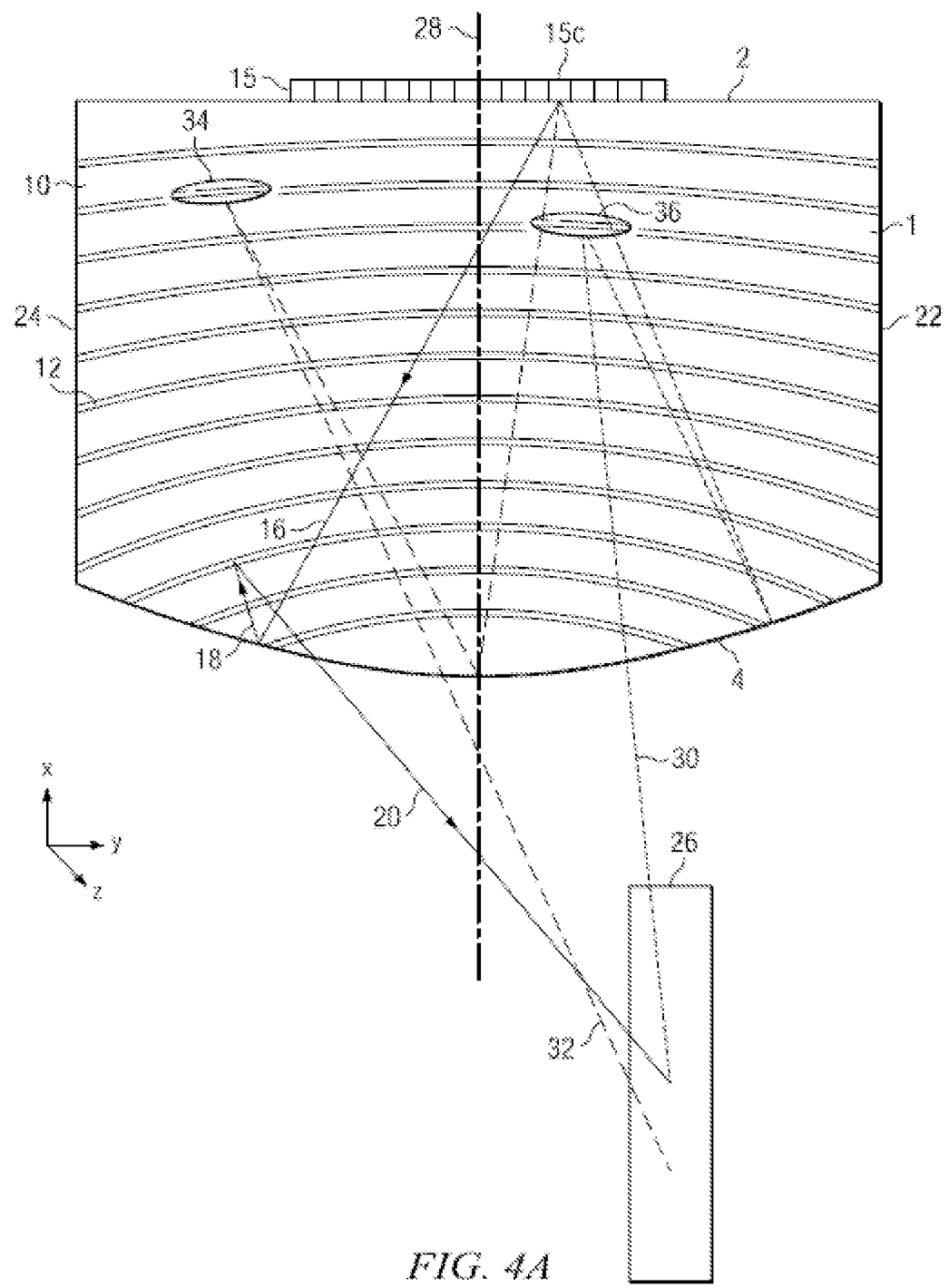
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15*c* of illuminator array 15, in the stepped waveguide 1 having an optical axis 28. In FIG. 4A, the directional backlight may include the stepped waveguide 1 and the light source illuminator array 15. Each of the output rays are directed from the input side 2 towards the same viewing window 26 from the respective illuminator 15*c*. The light rays of FIG. 4A may exit the reflective side 4 of the stepped waveguide 1. As shown in FIG. 4A, ray 16 may be directed from the illuminator element 15*c* towards the reflective side 4. Ray 18 may then reflect from a light extraction feature 12 and exit the reflective side 4 towards the viewing window 26. Thus light ray 30 may intersect the ray 20 in the viewing window 26, or may have a different height in the viewing window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8. Similar to other embodiments discussed herein, for example as illustrated in FIG. 3, the light extraction features of FIG. 4A may alternate with the guiding features 10. As illustrated in FIG. 4A, the stepped waveguide 1 may include a reflective surface on reflective side 4. In one embodiment, the reflective end of the stepped waveguide 1 may have positive optical power in a lateral direction across the stepped waveguide 1.

In another embodiment, the light extraction features 12 of each directional backlight may have positive optical power in a lateral direction across the waveguide.

In another embodiment, each directional backlight may include light extraction features 12 which may be facets of the second guide surface. The second guide surface may have regions alternating with the facets that may be arranged to direct light through the waveguide without substantially extracting it.

Figure 4B:
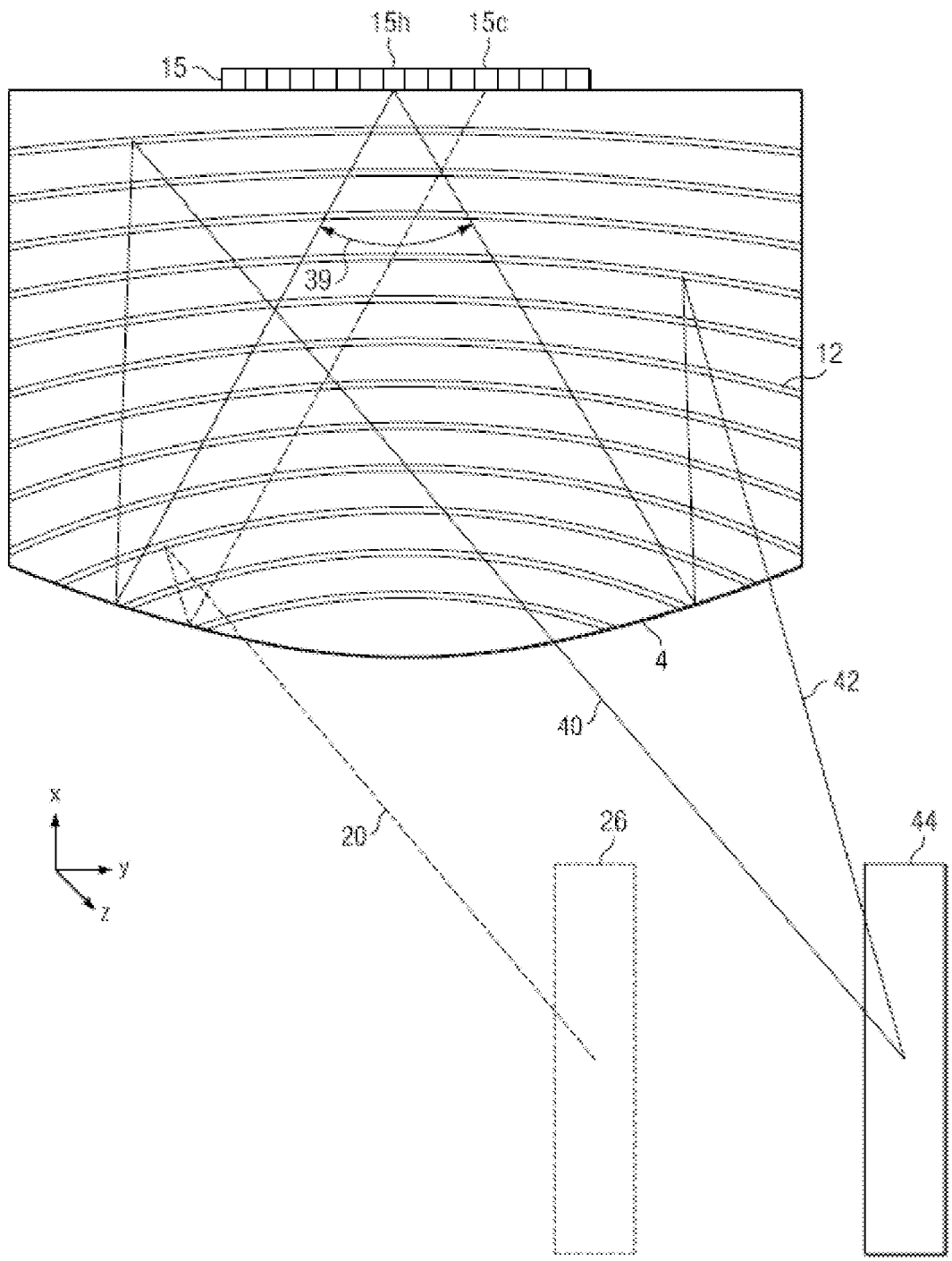
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
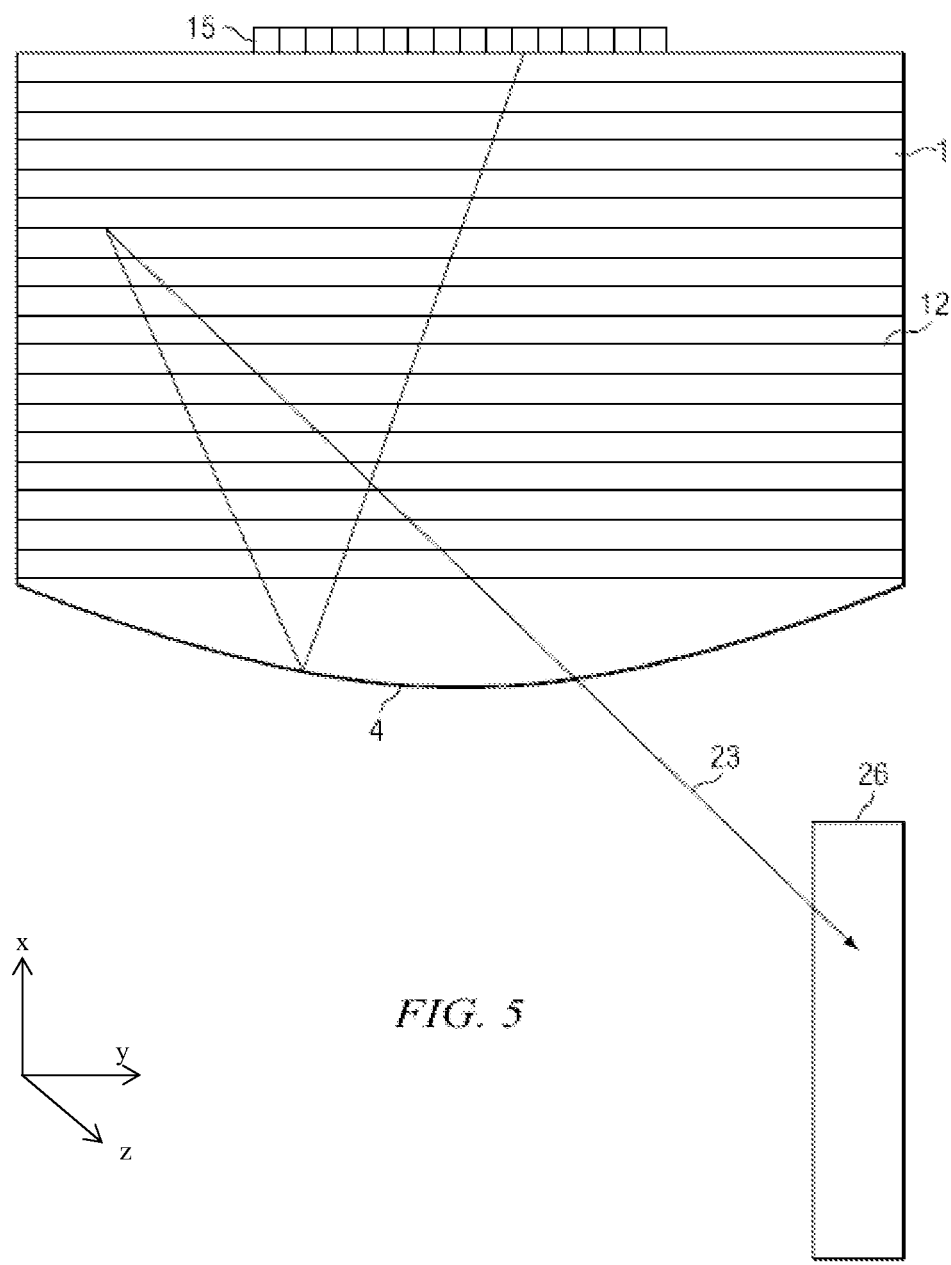
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B. The optical axis 321 of the directional waveguide 1 may be the optical axis direction of the surface at side 4. The optical power of the side 4 is arranged to be across the optical axis direction, thus rays incident on the side 4 will have an angular deflection that varies according to the lateral offset 319 of the incident ray from the optical axis 321.

Figure 6A:
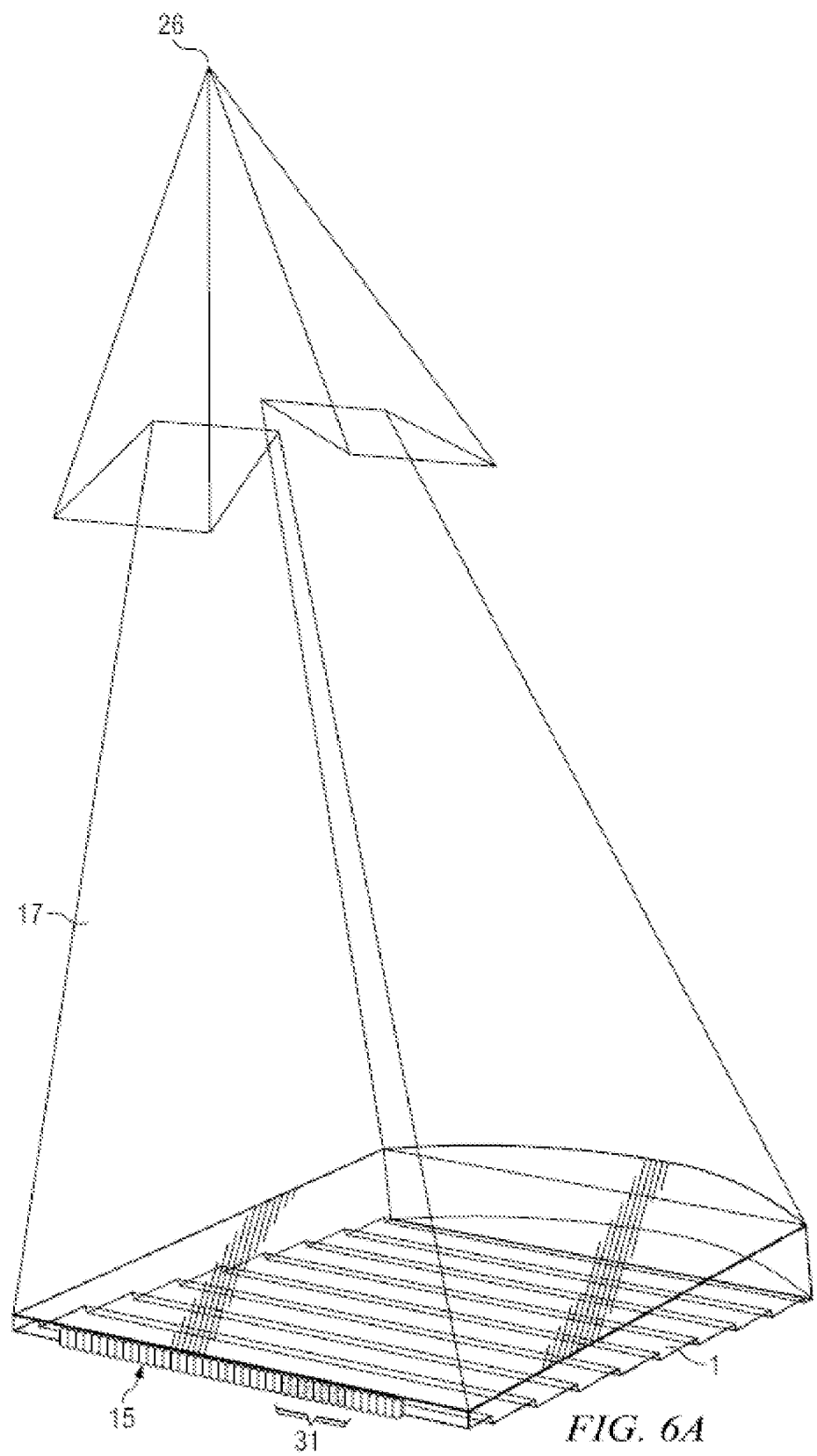
FIG. 6A is a schematic diagram illustrating one embodiment of the generation of a first viewing window in a time multiplexed directional display device, in accordance with the present disclosure.
Figure 6B:
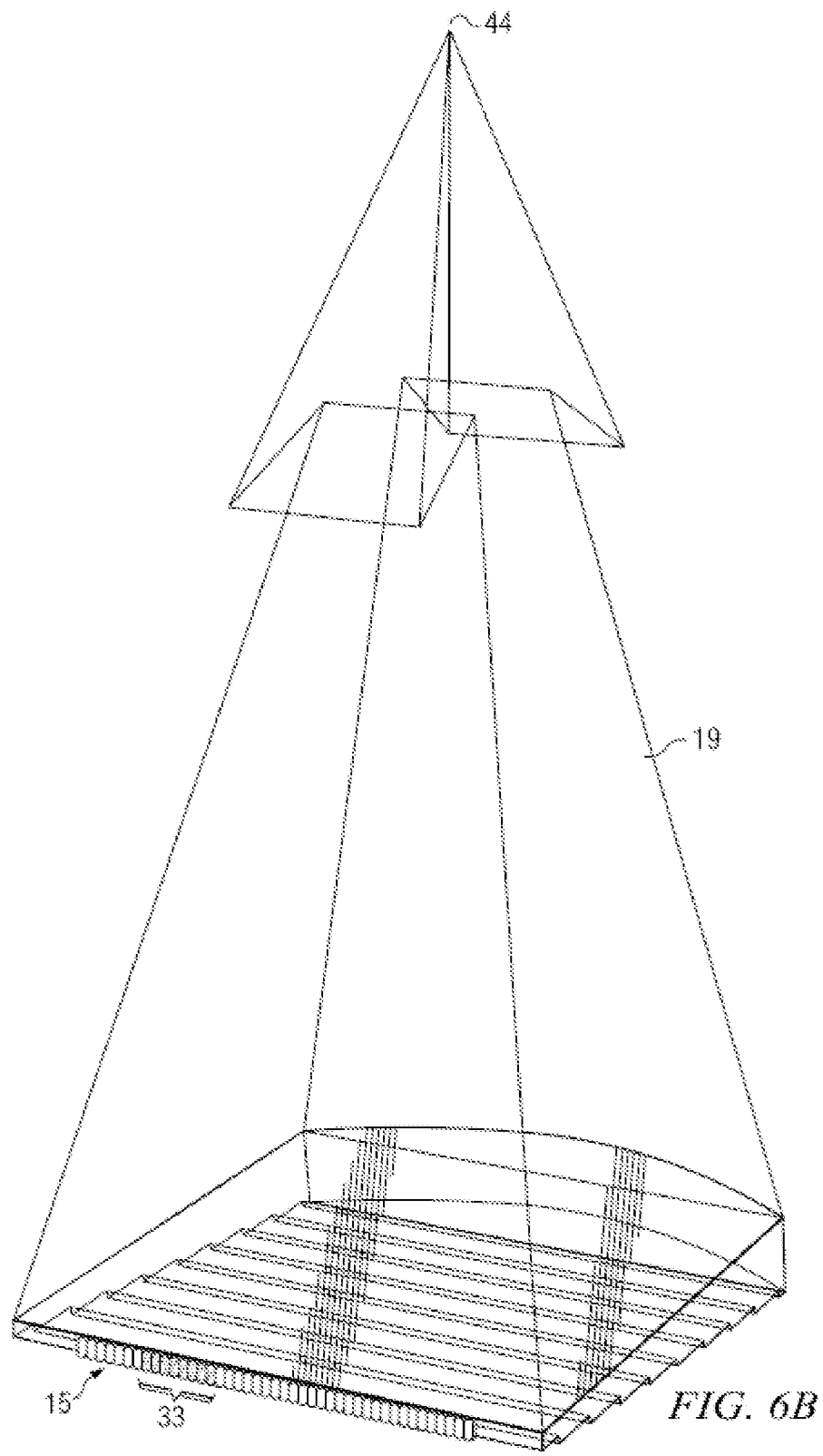
FIG. 6B is a schematic diagram illustrating another embodiment of the generation of a second viewing window in a time multiplexed directional display device in a second time slot, in accordance with the present disclosure.
Figure 6C:
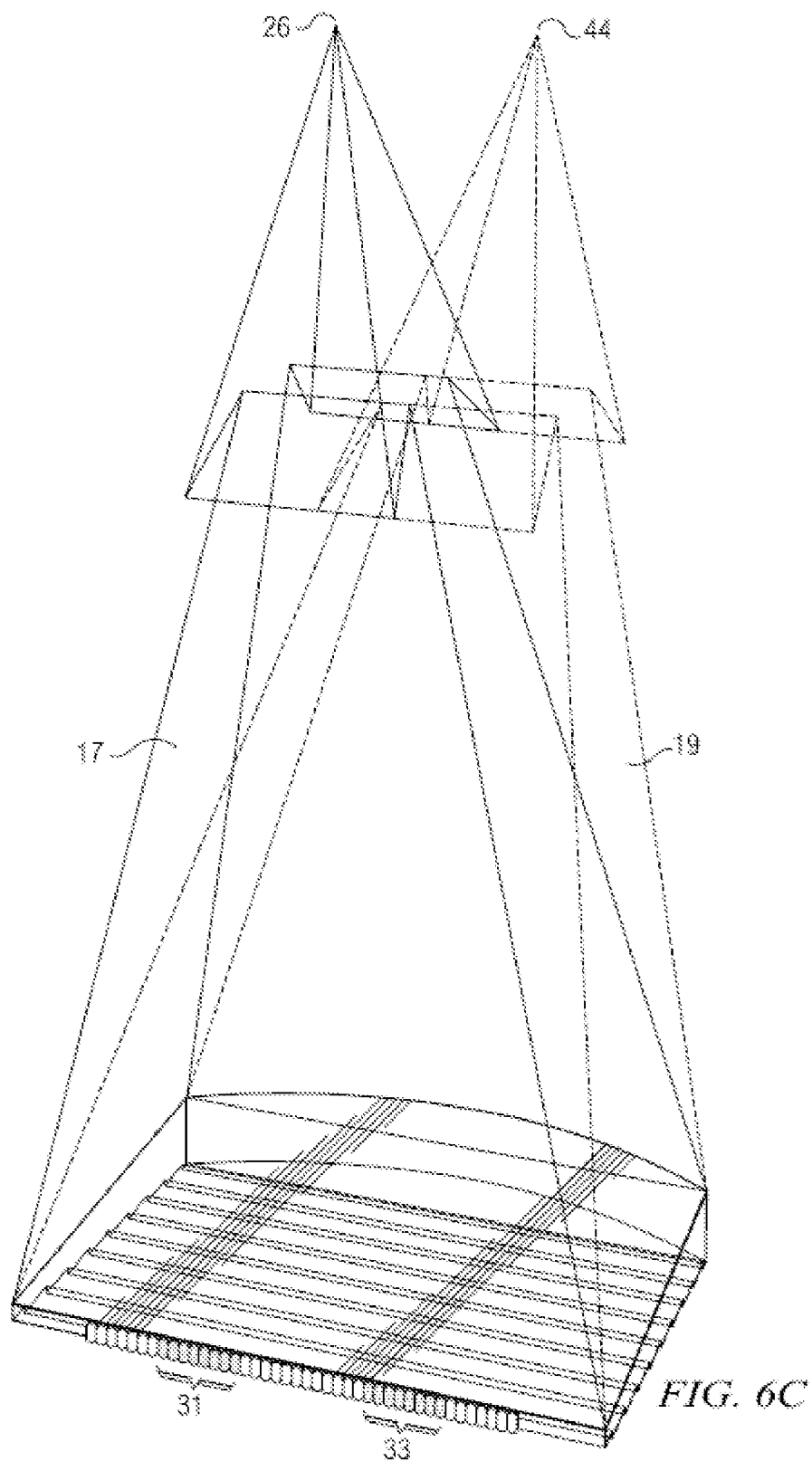
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26. FIG. 6B shows schematically the generation of viewing window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the imaging directional backlights described herein. Note that illuminator element groups 31, 33 each include one or more illumination elements from illumination elements 15a to 15n, where n is an integer greater than one.

Figure 7:
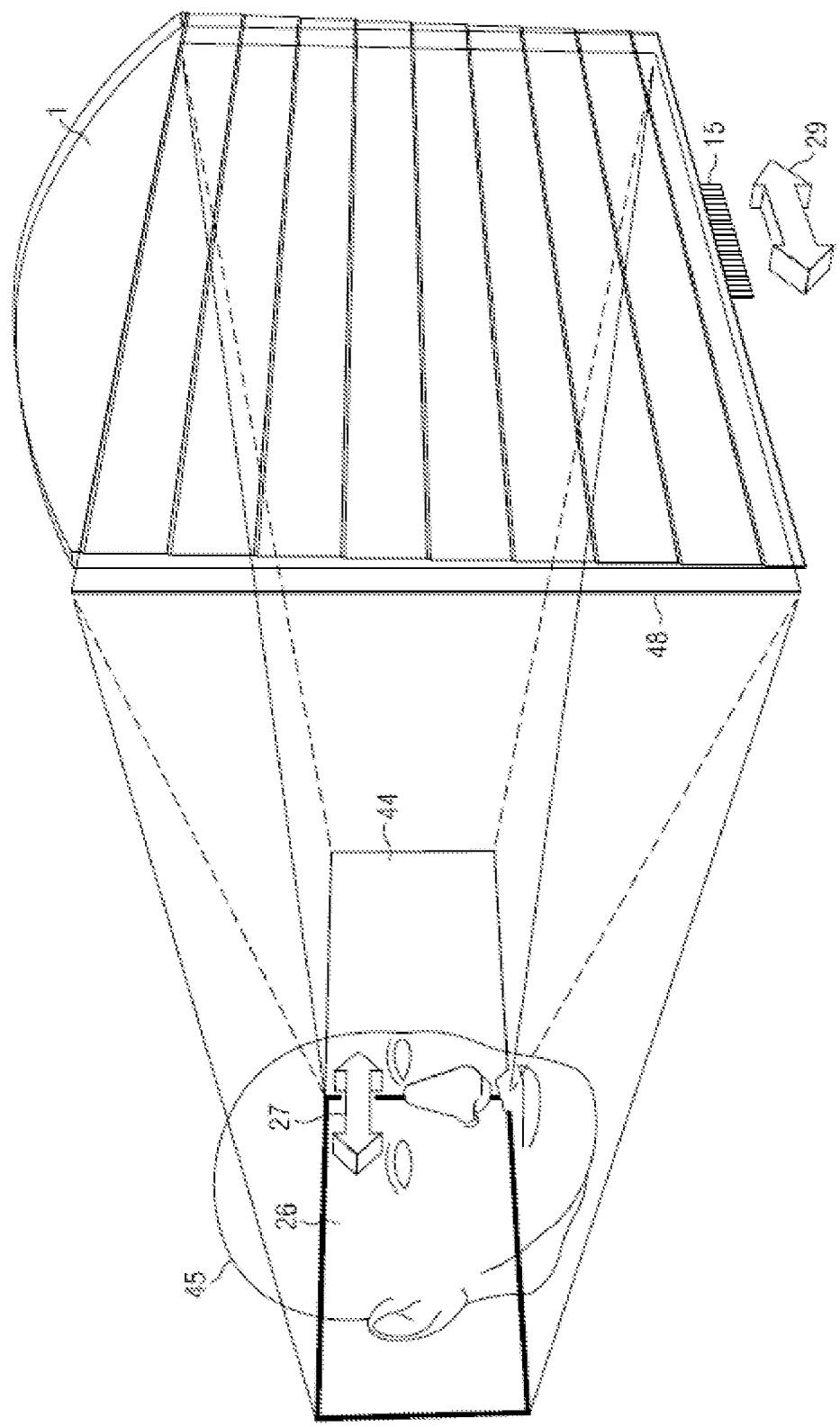
FIG. 7 is a schematic diagram illustrating an observer tracking autostereoscopic directional display device, in accordance with the present disclosure.

FIG. 7 is a schematic diagram illustrating one embodiment of an observer tracking autostereoscopic display apparatus including a time multiplexed directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the imaging directional backlights described herein.

Figure 8:
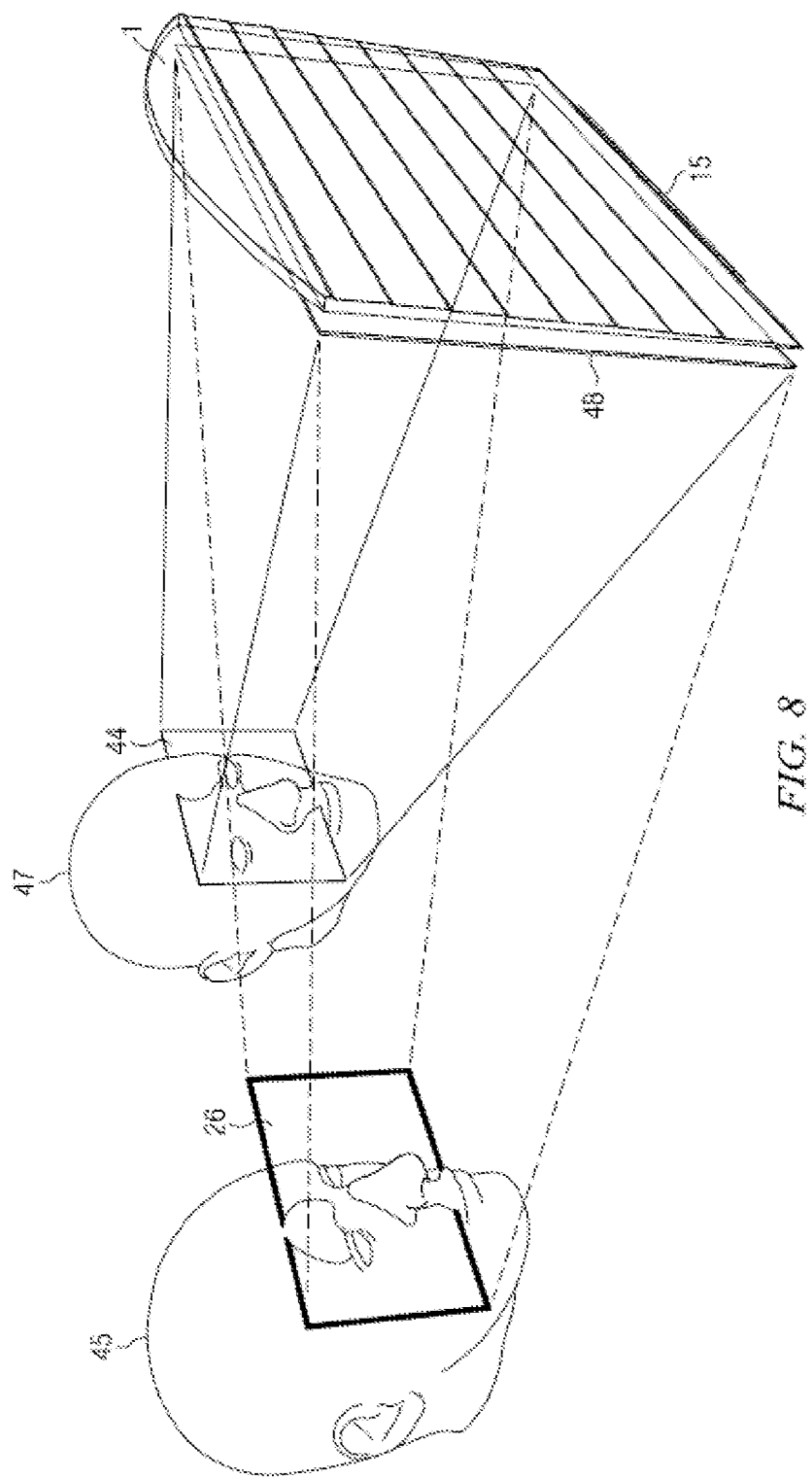
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images may be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in viewing window 26 will perceive a first image while an observer with both eyes in viewing window 44 will perceive a second image.

Figure 9:
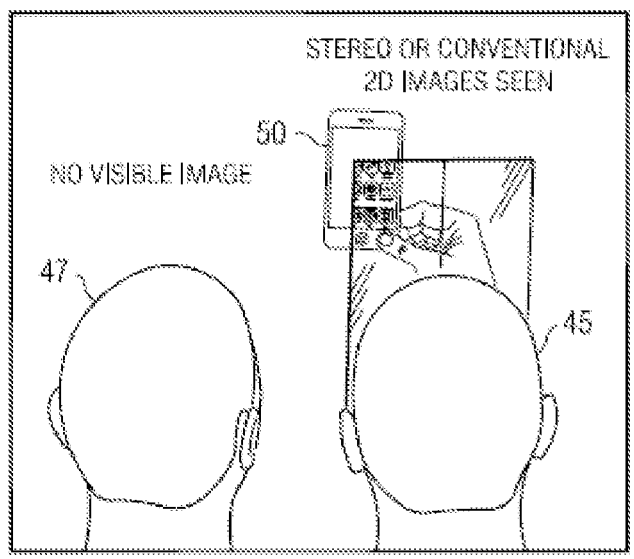
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
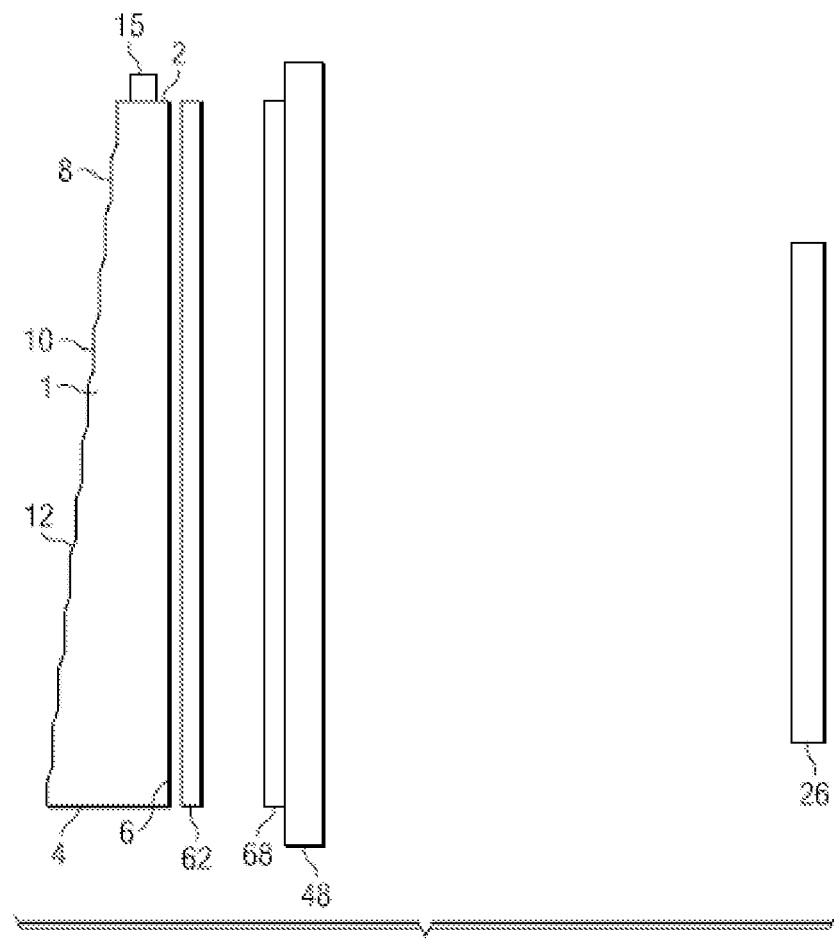
FIG. 10 is a schematic diagram illustrating in side view, the structure of a directional display device, in accordance with the present disclosure.

FIG. 10 is a schematic diagram illustrating in side view the structure of a time multiplexed directional display device as an example including an imaging directional backlight.

Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

The present embodiments refer to optical windows and viewing windows. Optical windows from a directional backlight may be formed by one light source of the array 15 of light sources. Optical windows from a parallax element and spatial light modulator may be formed by a first set of pixel columns, each with one respective aligned slit of the parallax element. Viewing windows may comprise multiple optical windows.

Figure 11:
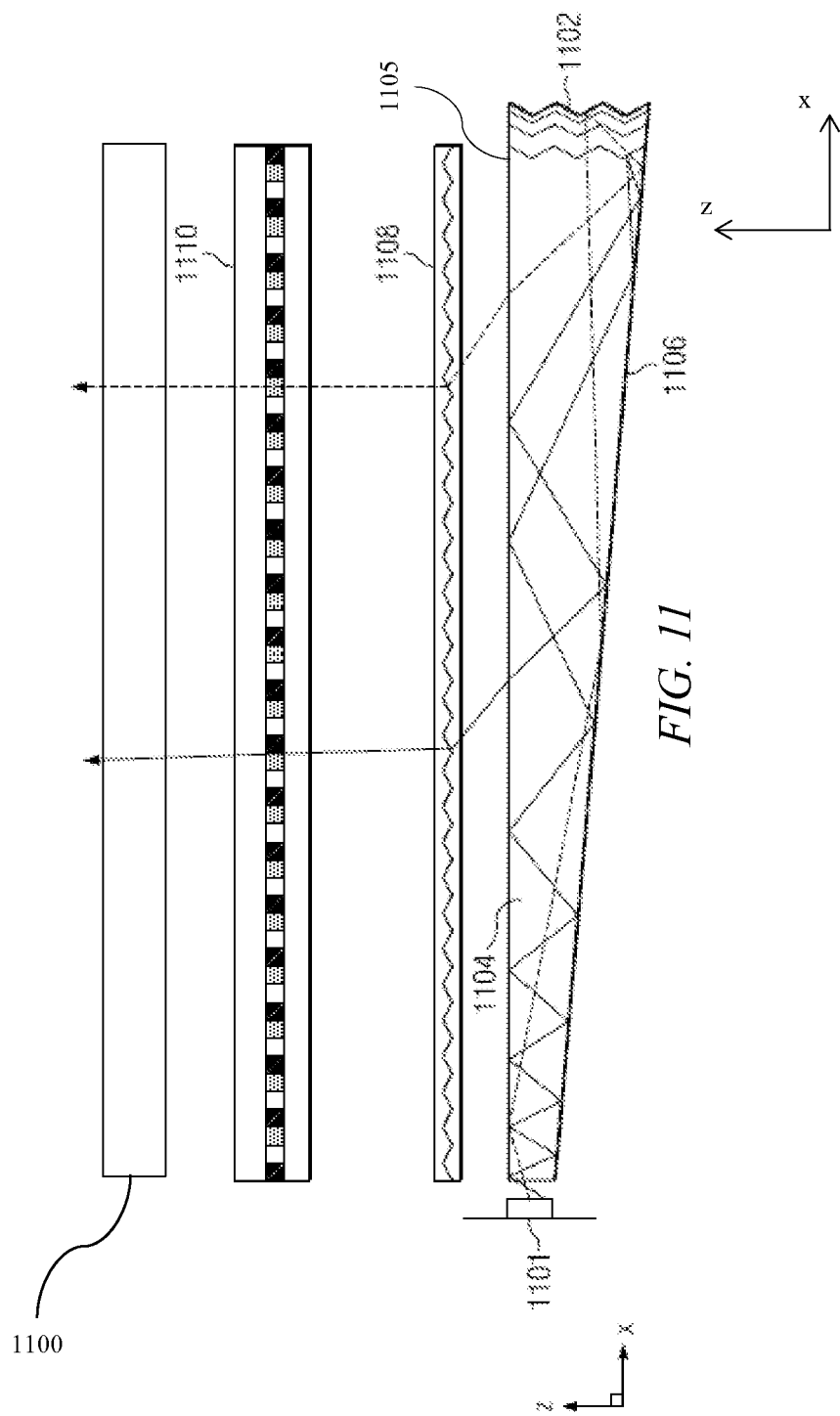
FIG. 11 is a schematic diagram illustrating in side view, the structure of a directional display device comprising a wedge waveguide, in accordance with the present disclosure.

FIG. 11 is a schematic diagram illustrating in side view, the structure of a directional display device comprising a wedge waveguide 1104 with faceted mirror end 1102. The first guide surface 1105 of the waveguide 1104 is arranged to guide light by total internal reflection and the second guide surface 1106 is substantially planar and inclined at an angle to direct light in directions that break the total internal reflection for outputting light through the first guide surface 1105. The display device further comprises a deflection element 1108 extending across the first guide surface 1105 of the waveguide 1104 for deflecting light from array 1101 of light sources towards the normal to the first guide surface 1105. Further the waveguide 1104 may further comprise a reflective end 1102 for reflecting input light back through the waveguide 1104, the second guide 1106 surface being arranged to deflect light as output light through the first guide surface 1105 after reflection from the reflective end 1102. The reflective end has positive optical power in the lateral direction (y-axis) in a similar manner to the reflective end shown in FIG. 5 for example. Further facets in the reflective end 1102 deflect the reflected light cones within the waveguide 1104 to achieve output coupling on the return path. Thus viewing windows are produced in a similar manner to that shown in FIG. 11A. Further the directional display may comprise a spatial light modulator 1110 and parallax element 1100 aligned to the spatial light modulator 1110 that is further arranged to provide optical windows. A control system 72 similar to that shown in FIG. 11A may be arranged to provide control of directional illumination providing viewing windows 26 and windows 109 from the parallax element and aligned spatial light modulator.

Thus a first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

Figure 12A:
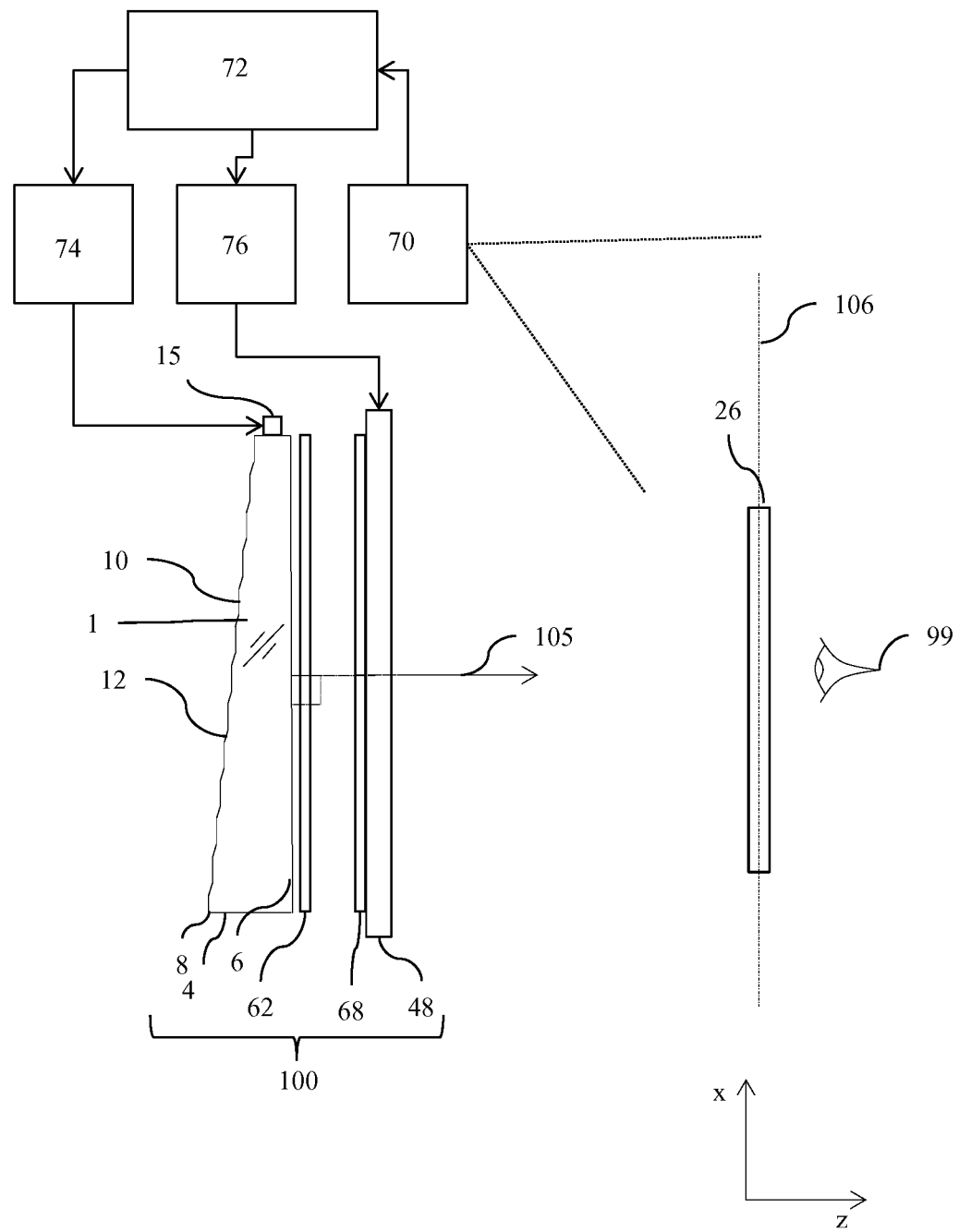
FIG. 12A is a schematic diagram illustrating in a control system for a directional display device, in accordance with the present disclosure.

FIG. 12A is a schematic diagram illustrating a directional display apparatus comprising a display device 100 and a control system. The arrangement and operation of the control system will now be described and may be applied, changing that which may be appropriately changed, to each of the display devices disclosed herein. As illustrated in FIG. 12A, a directional display device 100 may include a directional backlight device that may itself include a stepped waveguide 1 and a light source illuminator array 15. As illustrated in FIG. 12A, the stepped waveguide 1 includes a light directing side 8, a reflective end 4, guiding features 10 and light extraction features 12. The directional display device 100 may further include an SLM 48.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive SLM 48 may be arranged to receive the light from the directional backlight. Further a diffuser 68 may be provided to substantially remove Moiré beating between the waveguide 1 and pixels of the SLM 48 as well as the Fresnel lens structure 62. Diffuser 68 may be an asymmetric diffuser arranged to provide diffusion in the vertical direction (x-axis) that is greater than the diffusion in the lateral direction (y-axis). Advantageously the display uniformity can be increased and the cross talk between adjacent viewing windows minimized The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into respective viewing windows in positions corresponding to the left and right eyes of an observer synchronously with the display of left and right eye images. In this manner, an autostereoscopic effect may be achieved using a time division multiplexing technique. Further or alternatively a low contrast privacy effect may be achieved using a time division multiplexing technique as will be described herein.

Figure 12B:
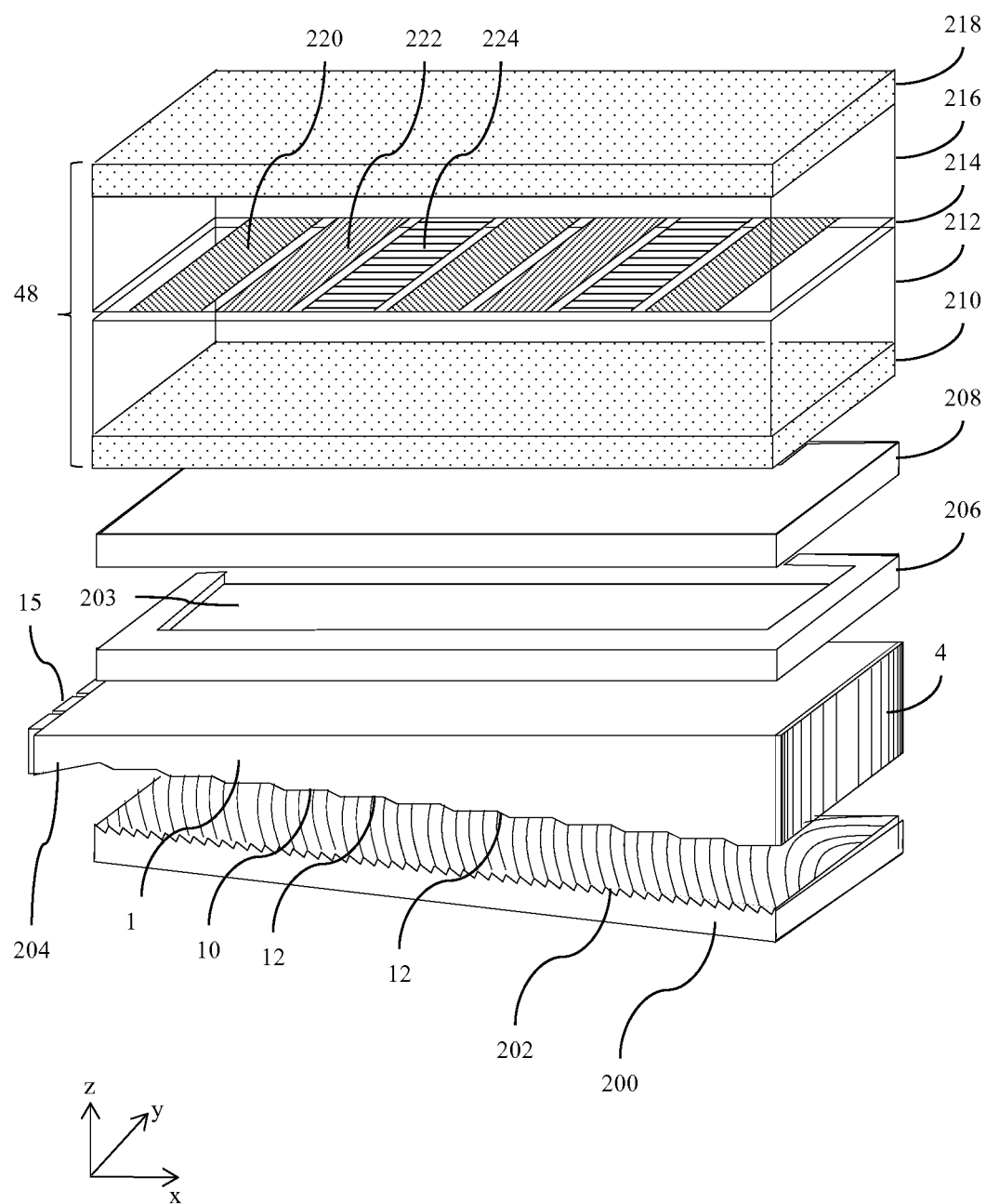
FIG. 12B is a schematic diagram illustrating in perspective view, the structure of a directional display device comprising an directional backlight arranged with a spatial light modulator, in accordance with the present disclosure.

FIG. 12B is a schematic diagram illustrating in perspective view, the structure of a directional display device comprising a waveguide 1 arranged with a spatial light modulator 48. Reflective end 4 may be provided by a Fresnel mirror. Taper region 204 may be arranged at the input to the waveguide 1 to increase input coupling efficiency from the light sources 15a-15n of the array of illuminator elements 15 and to increase illumination uniformity. Shading layer 206 with aperture 203 may be arranged to hide light scattering regions at the edge of the waveguide 1. Rear reflector 200 may comprise facets 202 that are curved and arranged to provide viewing windows 26 from groups of optical windows provided by imaging light sources of the array 15 to the window plane 106. Optical stack 208 may comprise reflective polarizers, retarder layers and diffusers. Rear reflectors 200 and optical stack 208 are described further in U.S. patent application Ser. No. 14/186,862, filed Feb. 21, 2014, entitled "Directional backlight" incorporated herein by reference in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 220, green pixels 222 and blue pixels 224 may be arranged in an array at the liquid crystal layer 214. White, yellow, additional green or other color pixels (not shown) may be further arranged in the liquid crystal layer to increase transmission efficiency, color gamut or perceived image resolution.

Figure 12C:
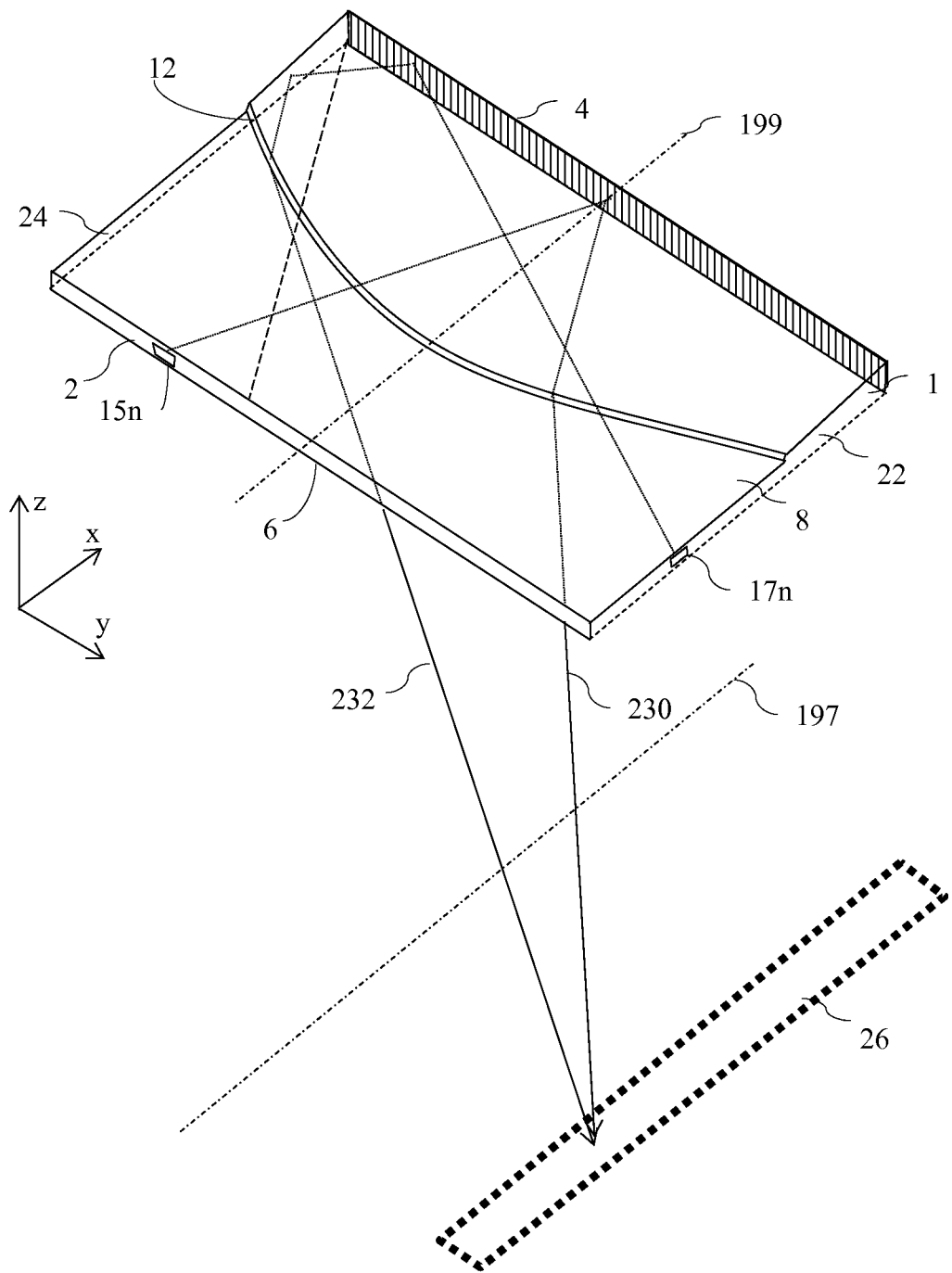
FIG. 12C is a schematic diagram illustrating in perspective view, the formation of an optical window by edge and side light sources with a valve with arrangement similar to that shown in FIG. 4A, in accordance with the present disclosure.

FIG. 12C is a schematic diagram illustrating in perspective view, the formation of an optical window by edge and side light sources with a valve with arrangement similar to that shown in FIG. 4A. Light ray 230 from source 15n that is offset from optical axis 199 is reflected at reflective end 4 and directed to an off-axis optical window 26, that is offset in a lateral direction from axis 197 in the window plane. Similarly as will be shown with respect to FIG. 40, light ray 232 from source 17n on side 22 may be directed to optical window 26 by means of total internal reflection at side 24.

Thus directional display apparatus 100 comprises a directional backlight comprising a waveguide 1 comprising first and second, opposed guide surfaces 6, 8 for guiding input light along the waveguide 1, and an array 15 of light sources 15a-n arranged to generate the input light at different input positions in a lateral direction across the waveguide 1. The first guide surface 6 may be arranged to guide light by total internal reflection, second guide surface 8 comprises a plurality of light extraction features 12 arranged to deflect light guided through the waveguide 1 out of the waveguide 1 through the first guide surface 8 as output light and intermediate regions 10 between the light extraction features 12 that are arranged to guide light along the waveguide 1, and the waveguide 1 is arranged to direct the output light into optical windows 26 in output directions that are distributed in a lateral direction in dependence on the input position of the input light. A transmissive spatial light modulator 48 is arranged to receive the output light from the first guide surface 6 of the waveguide and to modulate it to display an image.

In operation such displays may be arranged to provide high efficiency by directing light to viewing windows near an observer and not wasting light in directions that are not in the region of the observer's eyes. Further such displays can desirably provide high luminance for improved visibility in environments with high ambient illuminance.

The spatial light modulator may be a temporally multiplexed spatial modulator with a frame rate of 120 Hz for example, achieving images comprising primary and secondary images with a 60 Hz frame rate. Such a directional display device may achieve autostereoscopic display through temporal multiplexing as described above.

The first guide surface may be arranged to guide light by total internal reflection and the second guide surface may comprise a plurality of light extraction features oriented to direct light guided through the waveguide in directions allowing exit through the first guide surface as the output light and intermediate regions between the light extraction features that are arranged to guide light through the waveguide. The second guide surface may have a stepped shape comprising facets, that are said light extraction features, and the intermediate regions. The directional backlight may further comprise a rear reflector comprising a linear array of reflective facets arranged to reflect light from the light sources that is transmitted through the plurality of facets of the waveguide, back through the waveguide to exit through the first guide surface into said optical windows. The light extraction features may have positive optical power in the lateral direction.

The waveguide may further comprise an input end, the array of light sources being arranged along the input end. The waveguide may further comprise a reflective end for reflecting input light back through the waveguide, the second guide surface being arranged to deflect light as output light through the first guide surface after reflection from the reflective end. The reflective end may have positive optical power in the lateral direction.

Figure 13A:
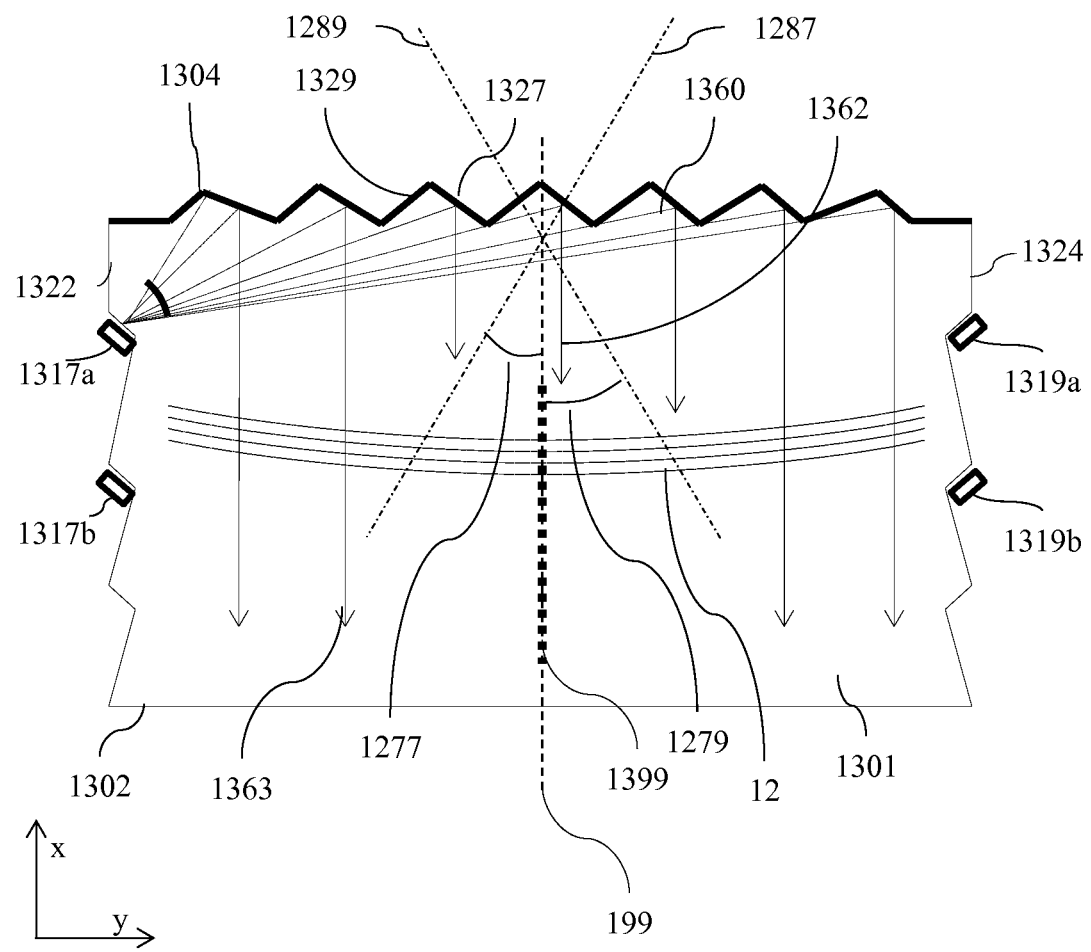
FIG. 13A is a schematic diagram illustrating in front view, an optical valve comprising a side light source arranged to achieve an on-axis optical window, in accordance with the present disclosure.
Figure 13B:
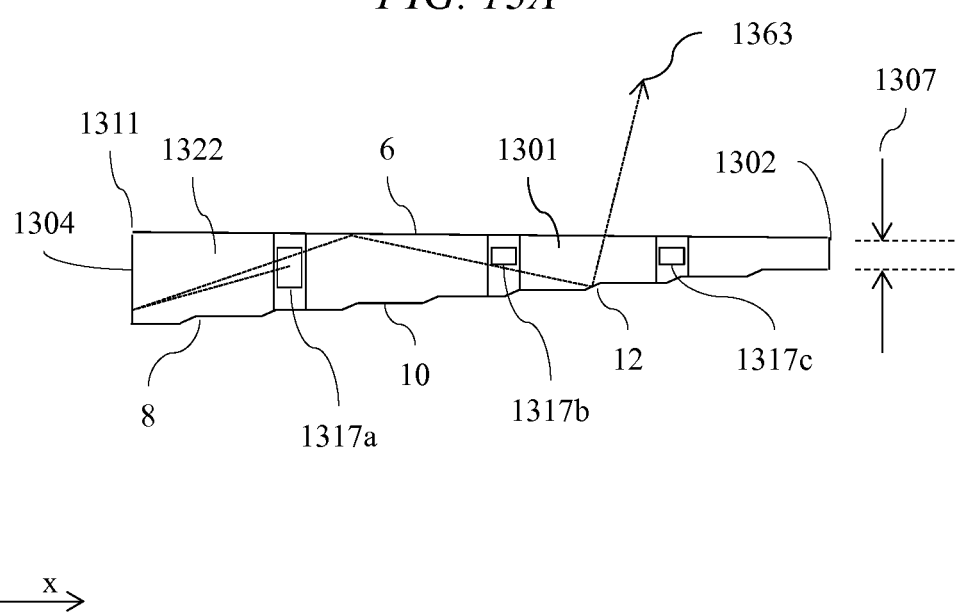
FIG. 13B is a schematic diagram illustrating in side view, an optical valve comprising a side light source arranged to achieve an on-axis optical window, in accordance with the present disclosure.
Figure 13C:
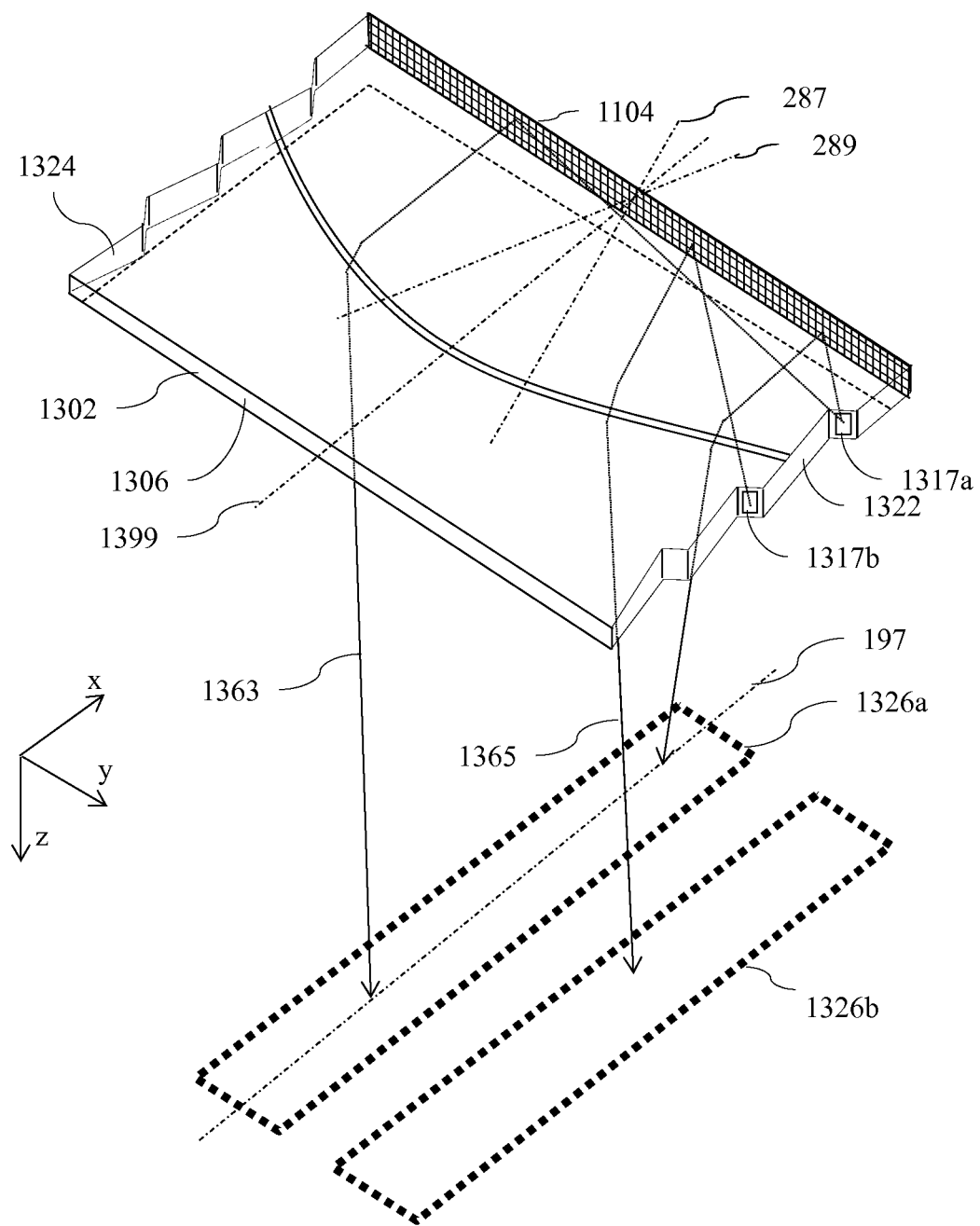
FIG. 13C is a schematic diagram illustrating in perspective view, the formation of first and second optical windows by edge and side light sources with a valve with arrangement similar to that shown in FIGS. 13A-13B, in accordance with the present disclosure.

FIGS. 13A-13C are schematic diagrams illustrating in front, side and perspective views respectively, an optical valve comprising a light source 317a arranged to achieve an on-axis optical window.

Thus as described generally in U.S. Provisional Patent Application No. 62/167,203, entitled "Wide angle imaging directional backlights," filed May 27, 2015, which is herein incorporated by reference in its entirety, a directional display device may comprise a waveguide 1301 that further comprises a reflective end 1304 that is elongated in a lateral direction (y-axis), the first and second guide surfaces 6,8 extending from laterally extending edges of the reflective end 1304, the waveguide 1301 further comprising side surfaces 1322, 1324 extending between the first and second guide surfaces 6,8, and wherein the light sources include an array 1317 of light sources 1317a-n arranged along a side surface 1322 to provide said input light through that side surface 1322, and the reflective end 1304, comprises first and second facets 1327, 1329 alternating with each other in the lateral direction, the first facets 1327 being reflective and forming reflective facets of a Fresnel reflector having positive optical power in the lateral direction, the second facets 1329 forming draft facets of the Fresnel reflector, the Fresnel reflector 1304 having an optical axis 1287 that is inclined towards the side surface 1322 in a direction in which the Fresnel reflector 1304 deflects input light from the array of light sources 1317 into the waveguide 1301. Thus angle 1277 is non-zero. Similarly the second facets 1329 may be reflective and form reflective facets of a Fresnel reflector having positive optical power in the lateral direction, the Fresnel reflector 1304 having an optical axis 1289 that is inclined towards the side surface 1324 in a direction in which the Fresnel reflector 1304 deflects input light from the array of light sources 1319 into the waveguide 1301. Illustrative light ray 1363 from source 1317a may be arranged to provide optical window 1326a and light ray 1365 from source 1317b may be arranged to provide optical window 1326b. Other layers such as diffusers, prismatic reflection films, retarders and spatial light modulators may be arranged in series with the waveguide 1301 in a similar manner to that described for waveguide 1 in the arrangement of FIG. 12B for example.

Advantageously a thin backlight with low bezel size may be achieved. Such an arrangement has light sources that are not arranged on the long sides of the waveguide 1301 and thus may have small form factor. Further light sources 1317 and 1319 may be arranged with overlapping optical windows, and thus display luminance may be increased.

Figure 14A:
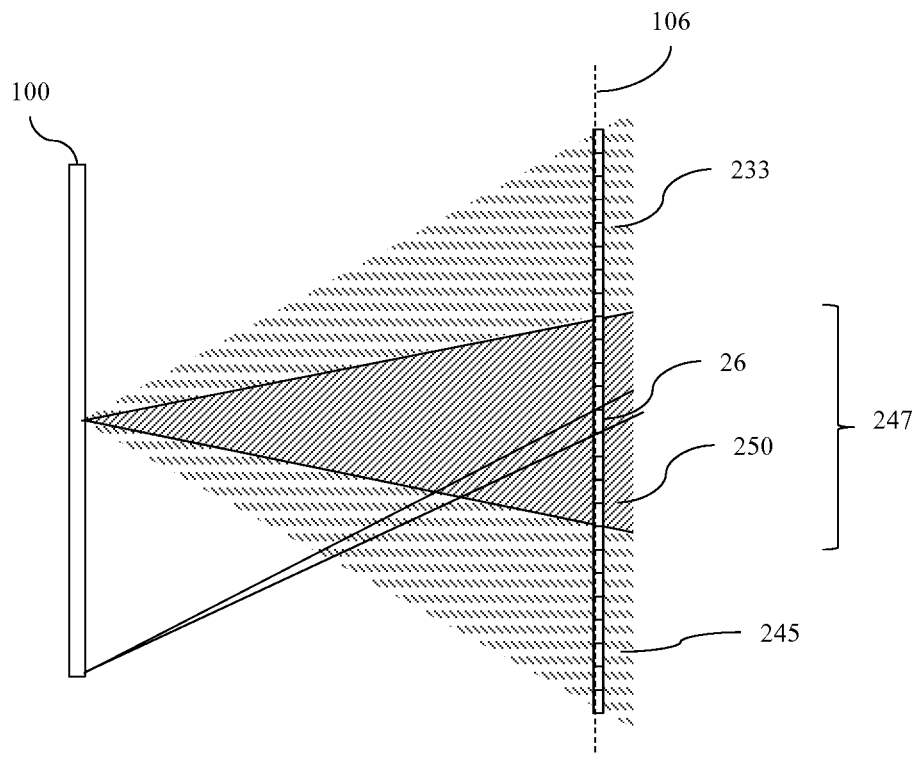
FIGS. 14A-14C are schematic diagrams illustrating in top view, arrangements of viewing windows for a directional display in privacy mode for first and second phases of operation, in accordance with the present disclosure.

FIG. 14A is a schematic diagram illustrating in top view, the arrangement of viewing windows for a directional display in privacy mode, similar to that shown in FIG. 9, however a single two dimensional image is provided in viewing cone 249 and formed by illumination of optical windows 26 in the window plane 106. Thus viewing window 247 is formed from a combination of optical windows 26 from the display 100. In cones 233, 245 outside the primary cone 250 with viewing window 247, illumination of optical windows 26 in the window plane 106 is provided by stray light in the directional backlight system. Such directional light may for example be provided by scatter, aberrations and reflection of light from the input facet 2 of the waveguide 1. Thus the stray light luminance of the display 100 when observed from within the viewing window 245 may be finite, for example between 1% and 20% of the peak luminance of the viewing window 247.

In the present embodiments, an optical window is formed by a single light source of the array 15 of light sources 15a-n. A viewing window is formed by a combination of optical windows.

Thus a control system 70, 72, 74, 76 shown in FIG. 12A is capable of controlling the spatial light modulator 48 and capable of selectively operating of light sources 15a-n to direct light into corresponding optical windows 26, wherein stray light in the directional backlight is directed in output directions, illustrated by cones 233, 245, outside the optical windows 26 corresponding to selectively operated light sources.

Control of stray light luminance, or cross talk, is described in U.S. patent application Ser. No. 13/836,443, "Crosstalk suppression in a directional backlight," filed Mar. 15, 2013 and incorporated herein by reference.

FIG. 14A shows the operation of a privacy display comprising off-axis luminance control as will be described with reference to FIGS. 15A-15E.

Further FIG. 14A shows the operation of a privacy display in a first phase of operation comprising off-axis luminance and contrast control as will be described with reference to FIGS. 16A-16E.

Figure 14B:
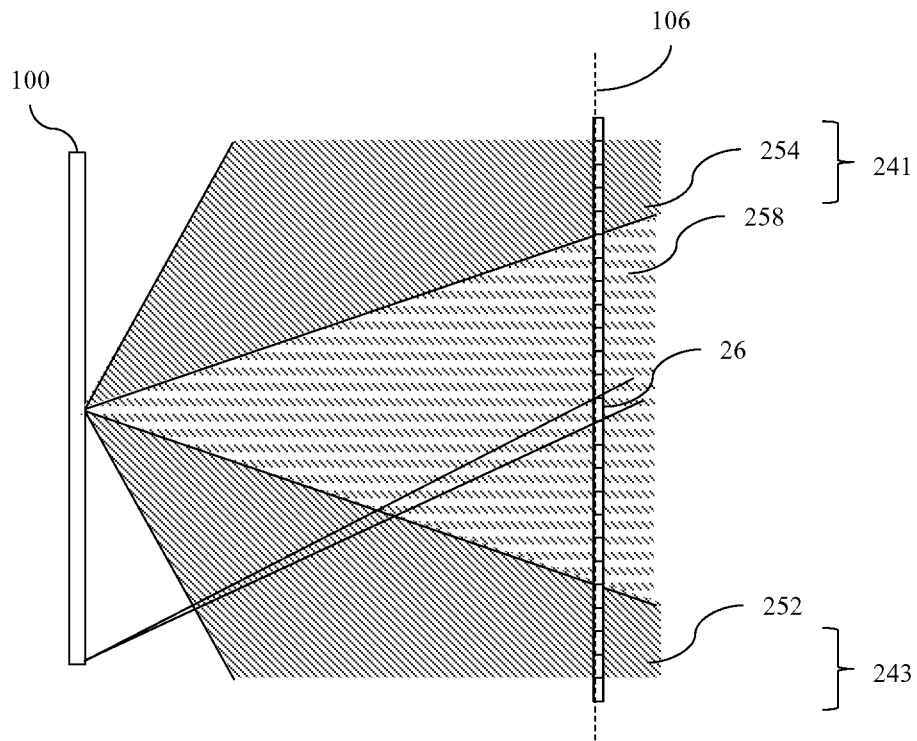
Figure 14C:
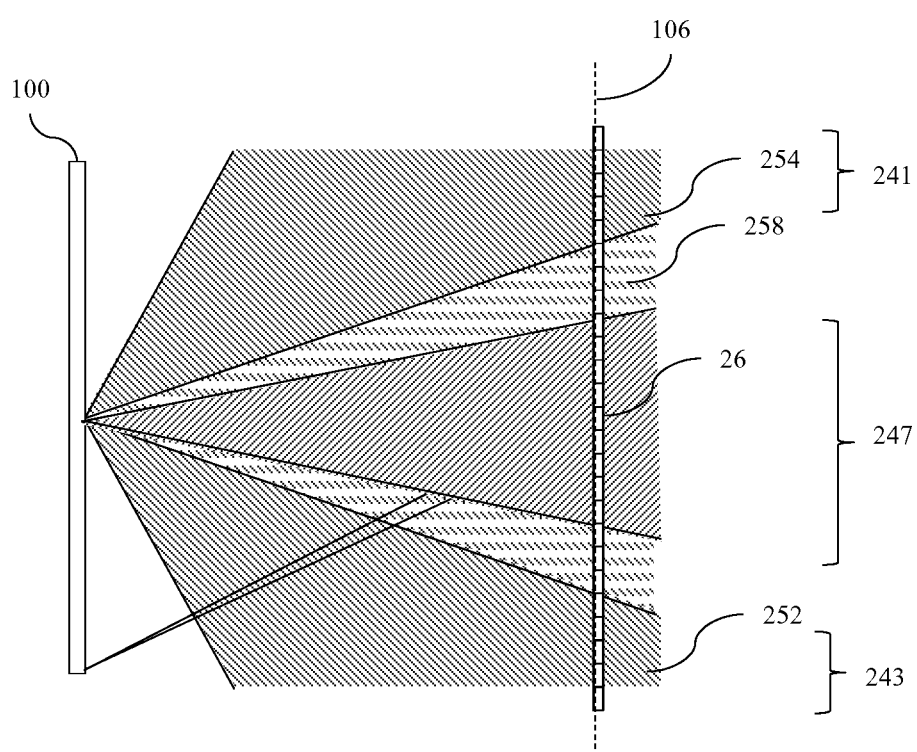

FIG. 14B is a schematic diagram illustrating in top view, the arrangement of optical windows for a directional display in the second phase of operation of a privacy mode of the present embodiments. In a second phase of operation, secondary viewing windows 241, 243 shown with secondary viewing cones 252, 254 for a single point on the display are provided to either side of the viewing windows 247. FIG. 14C is a schematic diagram illustrating in top view, the arrangement of optical windows for a directional display in the first and second phases of operation of a privacy mode of the present embodiments. Between the viewing cones 250 and 252, 254 transition cones 256, 258 are provided from which the display luminance will appear to change between the primary and secondary cones.

In the present embodiments typically the primary observer may be arranged within the primary viewing cone 250 and secondary observers may be arranged within secondary viewing cones 254. The position of a primary observer may be within the primary optical window that may be a primary viewing window provided by multiple optical windows 26. The secondary observer may be outside the primary optical window and may be within a secondary optical window that may be a secondary viewing window provided by multiple optical windows 26. For the purposes of the present embodiments, the primary optical window (which may a primary viewing window comprising multiple optical windows) may be defined as the width of the luminance distribution at which the intensity drops to less than 50% of the peak luminance. Typically the stray light may provide a relatively uniform luminance distribution, due to the substantially uniform distribution of light across the input side 2 that is reflected.

Advantageously the arrangements of FIGS. 14A-C as well as wide angle modes, high efficiency modes, high luminance modes and autostereoscopic modes may be switchable by means of control of the array 15 of light sources.

Figure 15A:
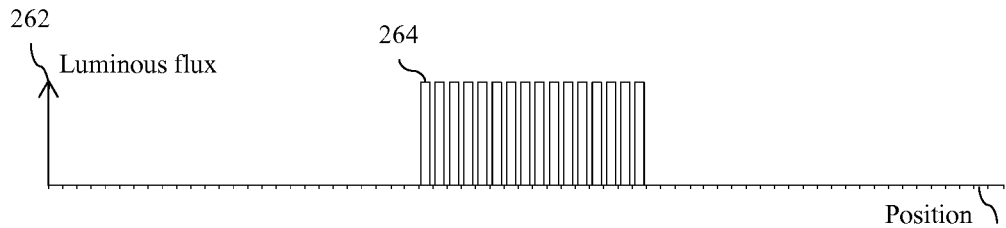
FIGS. 15A-15E are schematic diagrams illustrating the operation of a directional display in privacy mode wherein a primary image is provided on the spatial light modulator in at least one phase of operation, in accordance with the present disclosure.

FIGS. 15A-15E are schematic diagrams illustrating the operation of a directional display in privacy mode wherein a primary image is provided on the spatial light modulator in at least one phase of operation. Such arrangements may be used for example in cooperation with a viewing window arrangement such as shown in FIG. 14A for a low luminance privacy display, or as shown in FIG. 14B for an obscured image privacy display as described herein. FIG. 15A shows the relative luminous flux 262 of the light sources 15a-n in array 15 of light sources against position 260 to achieve primary illumination structure in the window plane. Accordingly this is an example in which there are plural primary light sources. Thus individual light source flux 264 may be uniform in a region near the center of the array, and zero in other regions. Alternatively the flux 264 may vary across the illuminated elements to provide a graded luminance with viewing angle within the primary viewing cone 250.

Figure 15B:
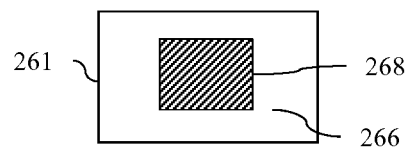
Figure 15C:
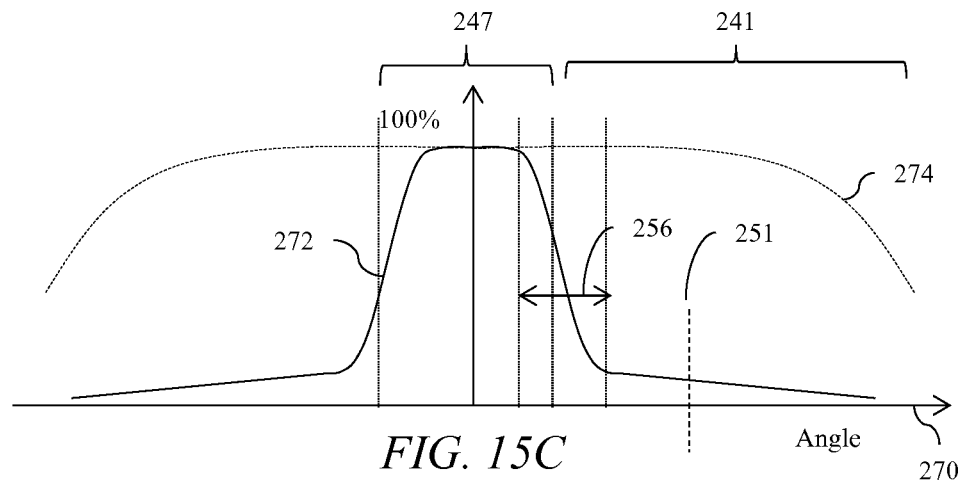

FIG. 15B shows an example displayed primary image 261 on the spatial light modulator 48 that comprises a low transmittance region 268, for example 0% transmittance and high transmittance region 266, for example 100%. FIG. 15C shows a graph that illustrates the variation of relative luminance and contrast with viewing angle 270 of the display 100. Thus luminance distribution 272 comprises a central viewing window 247 and stray light region 241 wherein the luminance is non-zero, for example 10% at the angular position 251 in the following illustrative example. In operation, the amount of stray light may vary within the region 241, as shown. However, as stray light may be determined mainly be return reflections from the input side 2 of the waveguide 1, relatively uniform output may be achieved in these regions. The primary viewing window may have an edge width 256.

FIG. 15C further illustrates a distribution 274 of contrast of the perceived image seen on the spatial light modulator 48 with viewing angle. Such contrast may be substantially uniform on-axis but may fall for off axis positions as will be described further for FIGS. 27-28 below.

Figure 15D:
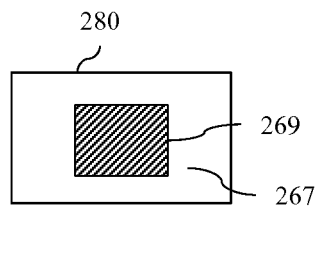
Figure 15E:
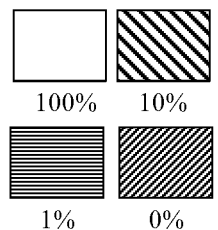
Figure 15E:
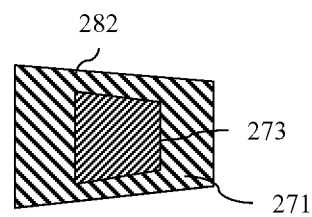

FIG. 15D illustrates the perceived primary image 280 for a primary observer in the primary viewing window 247, such that regions 267, 269 have relative luminances of 100%, 0% that are substantially equivalent to relative transmittances of regions 266, 268 respectively. FIG. 15E shows, using a representation of perspective, the perceived secondary image 282 for angular position 251 comprising regions 271, 273. Region 273 may have substantially 0% luminance, whereas region 271 may have 10% luminance in this illustrative example, being the transmittance of region 266 modulated by the stray light luminance at angular position 251.

Thus the arrangement of FIGS. 15A-15E may provide a privacy mode operation in which the luminance for a secondary observer is 10% of the luminance for the primary observer. Such an image luminance may provide obscuration of the primary image to the secondary observer. In particular, obscuration may be provided by (i) frontal reflections and (ii) adaptation of the eye to ambient lighting levels that make the display appear to be dark. The contrast of the primary image to the secondary observer may be substantially the same and thus features may still be visible.

It may be desirable to provide further obscuration of the primary image to the secondary observer as will be described below. In the present embodiments, the arrangement of FIG. 15A-15E may be provided in a first phase of operation of a temporally multiplexed display. A second phase of operation is provided to achieve further image obscuration.

Figure 16A:
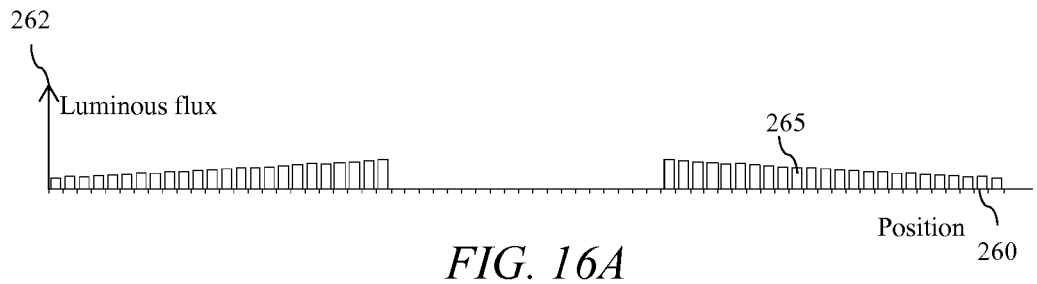
FIGS. 16A-16E are schematic diagrams illustrating the operation in a second phase of a directional display in privacy mode wherein a primary image is provided on the spatial light modulator in a first phase and a secondary image is provided on the spatial light modulator in a second phase, in accordance with the present disclosure.
Figure 16B:
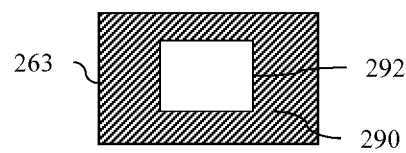
Figure 16C:
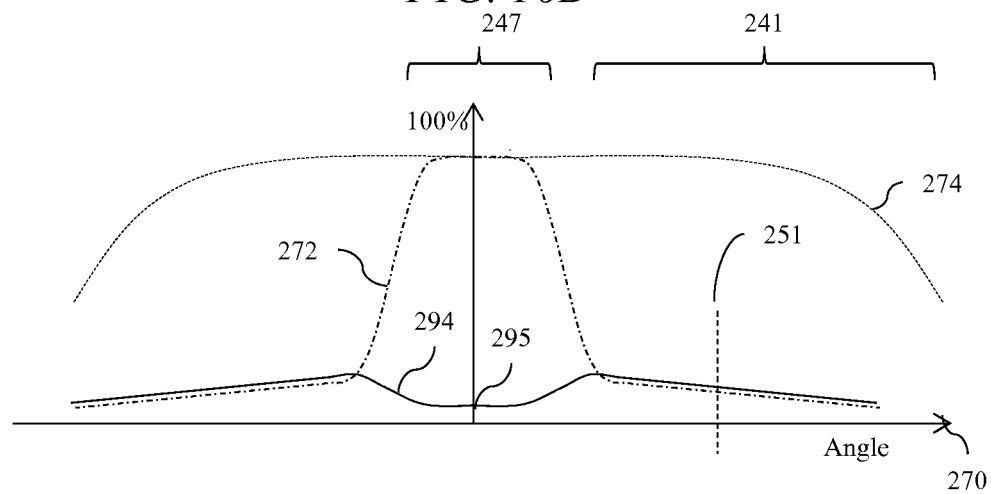

FIGS. 16A-16E are schematic diagrams illustrating the operation in a second phase of a directional display in privacy mode wherein a primary image is provided on the spatial light modulator in a first phase and a secondary image is provided on the spatial light modulator in a second phase of operation. This is an example in which there are plural secondary light sources. FIG. 16A shows that the light sources of array 15 are operated so that the secondary light sources output light with differing luminous flux. As a result, there is achieved secondary illumination structure with luminous flux 262 such that light source flux 265 is arranged to provide substantially the same luminance as the stray light from the primary illumination in the stray light region 241. As shown in FIG. 16C, the luminance structure 294 may be substantially matched to structure 272 in the stray light region 241, and thus in the illustrative embodiment may achieve a luminance of 10% at angular position 251. The angular contrast distribution 274 in the secondary phase is the same as for the primary phase. FIG. 16B shows primary image 263 with 0% transmittance in the region 290 and 100% transmittance in the region 292. Thus the displayed secondary image 263 may be inverted compared to the displayed primary image 261.

Figure 16D:
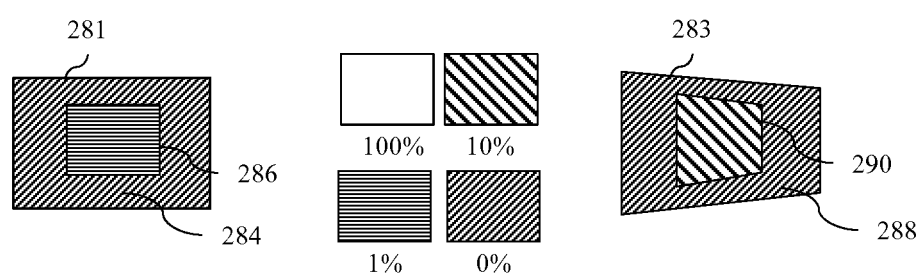

FIG. 16D illustrates the perceived primary image 281 to the primary observer 300 comprising region 284 with luminance 0% and region 286 with luminance 1%. The on-axis luminance 295 of region 286 is determined by the stray light from the secondary illumination pattern (determined by flux 265 distribution) that falls within the primary viewing window 247, and in this illustrative example is typically 10% of the 10% transmittance, thus 1%. Thus the perceived contrast of the primary image may be slightly degraded in the second phase, for example 100:1 or less. Reducing the stray light luminance 295 may increase the perceived primary image contrast.

Figure 16E:
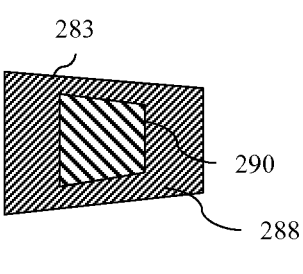

FIG. 16E illustrates a representation of perspective of the perceived secondary image 283 comprising region 288 with 0% luminance and region 290 with 10% luminance, determined by the SLM 48 transmittance for the region 292 and luminance at position 251.

It will be observed that the perceived image 283 in the second phase is substantially the inverse of the perceived image 282 in the first phase. As will be described below, the images combine to achieve a perceived secondary image with very low contrast. Advantageously a high degree of obscuration of the primary image to a secondary observer in the secondary viewing windows 241 may be provided due to contrast reduction.

Figure 16F:
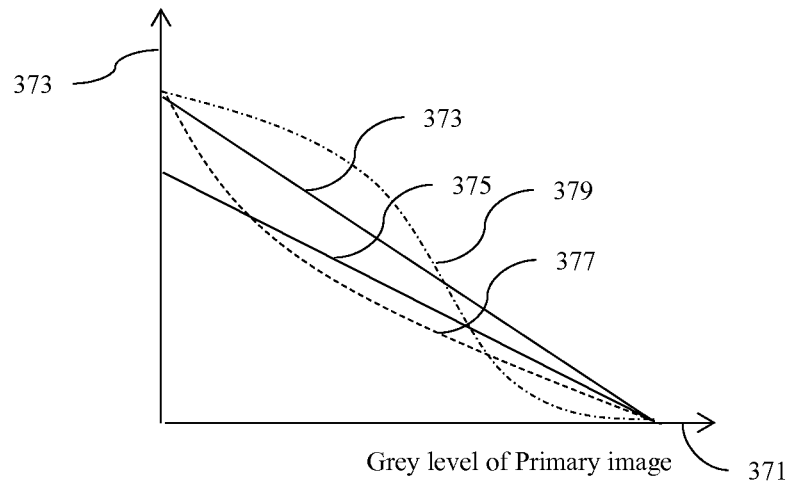
FIG. 16F is a schematic graph illustrating the relationship between the grey levels of primary and second images, in accordance with the present disclosure.

FIG. 16F is a schematic graph illustrating the relationship between the grey levels of primary and second images. The inverted copy of the primary image may comprise a copy of the primary image inverted by an inversion function. Thus a graph of primary image grey level 371 and secondary image grey level 373 may be linear as shown by inversion function 373. Inversion function 375 may be linear with have a reduced grey level which may be compensated by control of luminous flux of secondary light sources. Further the inversion function may be non-linear such as functions 377, 379. Advantageously, the grey scale mapping can be adjusted to minimise visibility of the combined primary and secondary images over the integration period of the observer's vision.

Figure 17:
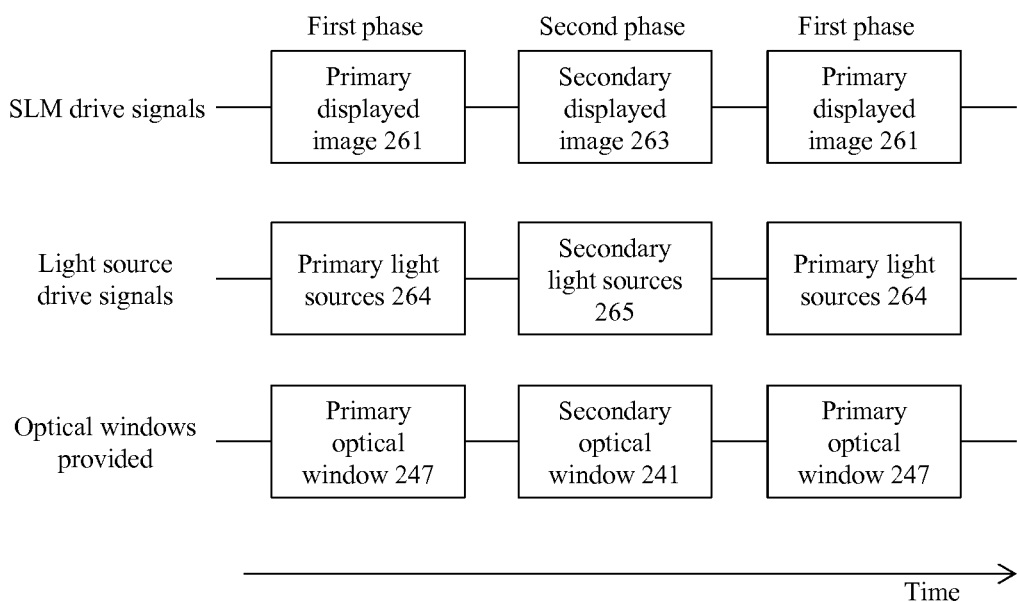
FIG. 17 is a schematic diagram illustrating sequence of image and illumination presentation to the spatial light modulator and light source array, in accordance with the present disclosure.

FIG. 17 is a schematic diagram illustrating sequence of image and illumination presentation to the spatial light modulator and light source array. FIG. 17 shows the sequence of presentation of primary and secondary displayed images for first and second phases in synchronization with illumination of primary and secondary light sources 264, 265. The secondary image 263 may comprise an inverted copy of the primary image 261 arranged to at least partly cancel the primary image 261 that modulates the stray light 241 directed outside the primary optical window 247, as perceived by the primary observer 300.

The control system is arranged to control the spatial light modulator 48 and the array of light sources 15a-n in synchronization with each other so that: (a) the spatial light modulator 48 displays a primary image 261 while at least one primary light source 264 is selectively operated to direct light into at least one primary optical window 247 for viewing by a primary observer 300, and (b) in a temporally multiplexed manner with the display of the primary image 261, the spatial light modulator 48 displays a secondary image 263 while at least one light source 265 other than the at least one primary light source 264 is selectively operated to direct light into secondary optical windows 241 outside the at least one primary optical window 247

Advantageously obscuration may be achieved by contrast reduction for the secondary image.

Figure 18A:
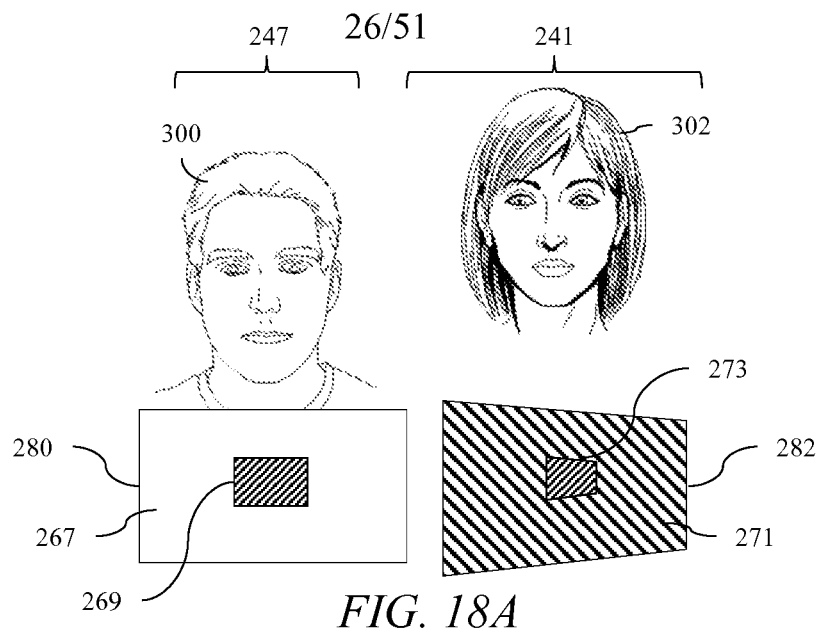
FIGS. 18A-18C are schematic diagrams illustrating perspective front views of the perceived image appearance for a privacy display with first and second phases comprising respective primary and secondary images further comprising cross talk from the secondary image to the primary observer, in accordance with the present disclosure.
Figure 18B:
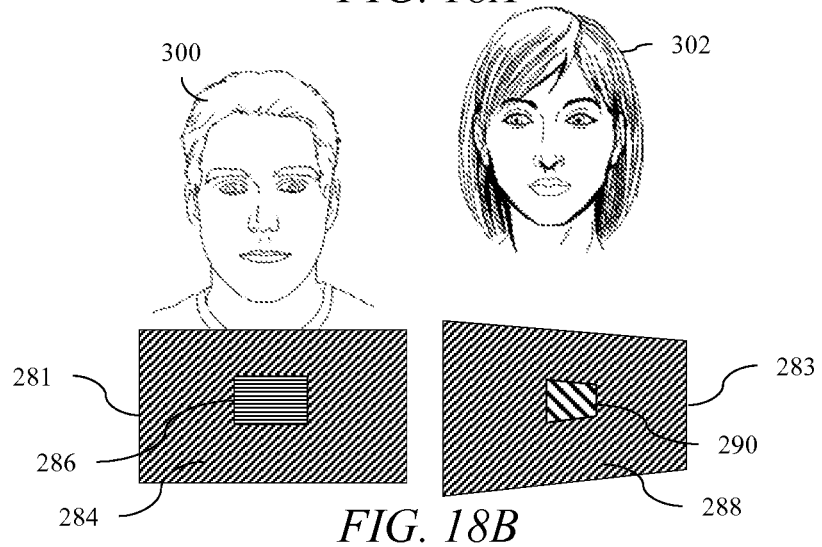
Figure 18C:
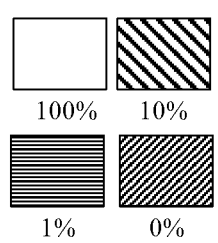
Figure 18C:
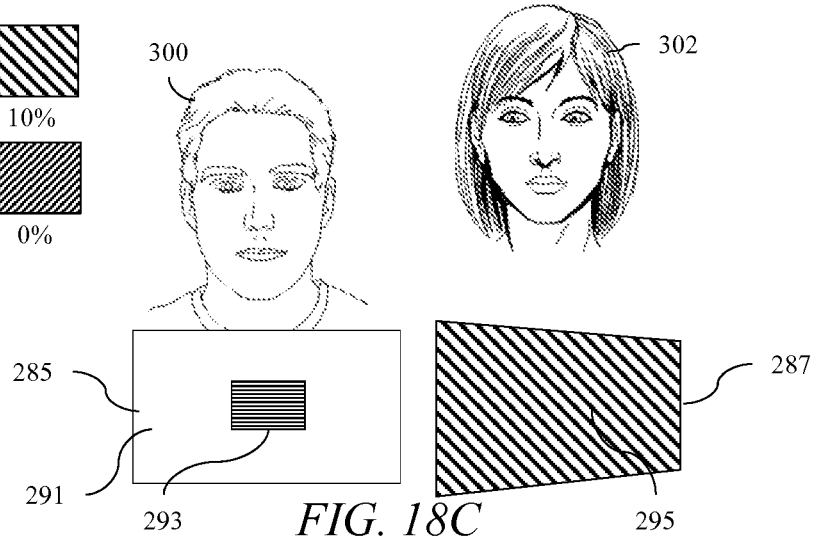

FIGS. 18A-18C are schematic diagrams illustrating representation of perspective for front views of the perceived image appearance for a privacy display with first and second phases comprising respective primary and secondary images, further comprising cross talk from the secondary image to the primary observer.

FIG. 18A shows a first phase of operation. Primary observer 300 perceives a primary image 280 from a viewing position within at least one primary optical window, illustrated by viewing window 247. Secondary observer 302 in viewing window 241 sees image 282 that has the same contrast distribution as the primary image 280 and has a luminance that is provided by the stray light of the primary illumination luminous flux 264 distribution.

FIG. 18B shows a second phase of operation. Secondary observer 302 perceives a secondary image 283 from a viewing position within at least one secondary optical window, illustrated by viewing window 241. Primary observer 300 in primary viewing window 247 sees image 281 that has the same contrast distribution as the secondary image 283 and has a luminance that is provided by the stray light of the secondary illumination luminous flux 265 distribution.

FIG. 18C shows the combined perceived image 285 as seen by primary observer 300 and combined perceived image 287 as seen by secondary observer 302. Thus, the secondary image 287 as perceived by a secondary observer 302 outside the primary optical window obscures the primary image 280 that modulates the stray light directed outside the primary optical window.

Otherwise stated there may be provided a method of obscuring a primary image that modulates stray light directed outside the primary optical window in a directional display apparatus comprising a directional backlight, wherein stray light in the directional backlight is directed in output directions outside the optical windows corresponding to selectively operated light sources; and a transmissive spatial light modulator arranged to receive the output light from the first guide surface of the waveguide and to modulate it to display an image. The method may comprise controlling the spatial light modulator and the array of light sources in synchronization with each other so that: (a) the spatial light modulator displays a primary image while at least one primary light source is selectively operated to direct light into at least one primary optical window for viewing by a primary observer, and (b) in a temporally multiplexed manner with the display of the primary image, the spatial light modulator displays a secondary image while light sources other than the at least one primary light source are selectively operated to direct light into secondary optical windows outside the at least one primary optical window, the secondary image as perceived by a secondary observer outside the primary optical window obscuring the primary image that modulates the stray light directed outside the primary optical window.

Figure 19A:
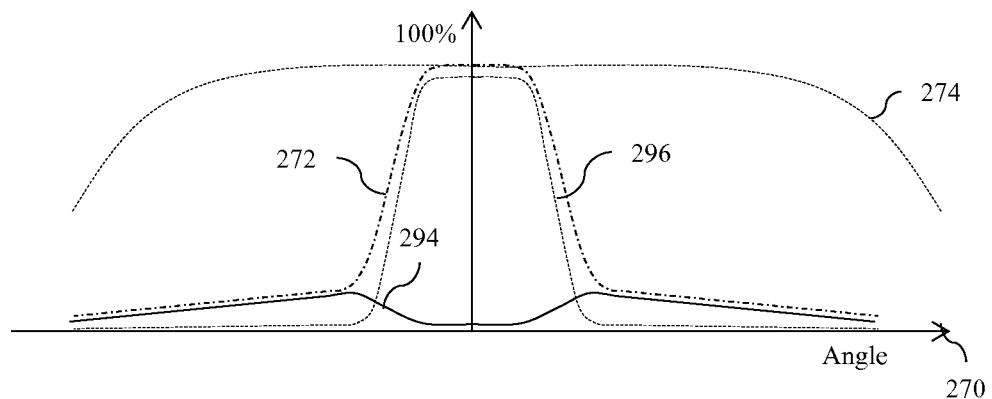
FIG. 19A is a schematic diagram illustrating a graph of display luminance and cross talk for the arrangement of FIGS. 17A-17C, in accordance with the present disclosure.

FIG. 19A is a schematic diagram illustrating a graph of display luminance and contrast for the arrangement of FIGS. 18A-18C. Thus angular luminance distribution 272 may be provided in a first phase of operation and angular luminance distribution 294 may be provided in a second phase of operation. The contrast of the perceived primary image 285 to the primary observer 300 may have an angular distribution 296 that has a slightly on-axis contrast in comparison to a single phase operation display with angular contrast distribution 274. The contrast that is seen by an observer of the secondary perceived image 287 outside of the primary optical window 247 is substantially reduced in luminance and contrast. Advantageously the primary image is substantially obscured to the secondary image in comparison to the perceived image 282 of FIGS. 15E and 18A.

The primary image may be a two dimensional image as described above. It may be desirable to provide a privacy mode of operation for a three dimensional image.

Figure 19B:
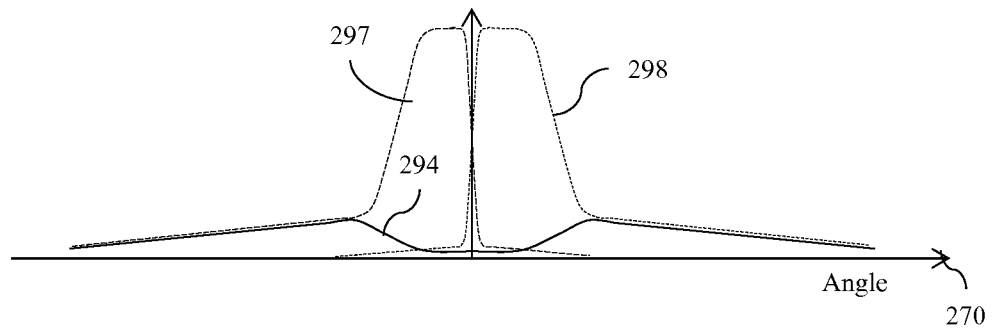
FIG. 19B is a schematic diagram illustrating a graph of display luminance and cross talk for a stereoscopic privacy display, in accordance with the present disclosure.
Figure 19C:
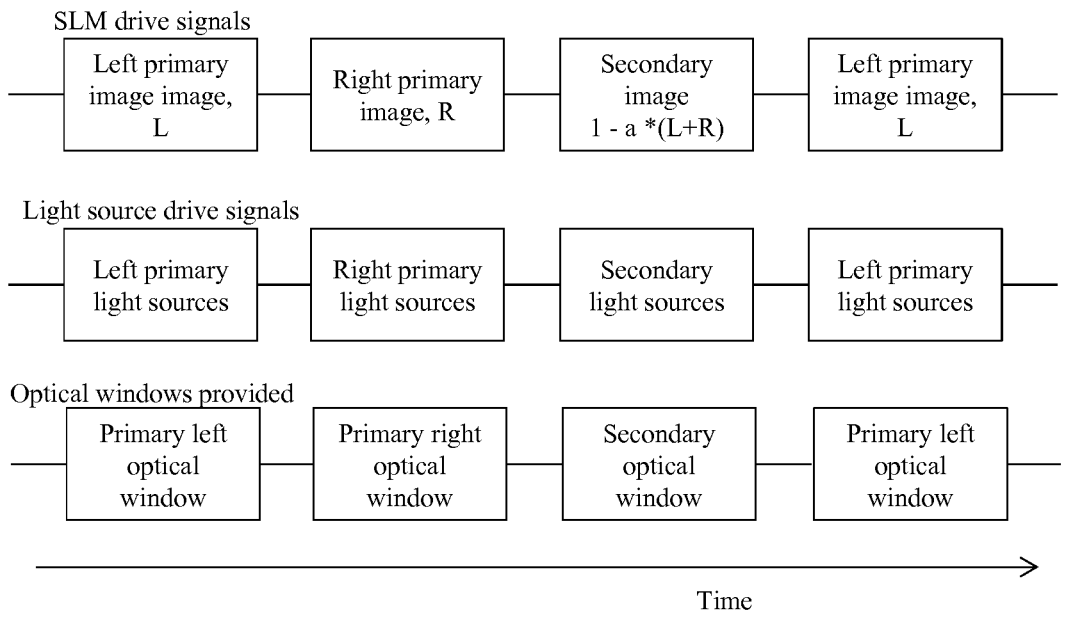
FIG. 19C is a schematic diagram illustrating sequence of image and illumination presentation to the spatial light modulator and light source array for a stereoscopic privacy display, in accordance with the present disclosure.

FIG. 19B is a schematic diagram illustrating a graph of display luminance and cross talk for an autostereoscopic privacy display; and FIG. 19C is a schematic diagram illustrating sequence of image and illumination presentation to the spatial light modulator and light source array for an autostereoscopic privacy display.

In one exemplary embodiment, in a first phase of operation, a left eye primary image may be provided in synchronization with a left eye primary optical window with angular luminance distribution 297. In a second phase of operation a right eye primary image may be in synchronization with a right eye primary optical window with angular luminance distribution 298.

In a third phase of operation a secondary image may be provided in synchronization with a secondary at least one optical window outside the at least one primary optical window and shown by distribution 294. The secondary image may be a two dimensional image. The transmittance of the secondary image may be arranged on a pixel-pixel basis by 1−a(L+R) where a is a constant, L is the left pixel transmittance and R is the right pixel transmittance and may be arranged to provide obscuration of the resultant primary autostereoscopic image to a secondary observer 302 outside the primary left and right optical windows.

Thus the primary image may be a three dimensional image comprising a left eye image and a right eye image. The control system 70, 72, 74, 76 may be arranged to control the spatial light modulator 48 to display the primary image by (a1) controlling the spatial light modulator 48 to display the left eye image and the right eye image in a temporally multiplexed manner, and (a2) in synchronization with the control of the spatial light modulator 48, controlling the array 15 of light sources 15a-n to selectively operate different primary light sources 264 to direct light into at least one primary optical window for viewing by the left and right eyes of the primary observer 300, when the spatial light modulator 48 displays the left eye image and the right eye image, respectively.

Advantageously an autostereoscopic display may be provided that can achieve autostereoscopic 3D operation for a primary observer and obscuration of the 3D image for a secondary observer outside the primary optical windows 297, 298. Further, three phases of operation may be employed to achieve the privacy function as the left and right eye images may be obscured in substantially a single phase.

It may be desirable to provide control of viewing freedom for the primary observer.

FIGS. 20A-20B, 21, 22 are schematic diagrams illustrating graphs of angular luminance distributions for first and second phases.

Figure 20A:
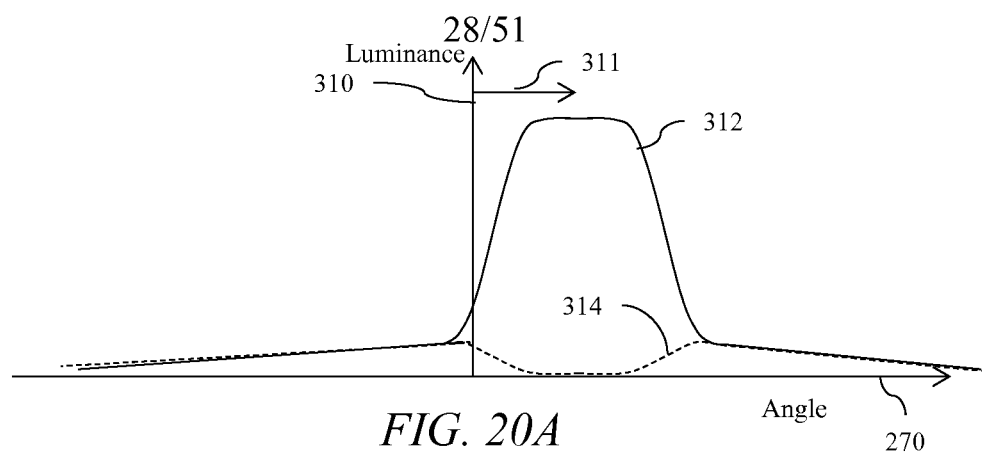
FIGS. 20A-20B, 21, and 22 are schematic diagrams illustrating graphs of angular luminance distributions for first and second phases, in accordance with the present disclosure.

The directional display apparatus may further comprise a sensor system 70 arranged to detect the position of the head of the primary observer 300, the control system being arranged to control the light sources 15a-n in accordance with the detected position of the head of the observer 300. As shown in FIG. 20A the primary optical window 312 may have an adjusted angular distribution that is shifted by angle 311 in order to maintain a primary image with obscured image for secondary observer 302 outside the primary optical window 312. Advantageously viewer freedom can be increased in the lateral direction.

Figure 20B:
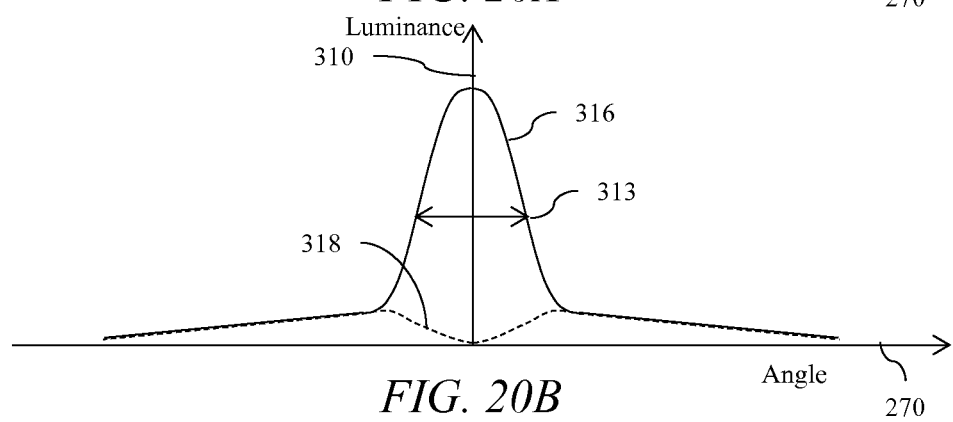

FIG. 20B illustrates that the width 313 of the primary optical window 316 may have a width that is varied. The variation can be achieved through manual control or through the use of head tracking in which wide viewing freedom is not required as in a passive illumination system. Advantageously the amount of stray light in the system may be reduced, increasing obscuration of the secondary image. Further the region over which a secondary observer may see the un-obscured primary image is reduced.

Figure 21:
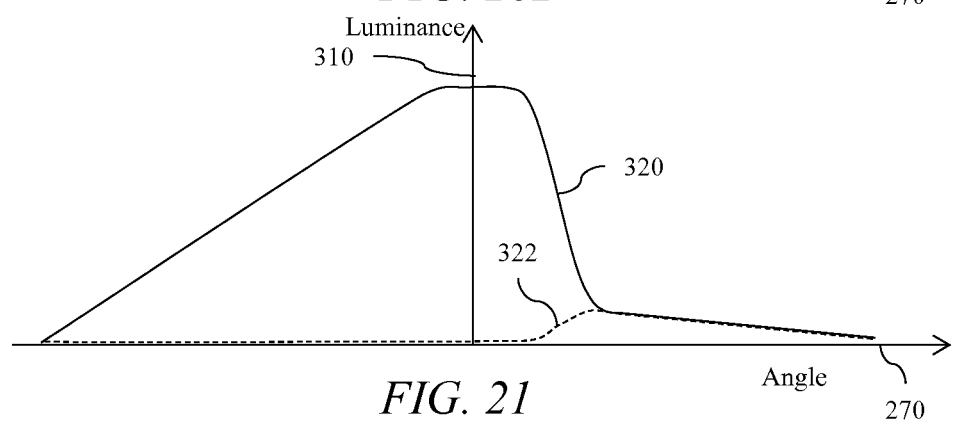

FIG. 21 illustrates that the profile 313 of the primary optical window 310 may be varied. For example a secondary optical window with luminance distribution 322 may be provided on one side of the display only. Advantageously a secondary observer may be positioned on one side with an obscured image, while a non-obscured image may be seen by a third observer on the other side to the secondary observer 302. Thus the primary observer may share display with the third observer while remaining private from the secondary observer 302.

Figure 22:
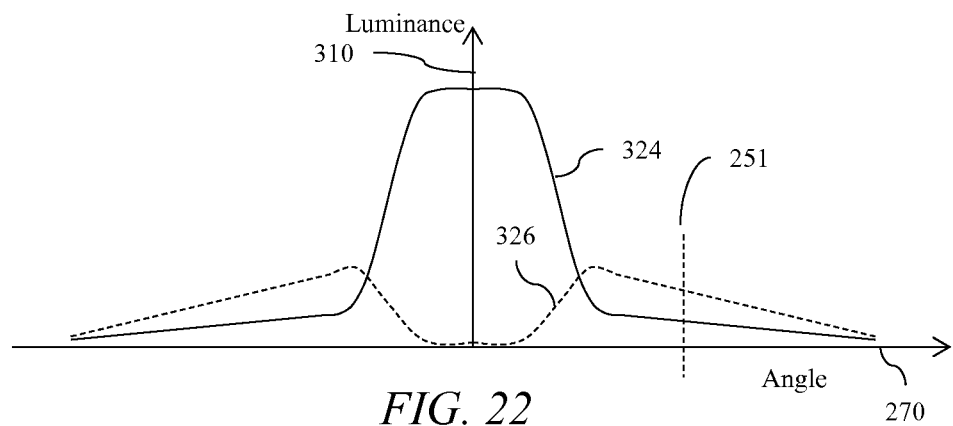

FIG. 22 illustrates that the profile 326 of the secondary optical window 310 may be provided with a higher luminance at position 251 compared to the luminance of the stray light from the primary optical window shown by distribution 324. The secondary image 263 may have a further transmittance reduction applied to increase the obscuration effect such that the resultant luminances are matched. Advantageously, the control of image transmittance may be more conveniently tuned than the control of light source flux 265 and thus secondary perceived image contrast may be further fine-tuned to achieve greater obscuration of the primary image to the secondary observer 302.

It may be desirable to increase the contrast of a perceived primary image for the primary observer 300 when no secondary observer 302 is observing the display. Known face detectors and trackers may be arranged to detect the presence or not of secondary observers.

Figure 23A:
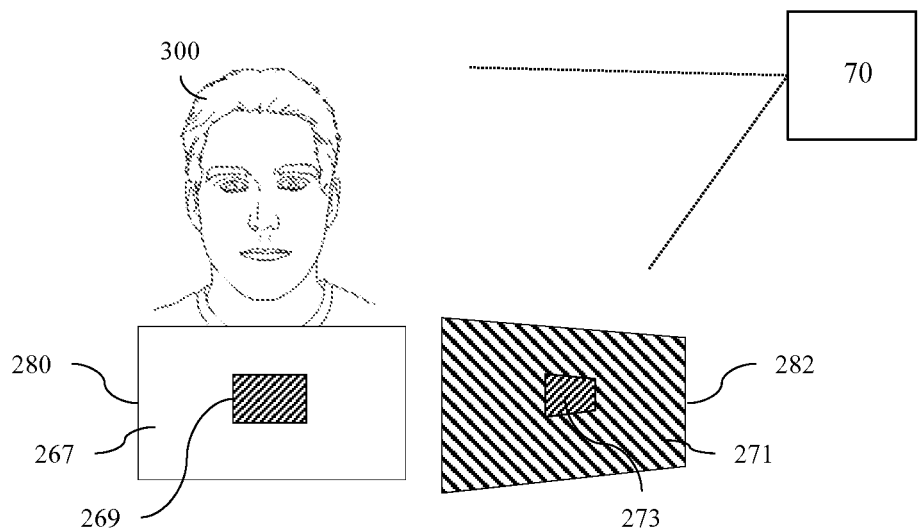
FIGS. 23A-23B are schematic diagrams illustrating perspective front views of the perceived image appearance for a privacy display in the second phase for non-detection and detection of a secondary observer respectively, in accordance with the present disclosure.
Figure 23B:
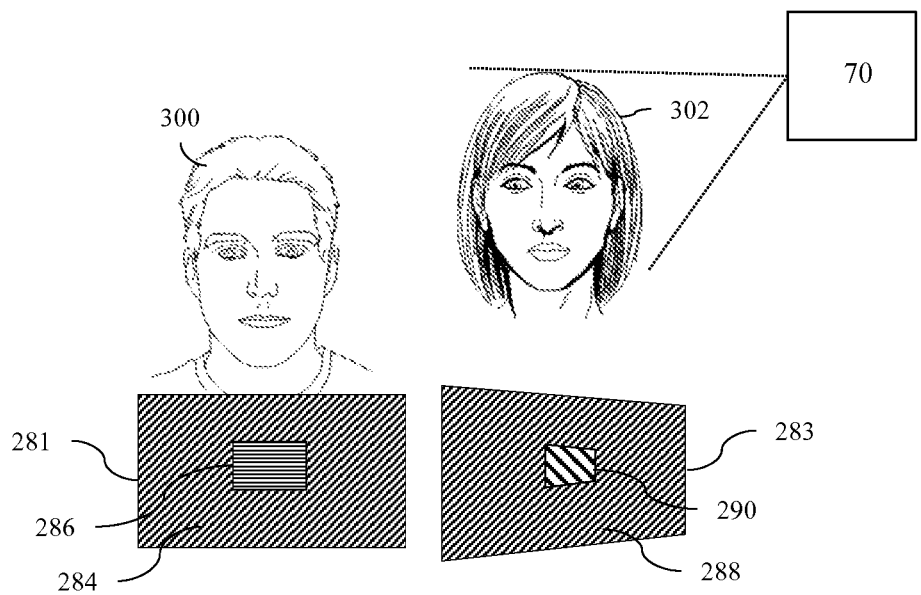

FIGS. 23A-23B are schematic diagrams illustrating perspective front views of the perceived image appearance for a privacy display in the second phase for non-detection and detection of a secondary observer respectively. The sensor system 70 may be arranged to detect a secondary observer 302 outside the primary optical window 247, and the control system 72, 74, 76 may be arranged, in response to detecting the secondary observer 302, to perform said control of the spatial light modulator 48 and the array of light sources 15a-n in synchronization with each other so that the spatial light modulator 48 displays the primary image 261 and the secondary image 263 in a temporally multiplexed manner, and, in response to not detecting the secondary observer 302, to control the spatial light modulator 48 and the array of light sources so that the spatial light modulator displays the primary image 261 while at least one primary light source is selectively operated to direct light into at least one primary optical window 247 for viewing by a primary observer 300, without displaying the secondary image 263 in a temporally multiplexed manner. Advantageously the primary observer may be provided with a higher contrast image. Further, the display may not be required to be temporally multiplexed so that the luminance of the display may be increased by driving the light sources 15a-n with continuous drive current, in comparison to the pulsed current drive scheme of temporal multiplexing.

Figure 24:
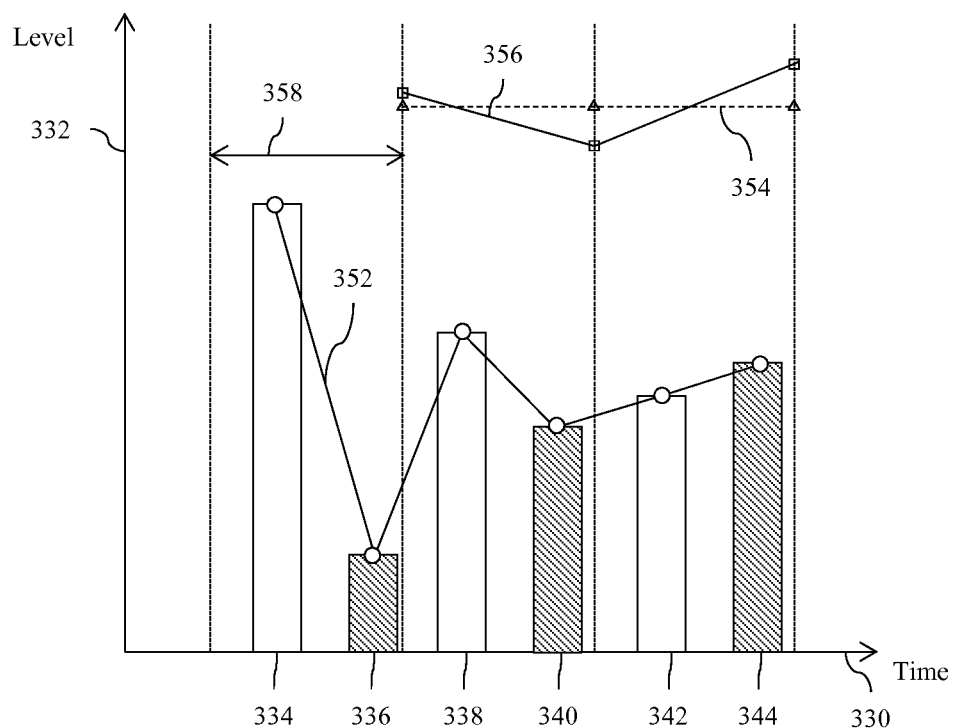
FIGS. 24-25 are schematic diagrams illustrating graphs for first and second addressing schemes respectively of the variation of a pixel intensity level with time, the variation of addressing signal with time, and the variation of integrated luminance with time, in accordance with the present disclosure.
Figure 25:
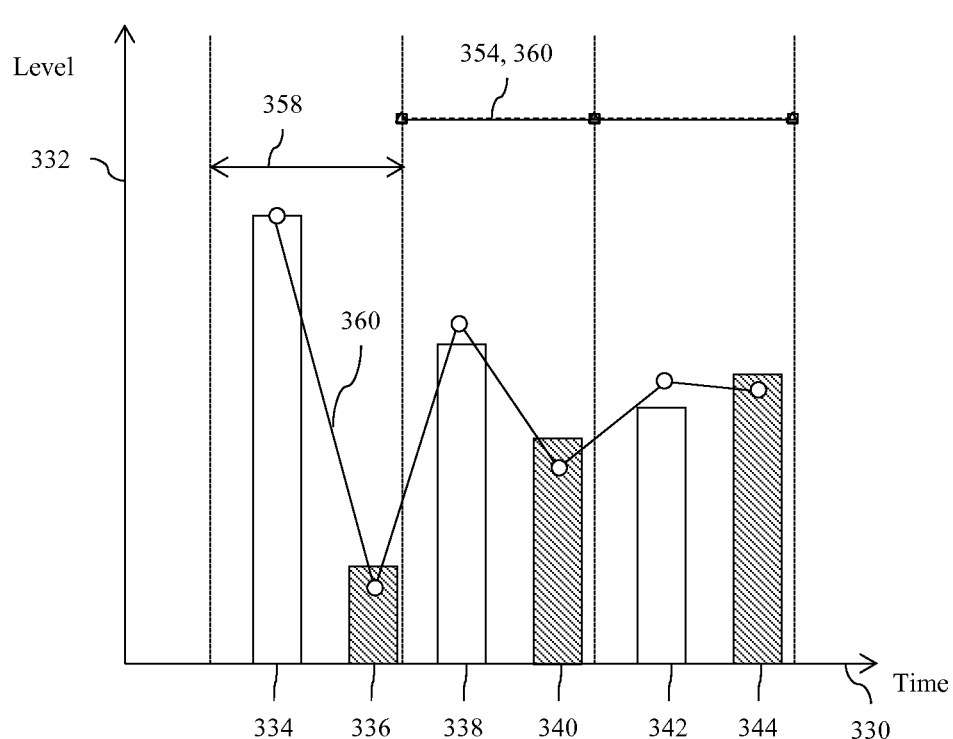

FIGS. 24-25 are schematic diagrams illustrating graphs for first and second addressing schemes respectively of the variation of a pixel transmittance level with time, the variation of addressing signal level with time, and the variation of integrated luminance level with time. FIG. 24 shows that for a single pixel, the desired transmittance may vary as 334, 338, 342 for the pixel operating in the first phase and 336, 340, 344 for the pixel when operating in the second phase, with a phase period of 358. It may be considered that the pixel drive signals may be provided by function 352, matched to desired grey scale variation. The temporal greyscale response characteristics of spatial light modulators 48, such as liquid crystal displays, typically a resultant integrated pixel transmittance function 356 rather than desired non-varying function 354. FIG. 25 illustrates that the pixel drive function 360 may be desirably applied to achieve linear functions 354, 360 in resultant pixel transmission integrated across phase period 358. Advantageously the secondary image may be driven to provide a correct inversion of the primary image for fast switching spatial light modulators 48.

Figure 26A:
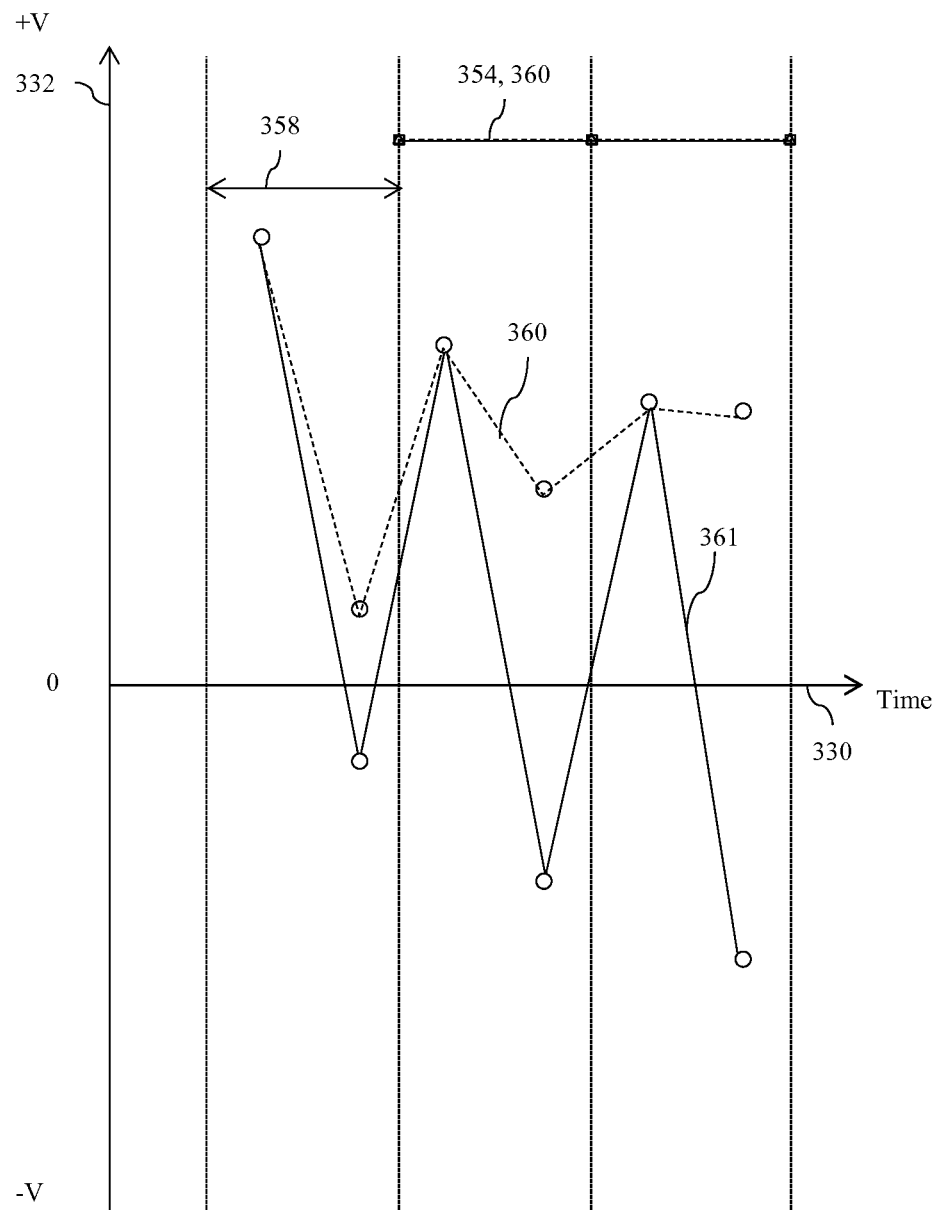
FIGS. 26A-26B are schematic diagrams illustrating graphs of first and second addressing schemes respectively of the variation of an addressing signal with time, in accordance with the present disclosure.
Figure 26B:
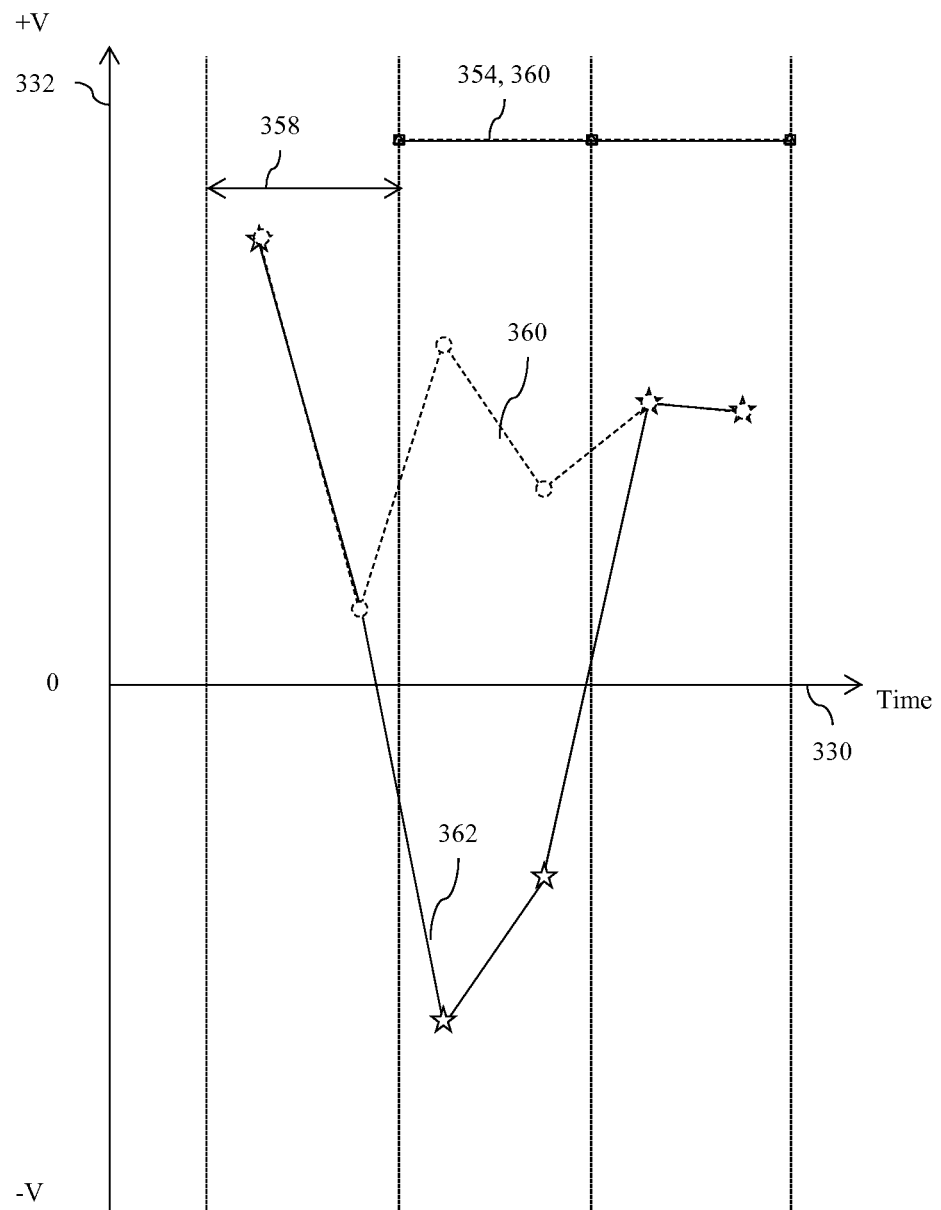

FIGS. 26A-26B are schematic diagrams illustrating graphs of first and second addressing schemes respectively of the variation of an addressing signal with time. It may be desirable to provide correct electrical inversion schemes for panel addressing. To avoid image sticking due to charge migration within the liquid crystal cell, typically liquid crystal displays use alternating fields of positive and negative voltages. As shown in FIG. 26A, if such a scheme were applied to the function 360, an addressing scheme 361 may be provided, and deliver a non-uniform charge distribution on the pixel over several periods 358. Such a scheme is particularly emphasized by the inverted image nature of the present embodiments and can result in image sticking Preferably the arrangement of FIG. 26B may be provided in which the inversion is completed over adjacent phase periods. In this case, the total output is always constant and high performance inversion correction can be arranged. Advantageously image sticking can be minimized.

Figure 27:
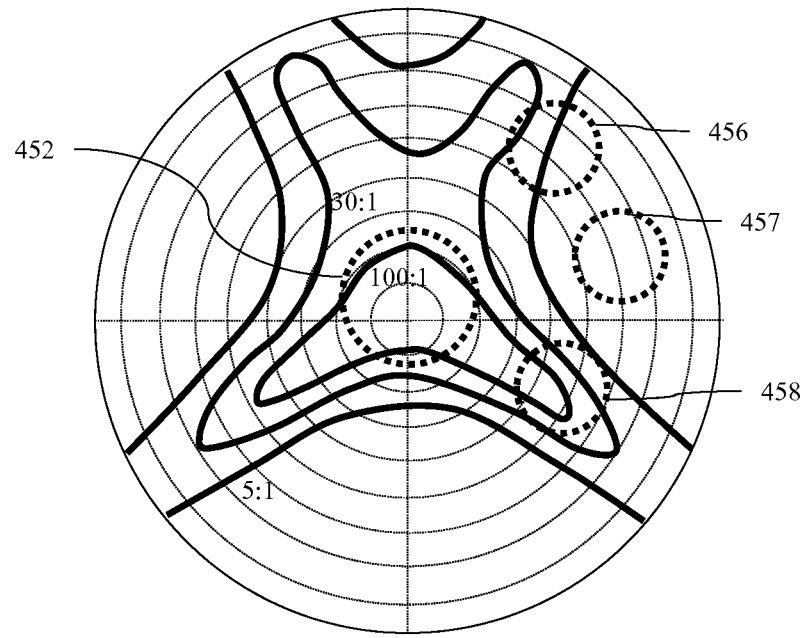
FIGS. 27-28 are schematic diagrams illustrating isocontrast plots for twisted nematic and compensated twisted nematic liquid crystal displays respectively, in accordance with the present disclosure.
Figure 28:
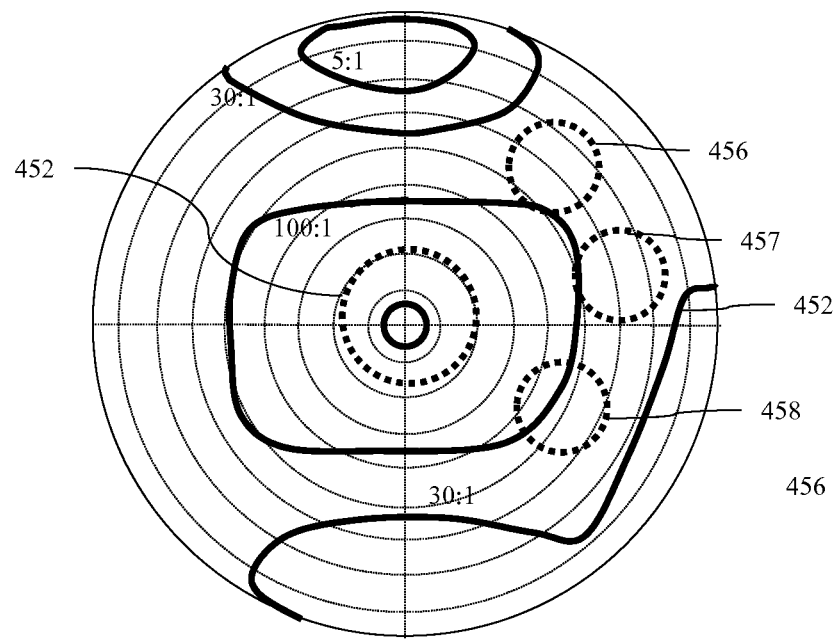

FIGS. 27-28 are schematic diagrams illustrating polar iso-contrast plots for twisted nematic and compensated twisted nematic liquid crystal displays respectively. The primary observer 300 may observe the primary image 261 and stray light illuminated secondary image 362 in a central region 452 whereas the secondary observer may observer the secondary image 263 with polar coordinates in the edge regions 456, 457, 458. For an uncompensated TN display as shown in FIG. 27, each region may have a different greyscale performance, and so the inverted secondary image perceived appearance in region 456 will be different to the inverted secondary image perceived appearance in region 457 for example. Thus the obscuration of the primary image to the secondary observer may undesirably vary with viewing angle. FIG. 28 shows that a compensated TN may provide similar greyscale performance for an off axis secondary observer, and thus obscuration by means of contrast reduction of the perceived secondary image 287 can advantageously be achieved over a wider range of observer positions.

It may be desirable to further improve the level of obscuration by increasing the accuracy of inverted secondary image 263.

Figure 29:
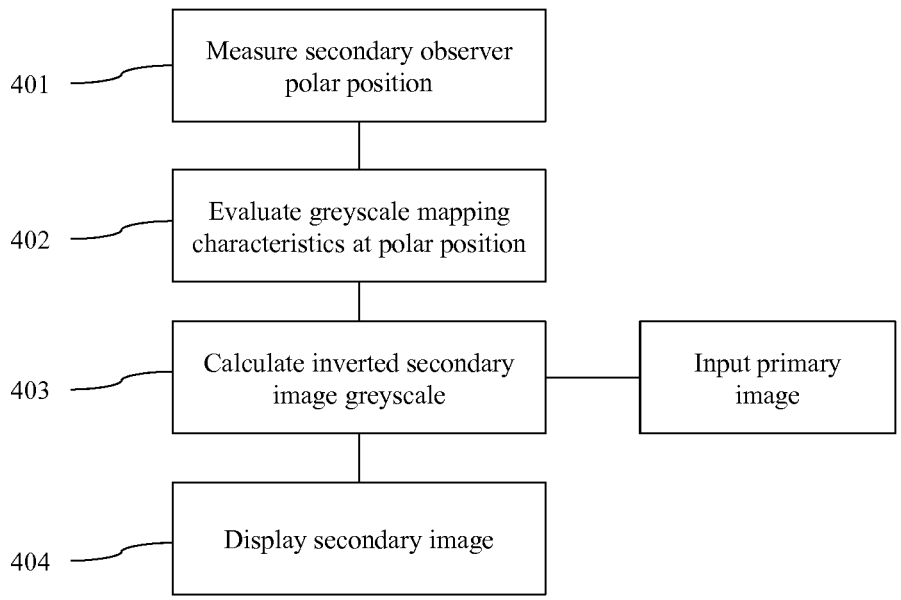
FIG. 29 is a flow chart illustrating secondary image greyscale correction according to the measured polar position of a secondary observer, in accordance with the present disclosure.

FIG. 29 is a flow chart illustrating secondary image greyscale correction according to the measured polar position of a secondary observer. In a first step 401 the average position of the eyes of a secondary observer is measured across the subtended area of the secondary image. In a second step 402 the greyscale characteristics of the spatial light modulator 48 for the polar angle is evaluated, for example by means of a look up table. In a third step 403 the appropriate signals to apply to achieve a correctly inverted image is calculated. In a fourth step 404, the secondary image is display in synchronization with the display of the primary image.

Figure 30:
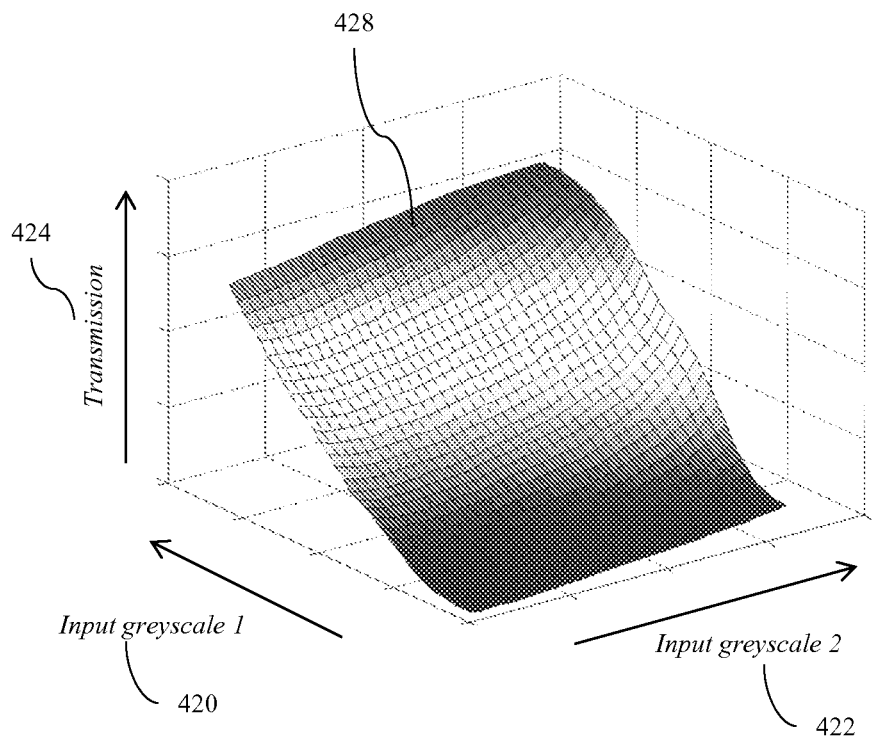
FIG. 30 is a schematic diagram illustrating a graph of first and second input greyscales against output transmission for a spatial light modulator, in accordance with the present disclosure.

FIG. 30 is a schematic diagram illustrating a graph of first image input greyscale 420 and second input greyscales 422 against output transmission for a spatial light modulator that is running in time multiplexed display. Thus it can be seen that the output transmittance of a pixel will vary in a non-linear manner. Such a graph can be used as the basis of the look up table that may be used in step 402 or other step to evaluate the correct pixel settings for inverted images. The spatial light modulator 48 may thus comprise an array of pixels and the control system 72, 76 may be arranged to control the spatial light modulator 48 to control the drive level of each pixel during the temporally multiplexed display of the primary and secondary images 261, 263 taking into account the desired grey level of the pixel and the expected hysteresis of the pixel.

Figure 31:
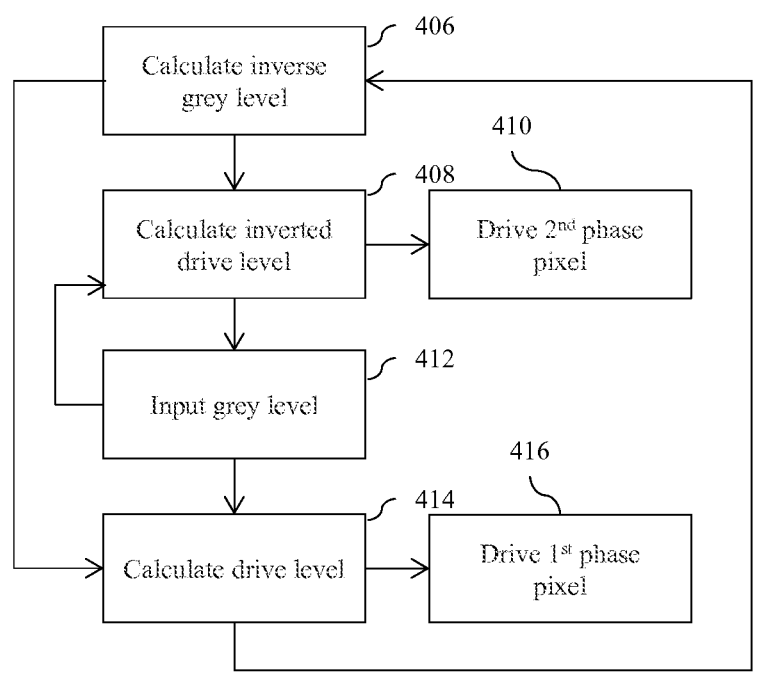
FIG. 31 is a flowchart illustrating the processing of signal data to achieve correct addressing of pixel data for alternating primary and secondary images, in accordance with the present disclosure.

FIG. 31 is a flowchart illustrating the processing of signal data to achieve correct addressing of pixel data for alternating primary and secondary images. The control system 72, 74, 76 may be arranged to control the spatial light modulator 48 and the array of light sources 15*a-n* so that the secondary image 263 has the same luminance as the primary image 261 that modulates the stray light directed outside the primary optical window 247.

In an illustrative embodiment in a first step 412 a primary image grey level is inputted. In a second step 414 the primary image pixel drive level is calculated and used to drive the respective pixel of the primary image in the first phase as shown in the third step 416. In a fourth step 406 the desired inverted grey scale level is calculated and in a fifth step 408 the appropriate inverted drive level is calculated, further using the data of the input grey level and the mapping function such as shown in FIG. 30. In a sixth step 410 the pixel data for the secondary image is driven in synchronization with the second phase.

Advantageously the obscuration of the primary image may be enhanced by providing reduced contrast of the perceived secondary image 287.

In operation, it may not always be possible to provide perfect removal of residual image contrast in the perceived secondary image 287, for example due to the finite cone angle subtended by the area of the display or to compensate for a variety of secondary observer positions. It may be desirable to provide further obscuration of the primary image to the secondary observer.

Figure 32A:
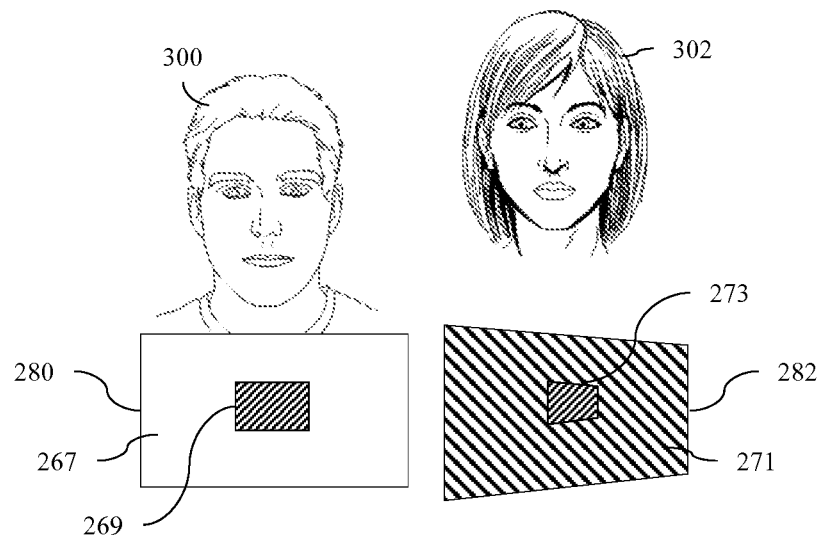
FIGS. 32A-32C are schematic diagrams illustrating perspective front views of the image appearance for a privacy display with first and second phases comprising respective primary and secondary images, further comprising disruptive pattern image content, in accordance with the present disclosure.
Figure 32B:
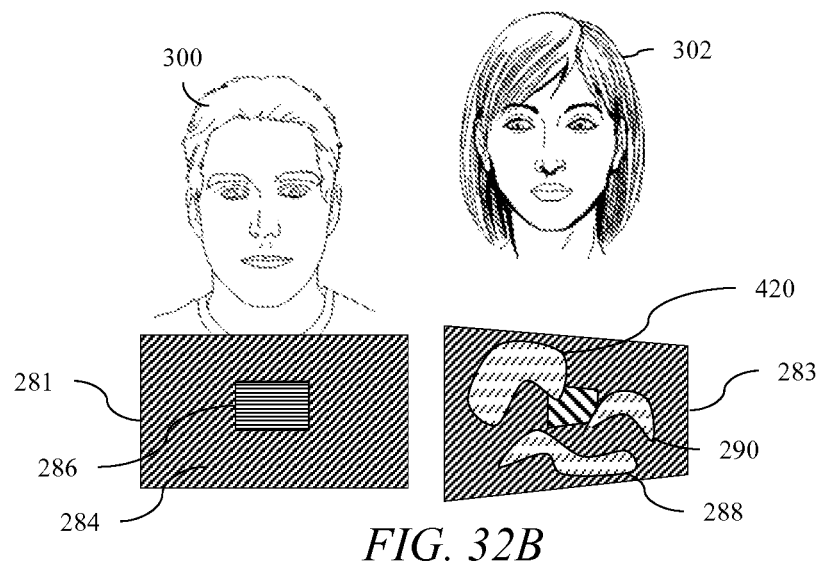
Figure 32C:
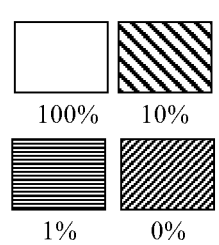
Figure 32C:
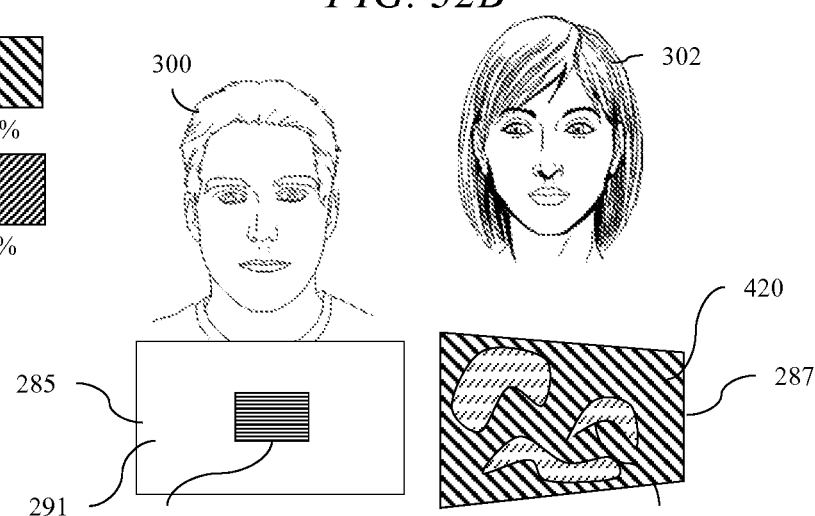

FIGS. 32A-32C are schematic diagrams illustrating a representation of perspective for front views of the perceived image appearance for a privacy display with first and second phases comprising respective primary and secondary images, further comprising disruptive pattern image content. FIG. 32A may be substantially the same as shown in FIG. 18A for example. FIG. 32B shows that disruptive pattern 420 may be added to the secondary image 283. Such secondary patterns may be fixed or may be time varying. The disruptive patterns may be chosen to best disrupt the nature of the image presented, for example may have a spatial frequency that is similar to the spatial frequency peaks of the primary image, but with different structures. Thus the disruptive pattern 420 may be different between text and photographs for instance, and may further vary in nature across the area of the spatial light modulator 48. The perceived secondary image 287 seen by the secondary observer 302 may show low the disruptive pattern in addition to the low contrast primary image as.

Advantageously obscuration of the primary image to the secondary observer 302 may be improved.

It may be desirable to minimize the visibility of the disruptive pattern in the perceived primary image 285.

Figure 33:
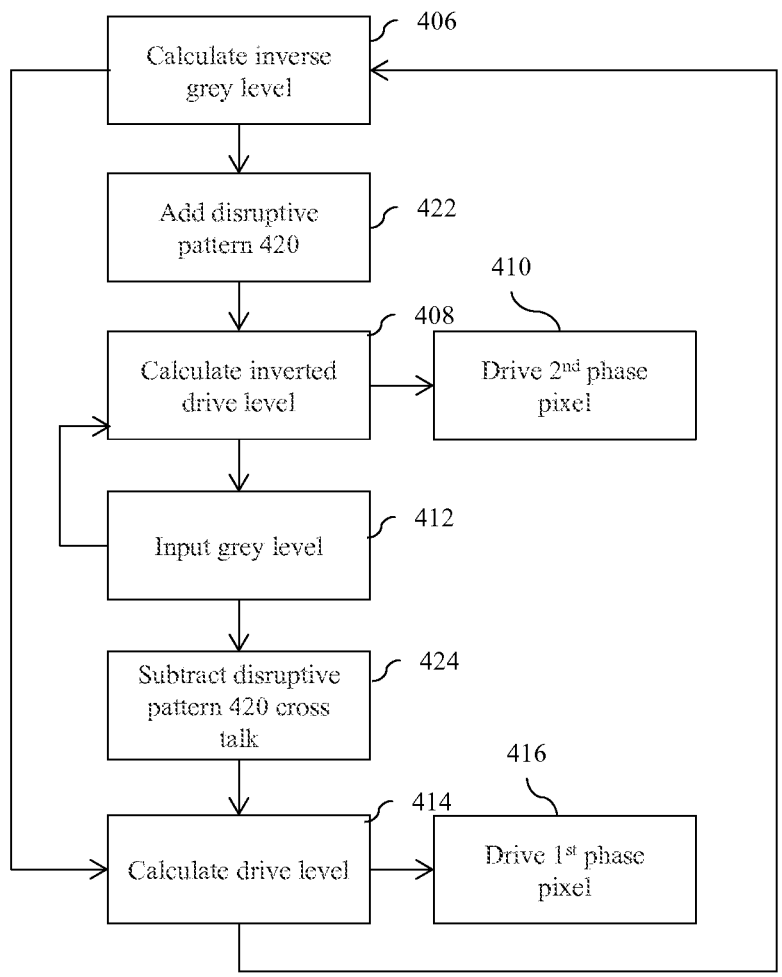
FIG. 33 is a flowchart illustrating the processing of signal data to achieve correct addressing of pixel data for alternating primary and secondary images comprising disruptive pattern image content, in accordance with the present disclosure.

FIG. 33 is a flowchart illustrating the processing of signal data to achieve correct addressing of pixel data for time multiplexed primary and secondary images comprising disruptive pattern image content. The secondary image 263 may comprise the inverted copy of the primary image superimposed by a disruptive pattern 420. The secondary image 263 may comprise a disruptive pattern 420. The primary image 261 may comprise an image for display to the primary observer superimposed by an inverted copy of the disruptive pattern 420 arranged to at least partly cancel the disruptive pattern 420 that modulates the stray light directed outside the secondary optical window 241, as perceived by the primary observer 300. FIG. 33 is similar to FIG. 31, with further step 422 to add disruptive pattern to the secondary image 263 and step 424 added to at least partially subtract the disruptive pattern from the primary image. Advantageously, the appearance of the disruptive pattern in the primary image may be minimized.

It may be desirable to synchronize timing of light source 15*a-n* temporal illumination patterns with spatial light modulator 48 addressing to optimize display luminance and minimize cross talk between primary and secondary images, thus achieving improved image obscuration for a secondary observer.

Figure 34A:
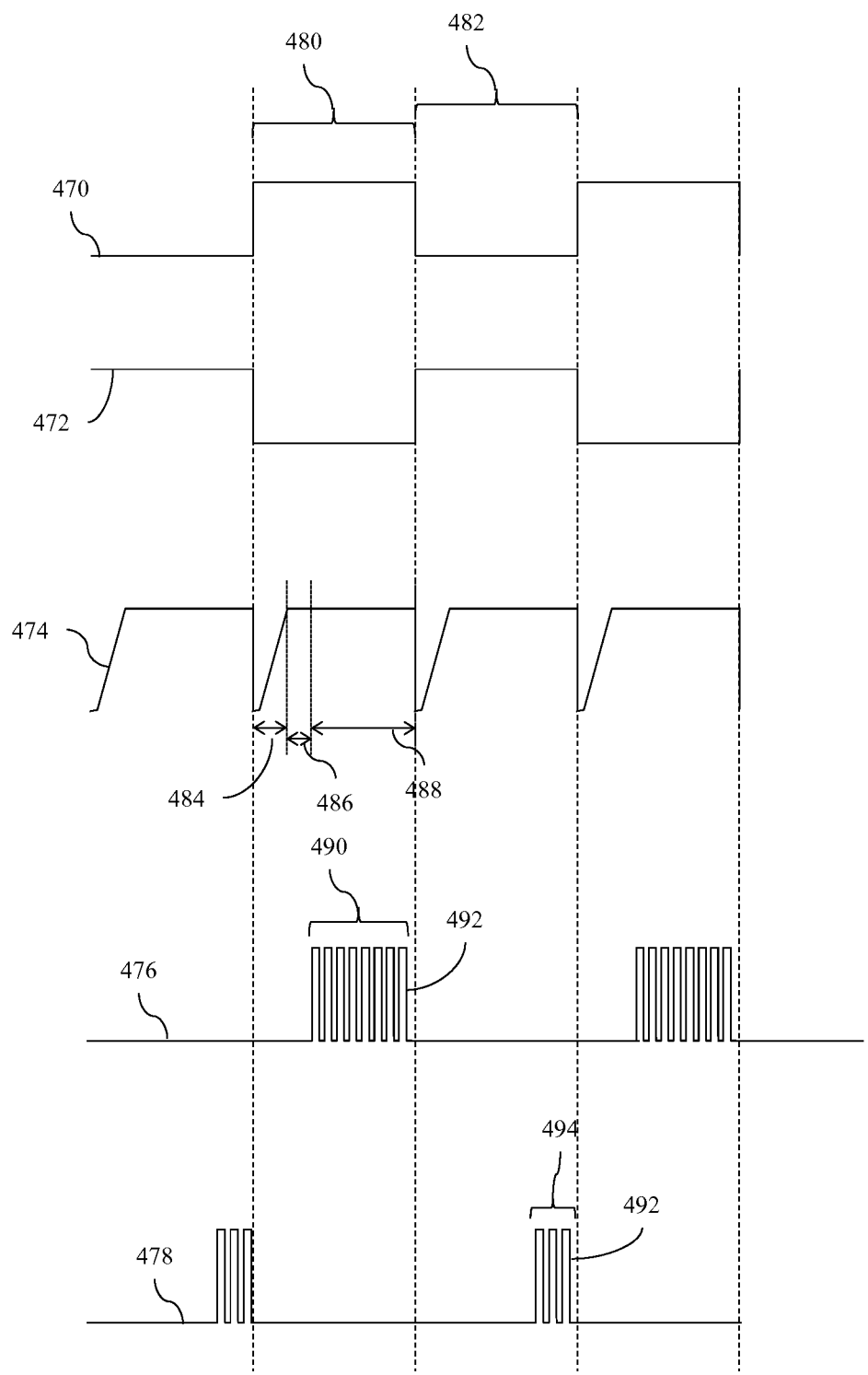
FIGS. 34A-34B are schematic timing diagrams illustrating the addressing of primary and secondary images and respective illumination signals, with matched phase length, in accordance with the present disclosure.
Figure 34B:
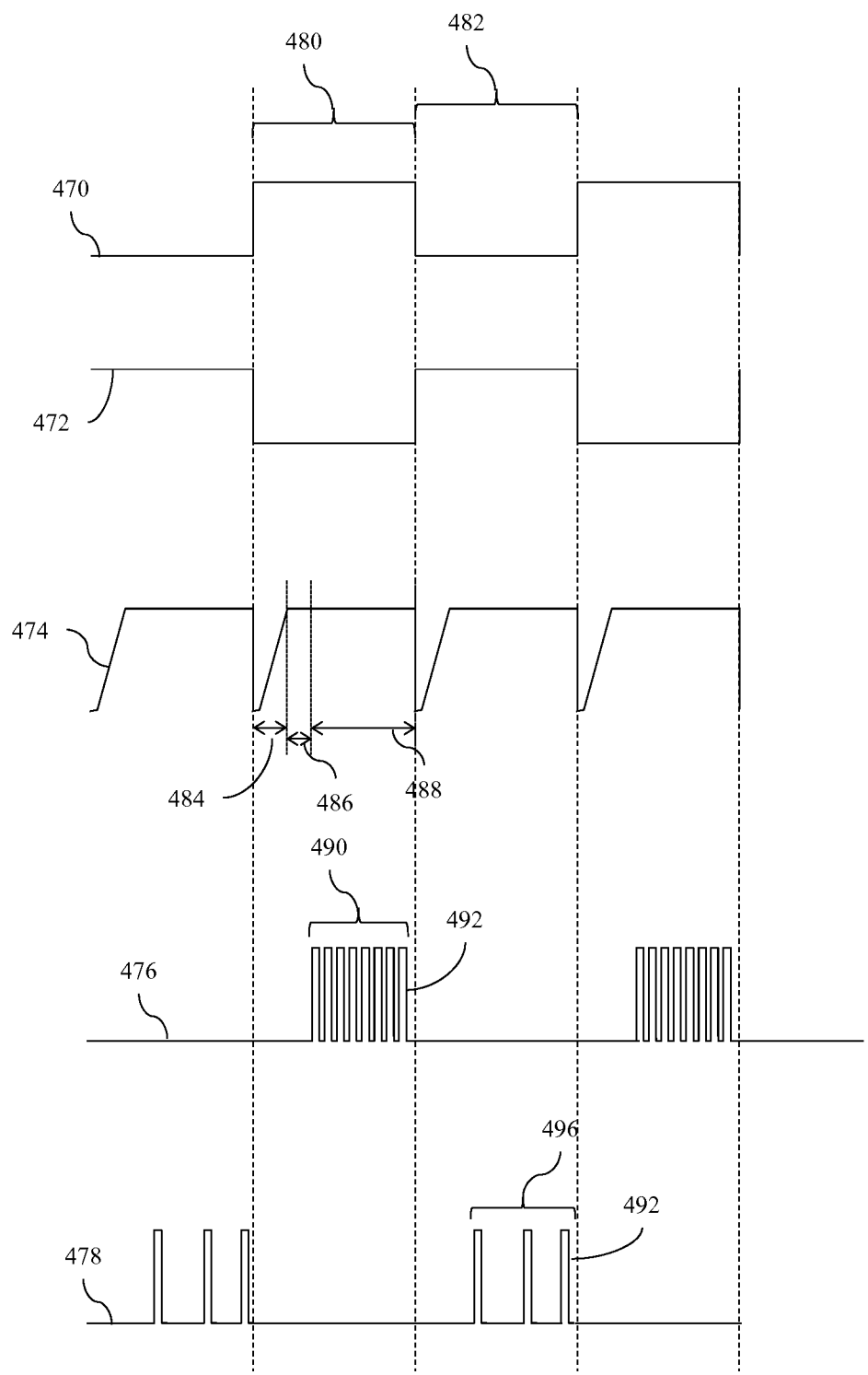

FIGS. 34A-34B are schematic timing diagrams illustrating the addressing of primary and secondary images and respective illumination signals, with matched phase length. Primary phase 480 addressing signal 470 and secondary phase 482 addressing signal 472 are shown in antiphase. Spatial light modulator 48 addressing is shown in signal 474 with pixel row addressing in period 484, liquid crystal response time in period 486 and illumination slot in 488. Primary illumination timing signal 476 is shown with pulses 492 that provide pulse width modulated output 490 for high luminance in the first phase as illustrated by light source flux 264 in FIG. 15A for example. Secondary illumination timing signal 478 is shown with pulses 492 that provide pulse width modulated output 494 for lower luminance in the second phase, as illustrated by light source flux 265 in FIG. 16A for example. As shown in FIG. 34B it may be desirable to provide more widely distributed pulses 496 in the second phase that may advantageously reduce flicker and provide increased uniformity of image obscuration across the panel area.

The arrangements of FIGS. 34A-34B illustrate that the maximum display luminance may be limited by the width of the illumination slot 488. It may be desirable to increase display luminance by increasing the illumination slot width.

Figure 34C:
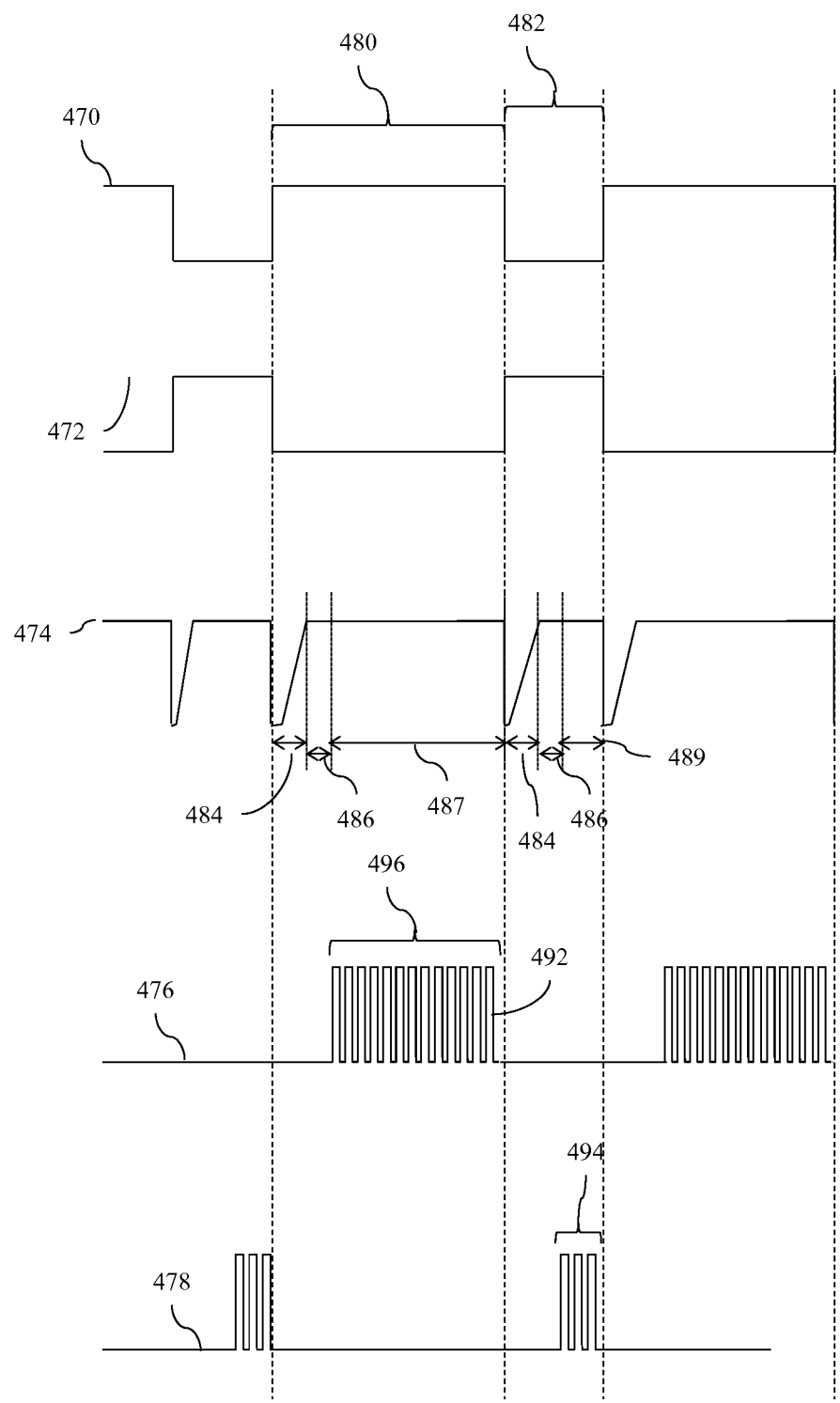
FIG. 34C is a schematic timing diagram illustrating the addressing of primary and secondary images and respective illumination signals, with unmatched phase length, in accordance with the present disclosure.

FIG. 34C is a schematic timing diagram illustrating the addressing of primary and secondary images and respective illumination signals, with unmatched phase length. The control system 72, 74, 76 may be arranged to control the spatial light modulator 48 and the array of light sources 15*a-n* in synchronization with each other so that the spatial light modulator 48 displays a primary image 261 and the secondary image 263 in a temporally multiplexed manner in time slots 480, 482 of unequal length. The period 484 for panel addressing and period 486 for liquid crystal response may be the same in both slots 480, 482, therefore the illumination slot 487 may be made longer than slot 489. This provides pulses 496 that are extended compared to pulses 490 of FIG. 34B. The illumination slot width 489 for the second phase is set long enough to provide adequate intensity for the second luminous flux 265 pattern shown in FIG. 16A. Advantageously display luminance may be increased.

It would be desirable to provide further arrangements to provide disruptive patterns to the secondary image that may vary with time. Such time varying patterns can be achieved by updating the disruptive secondary image pattern of FIG. 32C. It would be further desirable to achieve disruptive patterns without modifying the secondary image to limit residual disruptive pattern visibility in the primary image.

Figure 35A:
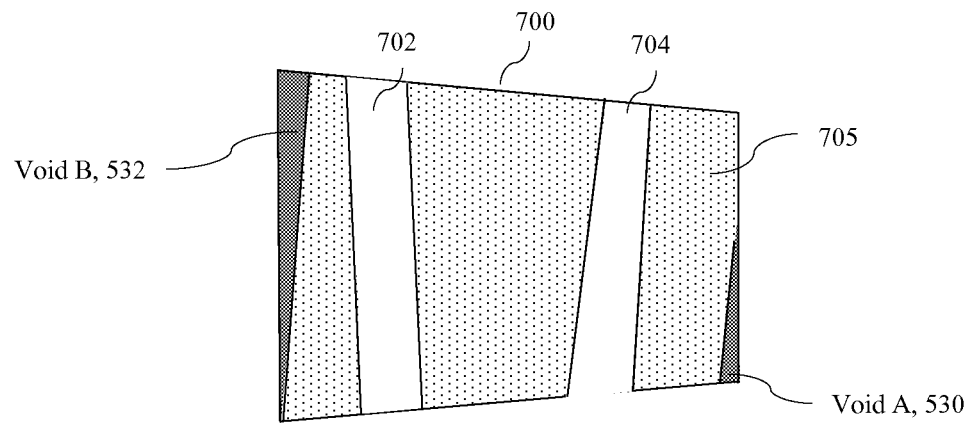
FIGS. 35A-35B are schematic diagrams illustrating the variation of spatial luminance across an optical valve for illumination by small numbers of light sources, in accordance with the present disclosure.
Figure 35B:
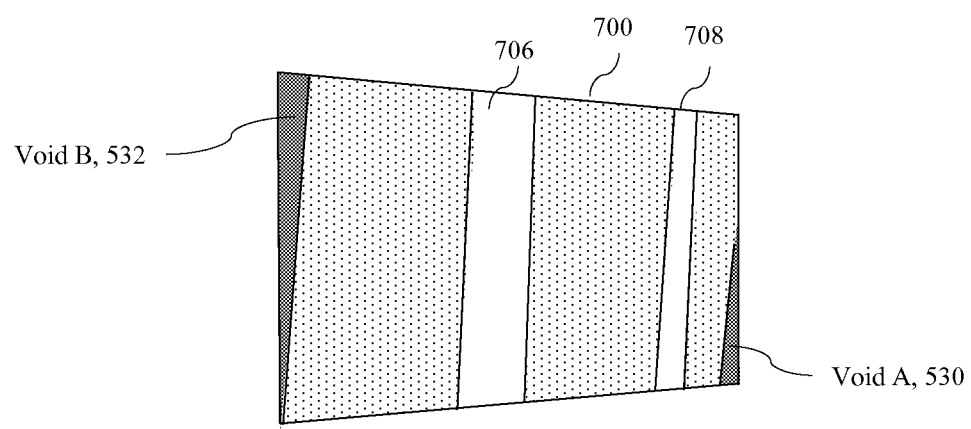

FIGS. 35A-35B are schematic diagram illustrating the variation of spatial luminance across an optical valve for illumination by small numbers of light sources, and thus represent the illumination of a primary image 700 for an off-axis viewing position. Void A, 530 and void B, 532 are illustrated and described elsewhere herein. Illuminated regions 704, 702 are provided by a pair of separated light sources for an observer near to but not necessarily at the window plane. Such non-uniform illumination regions are provided by the aberrations of the optical system, in particular the Fresnel mirror at the reflective end 4 and curved facets 12 and may change shape and position depending on viewing position as well as optical design. For a second pair of light sources regions 706, 708 are further provided. In regions 705 between regions 702, 704 stray light of lower luminance may be provided for example provided by reflections from the input side 2, as described elsewhere herein.

Figure 35C:
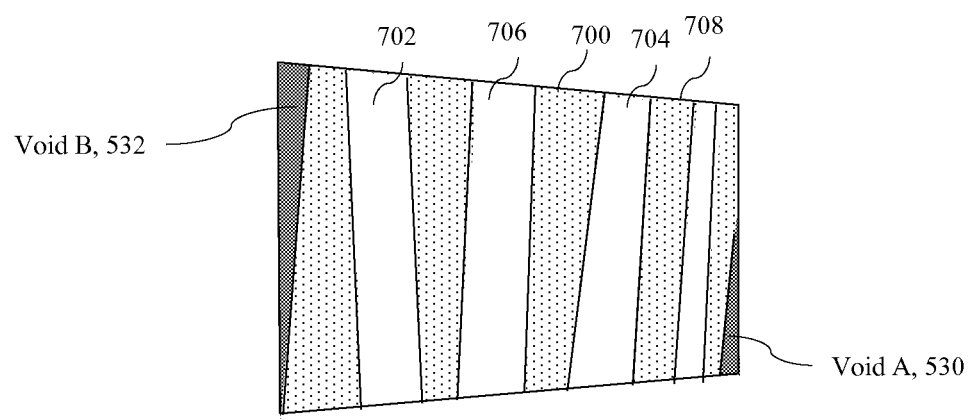
FIG. 35C is a schematic diagram illustrating the combined spatial luminance across an optical valve for illumination by an increased numbers of light sources, in accordance with the present disclosure.

FIG. 35C is a schematic diagram illustrating the combined spatial luminance across an optical valve for illumination by an increased numbers of light sources. In operation, multiple adjacent light sources are typically provided together with diffuser elements that spread the light across the whole of the display surface to provide uniform illumination for off-axis viewing positions.

In a further privacy mode of operation, such non-uniformities can be used to provide further disruptive images to a secondary observer as will be described below.

Figure 36A:
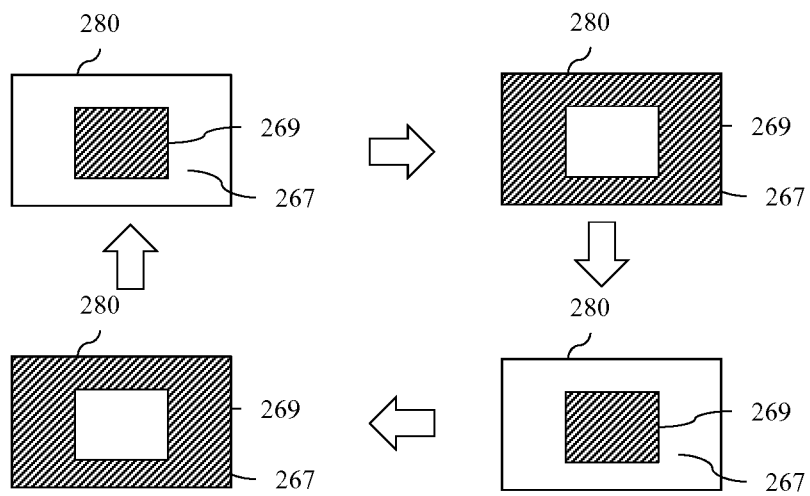
FIG. 36A is a schematic diagram illustrating the cycling of image content in a privacy display, in accordance with the present disclosure.

FIG. 36A is a schematic diagram illustrating the cycling of image content in a privacy display. Such images thus are not required to have disruptive image content in the secondary images, and can cycle between a primary and inverted secondary image as described elsewhere herein.

Figure 36B:
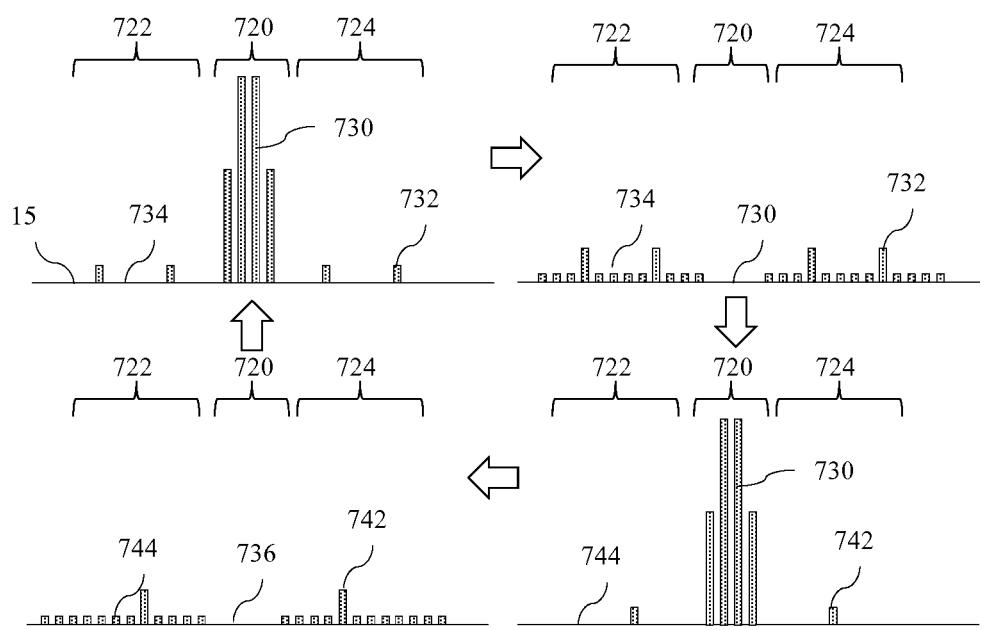
FIG. 36B is a schematic diagram illustrating the cycling of light source distribution in a privacy display, in accordance with the present disclosure.
Figure 36C:
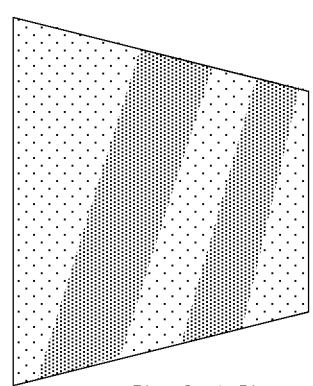
FIGS. 36C-36D are schematic diagrams illustrating the off-axis image appearance of images in first and second phases the luminance distribution across the image for first and second phases, in accordance with the present disclosure.
Figure 36D:
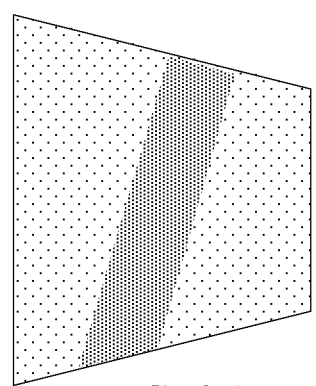
Figure 36E:
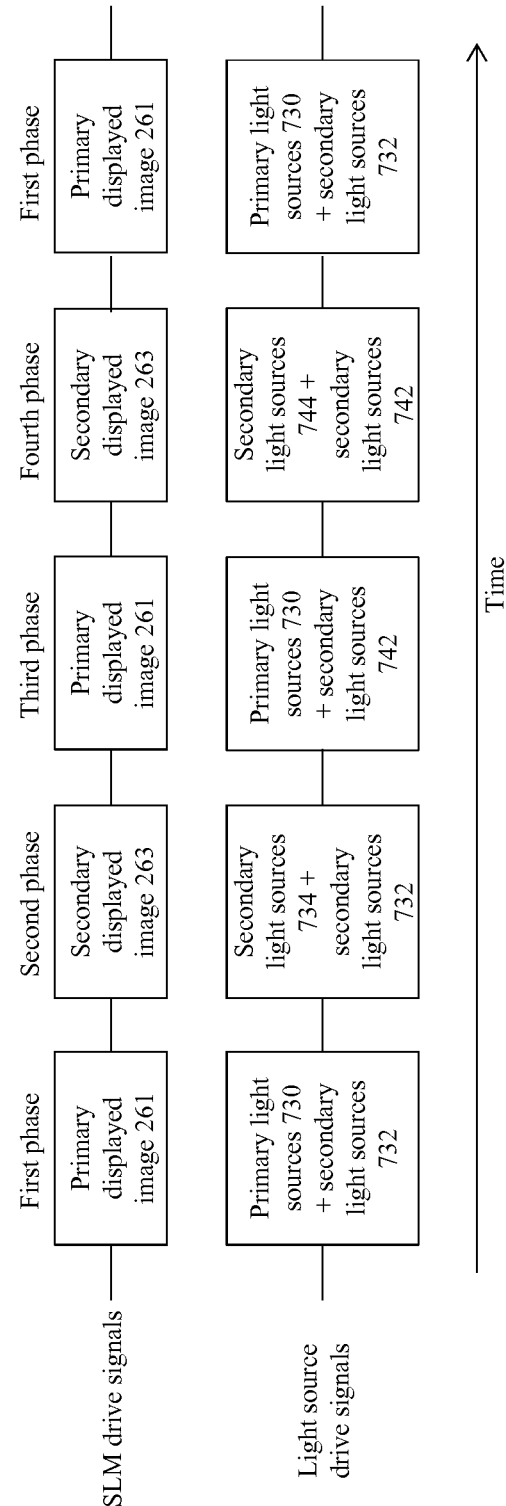
FIG. 36E is a schematic flowchart illustrating the control of the arrangement of FIGS. 56-60, in accordance with the present disclosure.

FIG. 36B is a schematic diagram illustrating graphs of the luminance against light source position for the cycling of light source distribution in a privacy display using aberrational non-uniformity properties as described in FIGS. 35A-C. FIGS. 36C-36D are schematic diagrams illustrating the off-axis image appearance of images in first and second phases the luminance distribution across the image for first and second phases. FIG. 36E is a schematic flowchart illustrating the control of the arrangement of FIGS. 56-60.

Group 720 of primary light sources 730 and groups 722, 724 of secondary light sources 732, 734 are provided, and this is an example in which there are plural primary light sources 730 and plural secondary light sources 732, 734.

The primary light sources may have equal flux. Alternatively the primary light sources 730 may have a flux distribution that varies with position to achieve a shaping of the optical window profile. Such shaping may improve perceived image spatial uniformity for an observer position approaching the edge of the primary optical window.

Further, secondary light sources 732 (in general at least one secondary light source 732) may be illuminated in the first phase of operation when the primary image is displayed in addition to the primary light sources 730, but while other secondary light sources 734 are not illuminated. Such additional secondary light sources 732 provide spatially non-uniform illumination for off-axis viewing positions as described for FIG. 35A-C. Those additional secondary light sources 732 are also operated in the second phase of operation when the secondary image is displayed, but with higher luminous flux than the other secondary light sources 734.

Thus, in operation, the control system may be arranged to control the spatial light modulator 48 and the array 15 of light sources in synchronization with each as follows.

In a first phase of operation (top left in FIGS. 36A and 36B), while the spatial light modulator 48 displays the primary image, the additional light sources 732 are selectively operated, in addition to the at least one primary light source 730. This cause light to be directed into additional optical windows to the primary window. As before, in operation in the first phase, the other secondary light sources 734 are not illuminated while primary light sources 730 and the additional light sources 732 are illuminated.

In a second phase of operation, (top right in FIGS. 36A and 36B), while the spatial light modulator 48 displays the secondary image, all the secondary light sources 732, 734, including the additional light sources 732 that were operated in the first phase and other secondary light sources 734 that were not operated in the first phase, are operated. As before, in operation in the second phase, the primary light sources 730 are not illuminated while secondary light sources 732, 734 are illuminated.

However, in the second phase, the additional light sources 732 may be operated to output light with a higher luminous flux than the other secondary light sources 734 to provide some further compensation of the privacy appearance for the illumination of the additional optical windows in the first phase, however not necessarily providing image cancellation. Thus for a secondary observer, an image with different luminance levels across the display area may be seen, advantageously achieving a disruptive image pattern.

The first and second phase may repeat in a temporally multiplexed manner, in which case the phases illustrated in the bottom right and bottom left of FIGS. 36A and 36B are not used.

Alternatively, as illustrated in FIGS. 36B and 36E, the operation may additionally include third and fourth phases (bottom right and bottom left of FIGS. 36A and 36B), which correspond to the first and second phases but in which the additional windows change by changing the additional light sources, that is by using additional sources 742 instead of additional light sources 732. As a result, the location of the additional windows illuminated by the additional light sources 732 or 742 illuminated together with the primary light sources 730 may move, thus providing a spatial non-uniformity across the display that is different to that achieved in the first and second phases. In this manner, as shown in FIGS. 36C-36D for first and second perceived secondary images perceived in the second and fourth phases, moving non-uniformities may be provided to the secondary observer with minimal visibility to the primary observer. The at least one additional window thus changes in different temporal phases of operation. In general, there may be even more phases in which the additional light source changes.

The separation of the first and second phases to the third and fourth phases may be increased, thus controlling the temporal and spatial frequency of the secondary image disruption. Advantageously enhanced image disruption can be achieved without changing the image content provided to the spatial light modulator. Further the disruptive pattern appearance can change with viewer position due to the aberrational spatial non-uniformities having an angular dependence. Additional disruptive patterns described in FIGS. 32A-32C can be further applied to the secondary images to further increase the degree of disruption.

It would be desirable to reduce the levels of stray light in stepped waveguides to achieve improved privacy operation. Such improvement may be desirable for displays which comprise a single primary image, as well as time multiplexed displays with primary and secondary images as described elsewhere herein.

Figure 37:
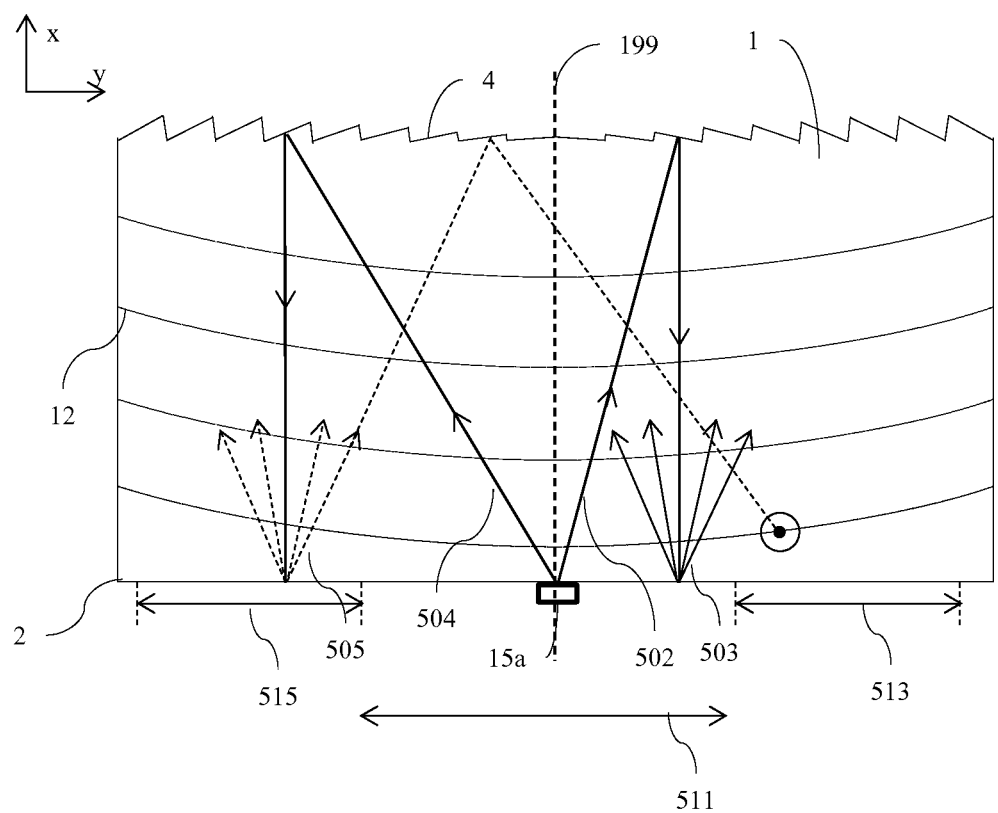
FIG. 37 is a schematic diagram illustrating in front view the generation of stray light in an optical valve, in accordance with the present disclosure.

FIG. 37 is a schematic diagram illustrating in front view the generation of stray light in an optical valve of the type shown in FIG. 4A for example, further comprising a Fresnel mirror at end 4 rather than domed reflector.

In operation, light rays 502, 504 are directed to reflective end 4 and imaged to optical window 26a (not shown).

Wedge type waveguides 1104 illustrated in FIG. 11, may be arranged so that all light may be extracted by means of end mirror 1102 that is faceted in the x-z plane and total internal reflection at the sides 1106 of the waveguide. By way of comparison the step waveguides 1, 1301 are typically arranged so that some light is incident on to the input end 2. Light rays 502 that are close to source 15a, in region 511 may be usefully reflected as light rays 503 to provide optical windows that are close to the axis 197. However, light rays 504 that are incident on region 515 may also be reflected as rays 505 that are directed into directions in regions 512 of the angular distribution 500. Such light rays undesirably increase visibility for privacy operation.

Figure 38A:
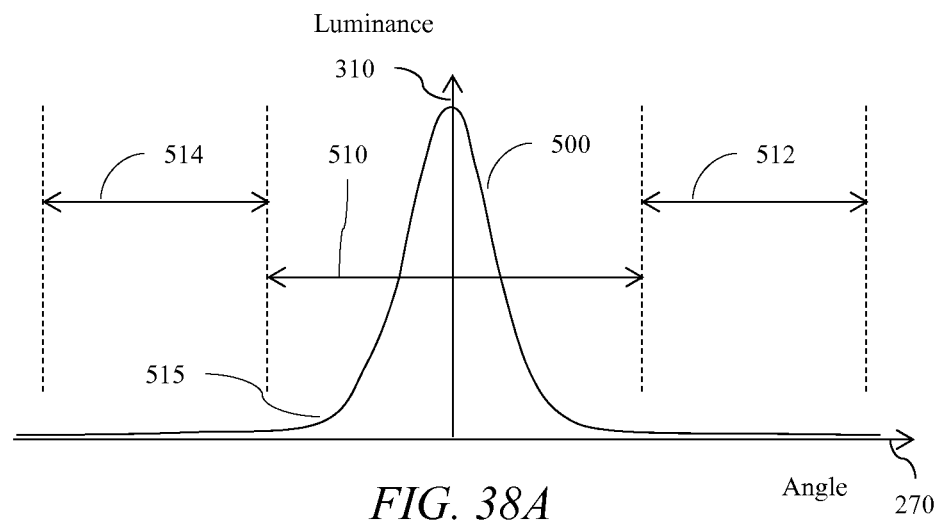
FIGS. 38A-38C are schematic graphs illustrating the angular distribution of output luminance for a display similar to the arrangement of FIG. 37, in accordance with the present disclosure.
Figure 38B:
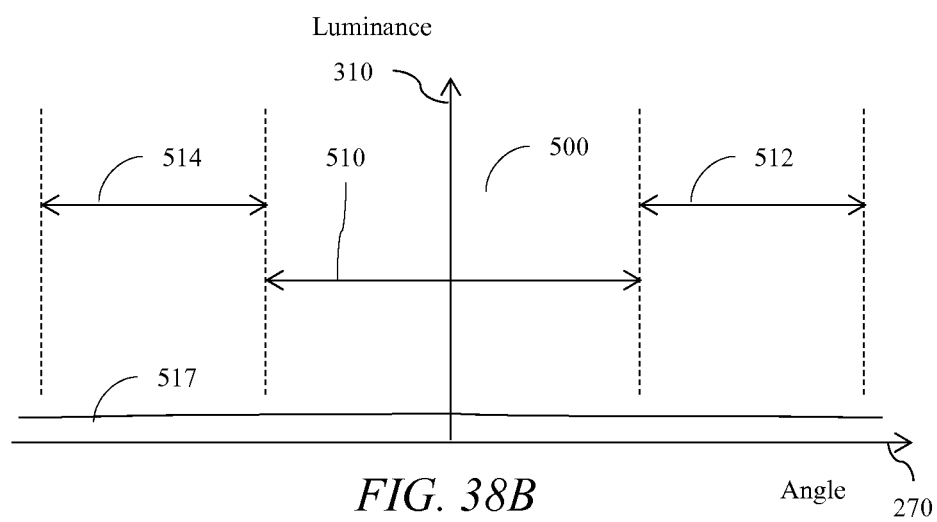
Figure 38C:
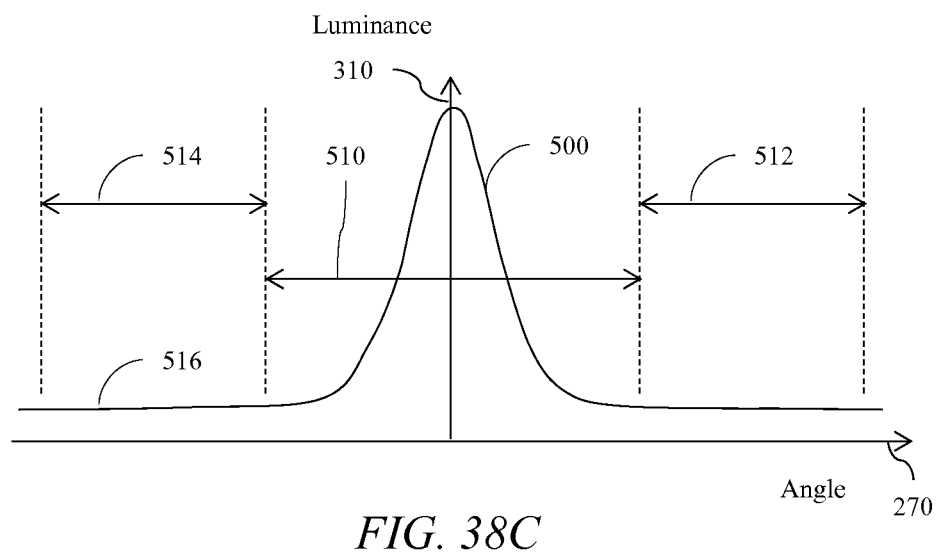

FIGS. 38A-38C are schematic graphs illustrating the angular distribution 500 of output luminance 310 with angle 270 for a display similar to the arrangement of FIG. 37. FIG. 38A illustrates the primary optical window distribution 515 that is provided before reflection of light from the input side while FIG. 38B illustrates the optical window distribution 517 from light reflected from the input side for a region in the middle of the waveguide 1 and FIG. 38C illustrates the combined optical window distribution 56.

Light distribution 517 in outer regions 512, 514 undesirably degrades privacy performance for displays which comprise a single primary image, as well as time multiplexed displays with primary and secondary images as described elsewhere herein.

Figure 39:
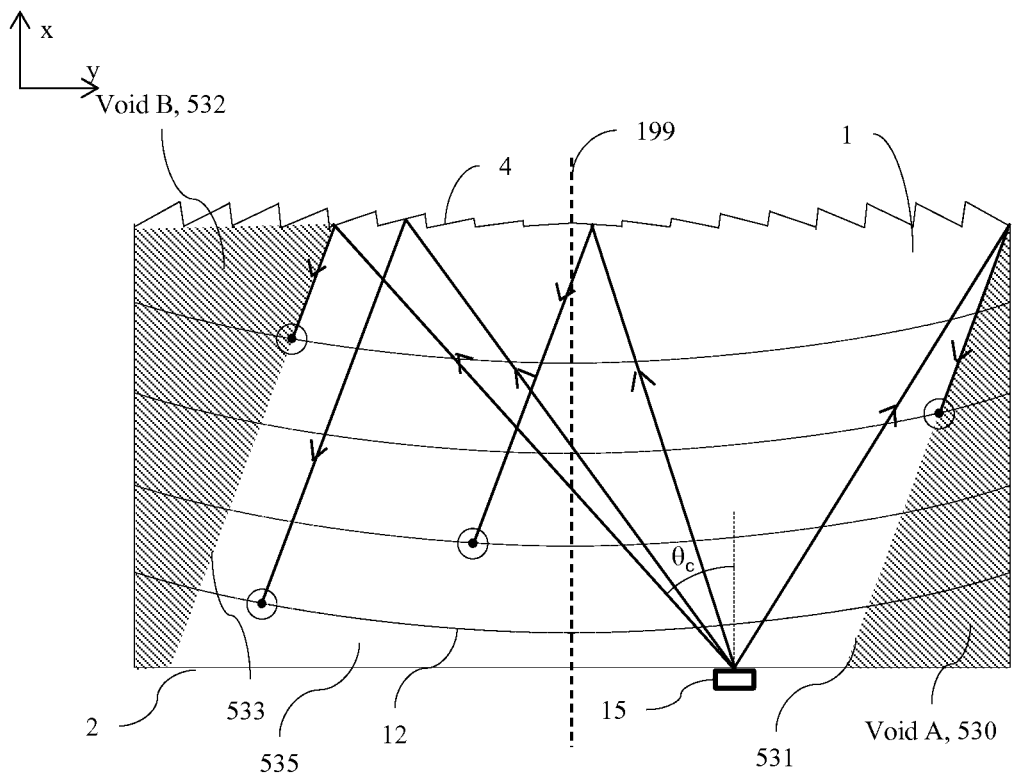
FIGS. 39-40 are schematic diagrams illustrating in front views the formation and correction of image voids in an optical valve similar to the arrangement of FIG. 4A, in accordance with the present disclosure.
Figure 40:
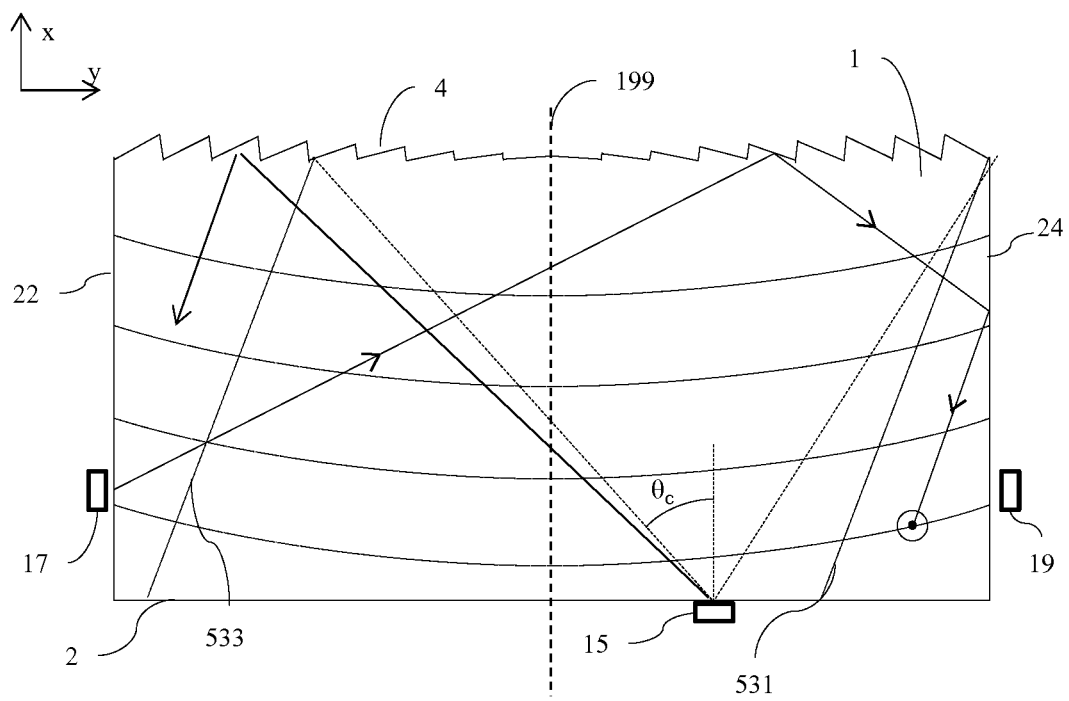

FIGS. 39-40 are schematic diagrams illustrating in front views the formation and correction of image voids in an optical valve similar to the arrangement of FIG. 4A. Further FIG. 39 is a schematic diagram illustrating in front view the origin of illumination void non-uniformities in a directional waveguide and is generally described further in U.S. Patent Provisional Application No. 62/167,185, entitled "Wide angle imaging directional backlights," filed May 27, 2015, which is herein incorporated by reference its entirety. For off-axis sources of array 15, additional void regions are provided. Void A, 530 is provided by light that is outside a cone angle subtended by the light source and adjacent edge of the Fresnel reflector. Boundary 531 separates void A from the main illumination region. Void B, 532 is provided by light rays that are outside the critical angle θc of the light entering the waveguide for a light source in air. Boundary 533 separates void B from the main illumination region. Both voids create undesirable non-uniformities for off-axis viewing positions.

FIG. 40 is a schematic diagram illustrating in front view correction of illumination void non-uniformities in a directional waveguide. Void A can be compensated by light source array 17 arranged on the sides of the waveguide 1. Void B can be compensated by modification of the structure of the input end, for example by addition of diffusion structures to expand the cone angle inside the waveguide to be greater than the critical angle. Thus a directional backlight for operation as a privacy display may comprise a waveguide 1 comprising an input end 2; an array 15 of input light sources arranged at different input positions in a lateral direction across the input end 2 of the waveguide 1 and arranged to input light into the waveguide 1, the waveguide 1 further comprising first and second opposed, laterally extending guide surfaces 6,8 for guiding light along the waveguide 1, side surfaces 22, 24 extending between the first and second guide surfaces 6,8, and a reflective end 4 having positive optical power facing the input end 2 for reflecting the input light back along the waveguide 1, the second guide surface 8 being arranged to deflect the reflected input light through the first guide surface 6 as output light, and the waveguide 1 being arranged to direct the output light into optical windows 26 in output directions that are distributed in a lateral direction in dependence on the input position of the input light; and additional light sources 17, 19 disposed along at least a part of each side surface 22, 24 adjacent the input end 2, the additional light sources 17 being arranged to direct additional light into the waveguide 1 through one of the side surfaces 22 in a direction in which the additional light is reflected by the reflective end 4 onto the opposite side surface 24 and by the opposite side surface 24 into a segment of the waveguide 1 adjacent the opposite side surface 24 extending from a corner between the reflective surface 4 and the side surface 24. Similarly the additional light sources 19 may be arranged to direct additional light into the waveguide 1 through one of the side surfaces 24 in a direction in which the additional light is reflected by the reflective end 4 onto the opposite side surface 222 and by the opposite side surface 22 into a segment of the waveguide 1 adjacent the opposite side surface 22 extending from a corner between the reflective surface 4 and the side surface 22.

Region 535 between lines 531, 533 is illuminated by light source 15. Advantageously void A, 530 may be filled in a controllable manner by adjustment of the flux from the light sources 17, for a wide range of viewing positions. Further the angular illumination profile of the output windows may be controlled to provide a wide angle mode of similar or better performance compared to conventional waveguides 1.

Such side light sources 17, 19 may be operated in wide angle mode of operation only, and may not be operated in privacy operation. Alternatively such side sources may provide some secondary light sources to improve correction of privacy performance in regions that would otherwise be void regions.

Void regions of similar origin are provided by the side illuminated waveguide of FIGS. 12D-12F. Thus void regions are to be expected for light reflected from regions 513, 515 shown in FIG. 37. Such voids provide spatial non-uniformities for privacy operation.

It would thus be desirable to correct for spatial non-uniformities in private image appearance for off-axis viewing positions.

FIG. 41 is a photo of the spatial luminance distribution 550 across an optical valve 1 for a privacy operation viewing position and FIG. 42 is a schematic diagram illustrating in a front view with a lateral angular offset isoluminance distribution regions A-D for a privacy operation viewing position. The luminance distribution 552 as shown is provided by reflections of light rays 505 in region 515 of the input side 2 of the waveguide 1. Thus void 532 and region 535 is present in the spatial uniformity of the privacy image. Thus luminance of points 540, 542 may be substantially different in such a viewing position.

It would be desirable to increase the spatial uniformity of image cancellation in a privacy display with primary and secondary image phases.

FIG. 43 is a schematic graph illustrating greyscale inversion functions for different display regions of FIG. 42. The regions A, B, C, D in FIG. 42 may be provided with inversion functions 560, 562, 564, 566 respectively. Thus the inverted copy of the primary image may comprise a copy of the primary image inverted by an inversion function that varies spatially across the image.

Advantageously, visibility of the primary image for secondary observers can be further reduced for regions across the observed image, improving overall privacy performance.

It would further be desirable to correct for angular variations in spatial distribution of luminance in the optical windows. Such variation can be provided by flux distributions created directly by imaging of the light sources, or can be created by stray light reflected from the input side, as illustrated for example in FIGS. 37, 38, 40 and 42.

Figure 44A:
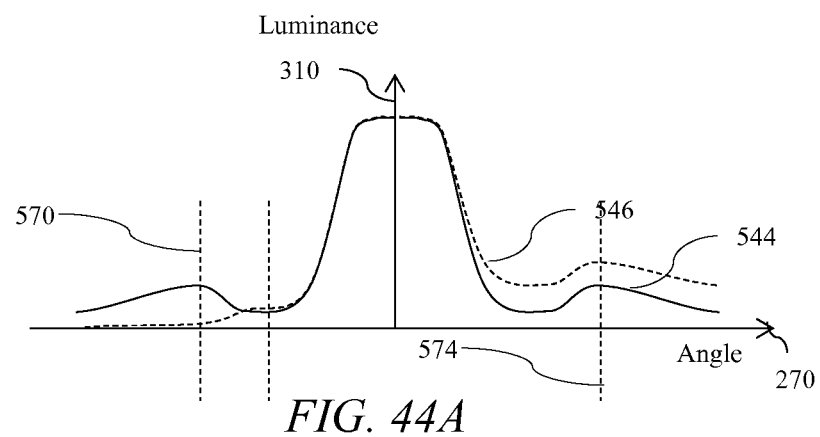
FIGS. 44A-44B are schematic graphs illustrating angular luminance variations for first and second display regions, in accordance with the present disclosure.

FIG. 44A is a schematic graph illustrating angular luminance distributions 544, 546 for the different display regions 540, 542 respectively of FIG. 42. Thus the output luminance distribution of the optical windows varies spatially across the area of the displayed image. At angles 570, 574 from which a privacy image is desired, the luminance of regions 540, 542 will thus be different and desirably different inversion functions will be provided for regions 540, 542, that may vary with viewing angle 270.

Figure 44B:
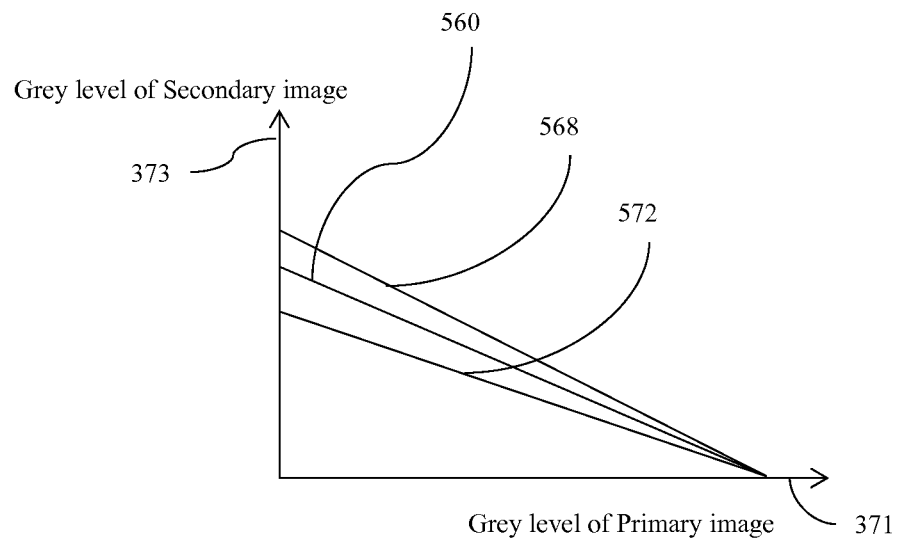

FIG. 44B is a schematic graph illustrating greyscale inversion functions 560, 568 for regions 540, 542 at viewing angle 570 and inversion functions 560, 572 for regions 540, 542 at viewing angle 574. The inversion function may vary spatially across the image in correspondence with a spatial variation of the luminance of the output windows 26*a-n*.

Figure 45:
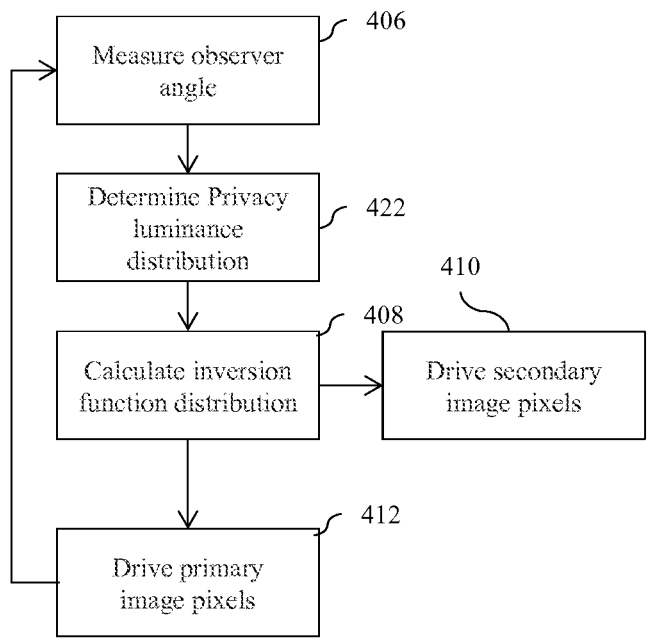
FIG. 45 is a flowchart illustrating correction of mapping distributions for non-uniform greyscale mapping, in accordance with the present disclosure.

FIG. 45 is a flowchart illustrating correction of mapping distributions for non-uniform greyscale mapping. In a first step 406 the observer angular position may be measured, as described elsewhere herein. In a second step, 422 the privacy luminance distribution, such as shown in FIGS. 41-42 may be determined for the respective viewing angle. Such distributions may be calculated or may be determined from a look up table or other known determination technique for example. In a third step 408, the distribution of inversion functions across the secondary image may be determined and used to drive the secondary image pixels in a fourth step 410. In a fifth step 412, the primary image pixels may be driven. In the fifth step some further distribution of drive functions may be arranged to provide increased image uniformity in the primary image.

It would be desirable to improve spatial uniformity of the privacy performance in displays that do not use head tracking capability.

Figure 46:
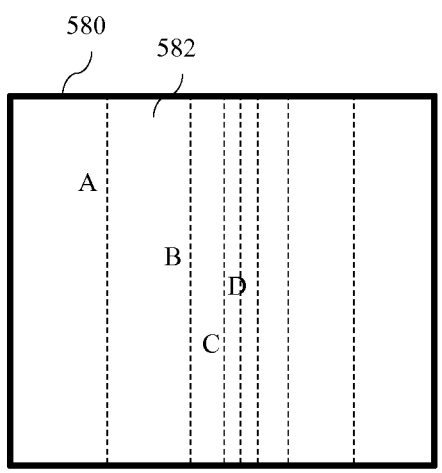
FIGS. 46-47 are schematic diagrams illustrating in front view image correction regions, in accordance with the present disclosure.
Figure 47:
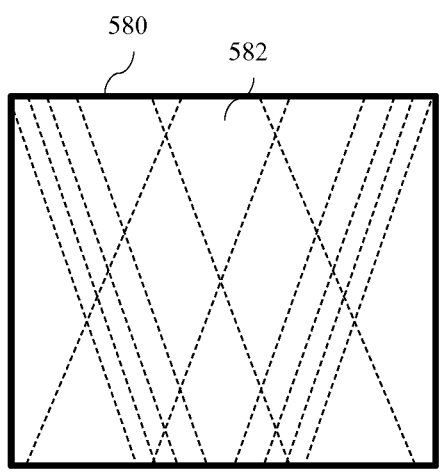

FIGS. 46-47 are schematic diagrams illustrating in front view spatial variations of inversion functions, illustrating isofunction distributions across the secondary image 580. Thus regions 582 corresponding to image luminance regions 552 in FIG. 42 may be provided that are an average for positive and negative viewing angles. Each region 582 shown may correspond to a different inversion function and transitions between regions may be smoothed for example by interpolation to achieve a uniform variation of inversion functions. The regions 582 may be vertical profile or may be a combination of functions for left and right viewing positions, for example +/−45 degrees with respect to axis 197 of the primary optical window. Advantageously improved spatial uniformity can be achieved for the combination of primary and secondary image over a wider viewing freedom.

As shown in FIG. 37 a significant privacy degradation artifact arises from reflections from the input side 2 of the waveguide 1, creating stray optical windows. It would be desirable to reduce the luminance of the stray optical windows.

Figure 48:
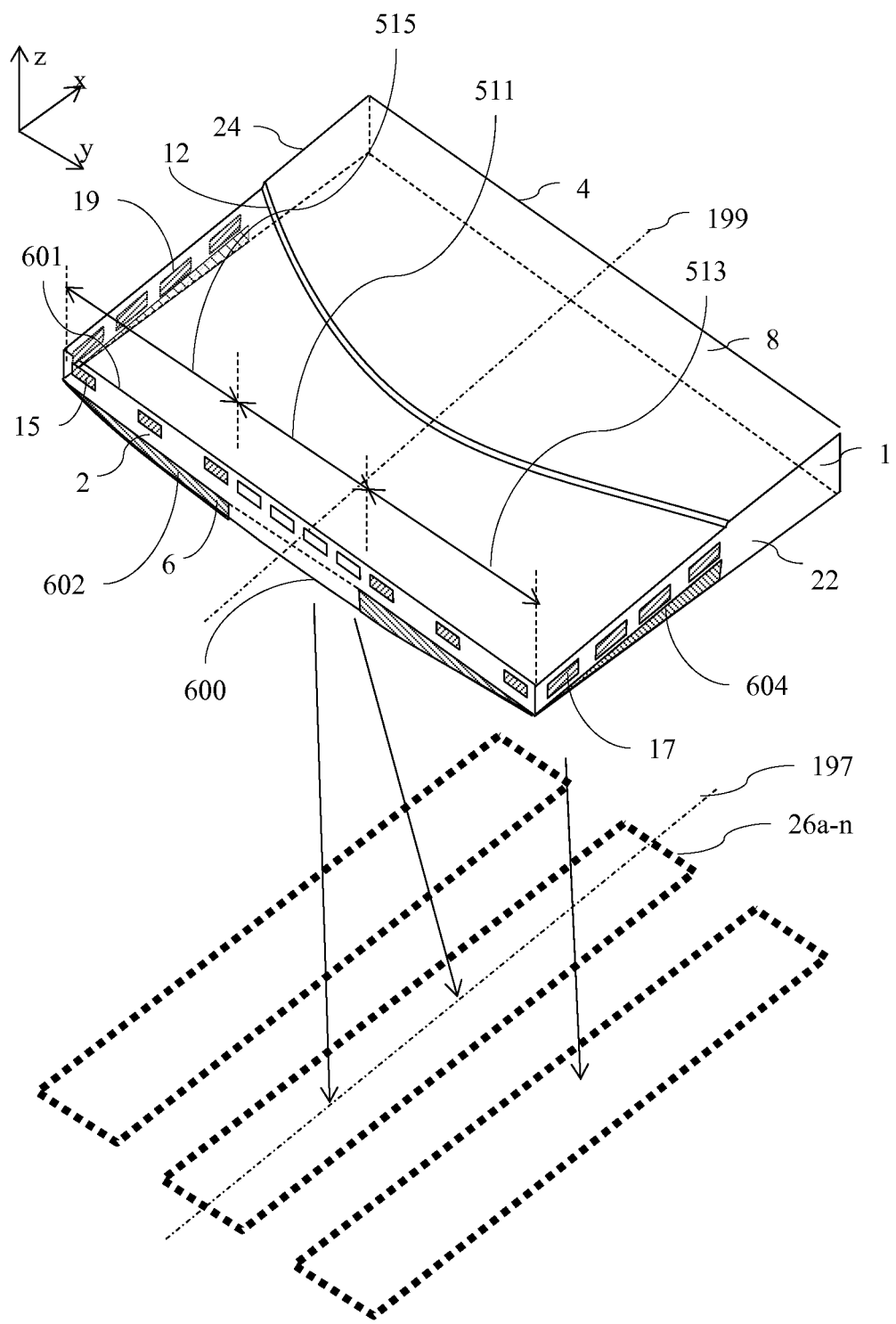
FIG. 48 is a schematic diagram illustrating in perspective view an optical valve similar with masking layers arranged to reduce reflections from certain regions of the input side, in accordance with the present disclosure.

FIG. 48 is a schematic diagram illustrating in perspective view an optical valve with input side masking layers arranged to reduce reflections from certain regions of the input side. Such an arrangement is further generally described in U.S. Patent Provisional Application No. 62/167,185, entitled "Wide angle imaging directional backlights," filed May 27, 2015, which is herein incorporated by reference in its entirety. A non-rectangular input side 2 shape is provided to achieve improved uniformity of the primary image for optical window positions near the optical axis 197. Thus edge 600 between output side 6 and input side 2 may be non-linear, as may side 601 between faceted side 8 and input side 2. Such an aperture shape can also advantageously be used to reduce reflected stray light. Light source arrays 15, 17, 19 may be arranged with substantially constant emitting aperture height. In a central region 511 the side 2 may be transmissive or reflective to increase luminance of reflected light in the primary optical window. In outer regions 513, 515 and side regions absorptive masks 602, 604 may be arranged to absorb light that is not incident on the light source arrays 15, 17, 19. Thus stray light that forms stray optical windows after reflection from the input side 2 can be recirculated for the primary optical window and reduced for the regions of the secondary optical windows. Advantageously privacy performance may be enhanced for off-axis observers.

FIGS. 49-52 is a schematic diagram illustrating in front views the input side of an optical valve similar to that shown in FIG. 47 arranged to achieve reduced stray light in privacy viewing directions.

Figure 49:
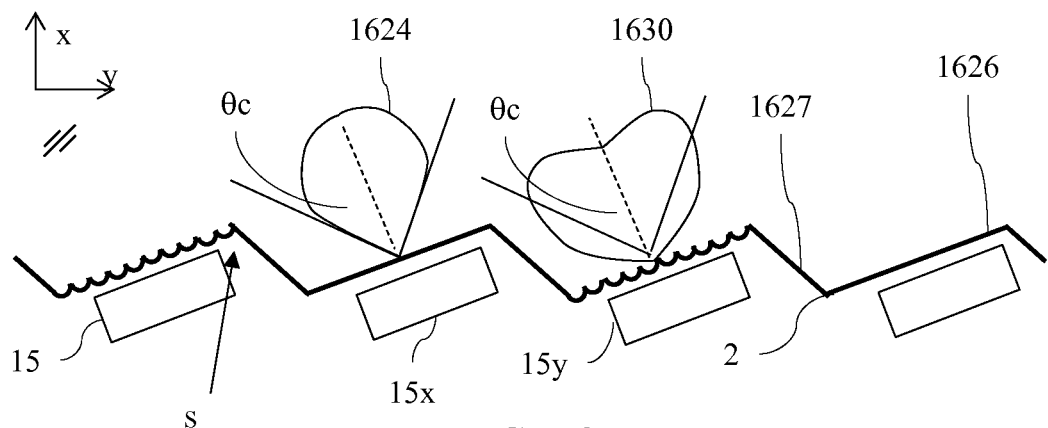
FIGS. 49-52 is a schematic diagram illustrating in front views the input side of an optical valve similar to that shown in FIG. 47 arranged to achieve reduced stray light in privacy viewing directions, in accordance with the present disclosure.

FIG. 49 illustrates that the input side may further comprise inclined input facets 1626 and draft regions 1627 may be provided with either planar with polar light distribution profiles 1624 inside the waveguide in the x-y plane limited by the critical angle or structured surfaces with polar profiles 1630 that may be greater than the critical angle. The planar and structured surfaces may be aligned with respective addressable light sources 15*x* and 15*y*. The angular profiles in a particular direction may be controlled by the surface profile. Thus for optical windows 26 in a particular angular direction, the amount or light directed may comprise a mixture of cones 1624 and 1630, providing tuning of actual light distribution in said direction. The axis of said direction may be determined by the slope 325 of the planar or structured surface.

Figure 50:
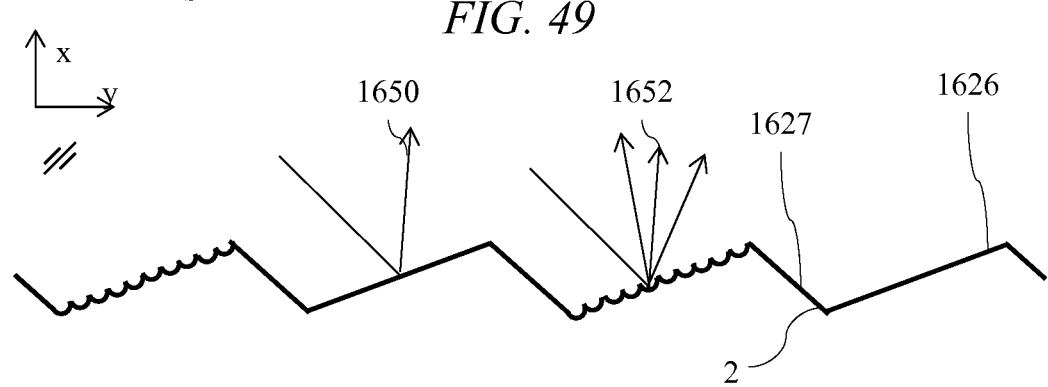

FIG. 50 illustrates the reflection of stray light from the input side 2 with light rays 1650 from planar surfaces and rays 1652 from the structured surfaces. The spatial luminance distribution of the stray light optical windows as illustrated in FIGS. 41-42 may be modified by design of the facet structure of the input surfaces 1626, 1627.

Figure 51:
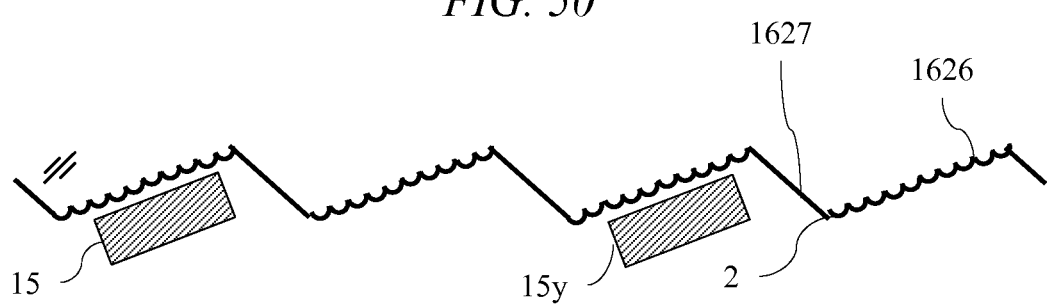
Figure 52:
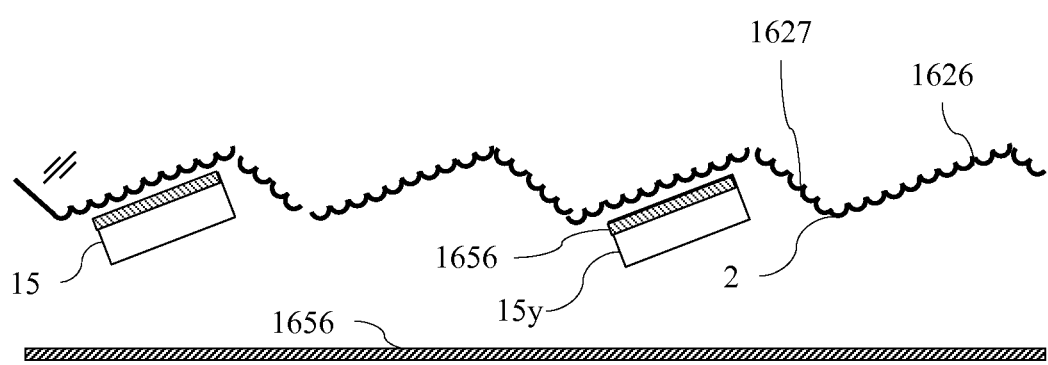

FIG. 51 illustrates that reflection from light source packages 15*x*, 15*y* can be reduced by reducing the number of light source packages and by optionally incorporating black package material for light sources in regions 513, 515 of the input and for light source arrays 17, 19. FIG. 52 shows that additional light shielding materials 1658, structured facets 1627 and absorbing layers 1656 may be incorporated to further reduce stray light reflection from the input side. The structured and planar surfaces may comprise microstructured surfaces that incorporate surface relief anti reflection structures with sub wavelength pitch, such as moth eye surfaces to further reduce reflection.

Advantageously the input surface and light source arrays may be modified to provide efficient illumination of the primary optical window and reduced visibility of stray light for privacy viewing positions.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A directional display apparatus comprising:
   a directional backlight comprising
   a waveguide comprising first and second, opposed guide surfaces for guiding input light along the waveguide, and
   an array of light sources arranged to generate the input light at different input positions across the waveguide,
   wherein the first guide surface is arranged to guide light by total internal reflection, the second guide surface comprises a plurality of light extraction features arranged to deflect light guided through the waveguide out of the waveguide through the first guide surface as output light and intermediate regions between the light extraction features that are arranged to guide light along the waveguide, and the waveguide is arranged to direct the output light into optical windows in output directions that are distributed in a lateral direction in dependence on the input position of the input light;
   a transmissive spatial light modulator arranged to receive the output light from the first guide surface of the waveguide and to modulate it to display an image; and
   a control system capable of controlling the spatial light modulator and capable of selectively operating of light sources to direct light into corresponding optical windows, wherein stray light in the directional backlight is directed in output directions outside the optical windows corresponding to selectively operated light sources,
   the control system is arranged to control the spatial light modulator and the array of light sources in synchronization with each other so that:
   (a) the spatial light modulator displays a primary image while at least one primary light source is selectively operated to direct light into at least one primary optical window for viewing by a primary observer, and
   (b) in a temporally multiplexed manner with the display of the primary image, the spatial light modulator displays a secondary image while at least one light source other than the at least one primary light source is selectively operated to direct light into secondary optical windows outside the at least one primary optical window, the secondary image as perceived by a secondary observer outside the primary optical window obscuring the primary image that modulates the stray light directed outside the primary optical window,
   wherein the secondary image comprises an inverted copy of the primary image arranged to at least partly cancel the primary image that modulates the stray light directed outside the primary optical window, as perceived by the primary observer.

2. A directional display apparatus according to claim 1, wherein said at least one light source other than the at least one primary light source that is selectively operated to direct light into secondary optical windows outside the at least one primary optical window comprises plural light sources other than the at least one primary light source.

3. A directional display apparatus according to claim 2, wherein said plural light sources other than the at least one primary light source are selectively operated to output light with differing luminous flux.

4. A directional display apparatus according to claim 2, wherein the secondary image comprises the inverted copy of the primary image superimposed by a disruptive pattern.

5. A directional display apparatus according to claim 1, wherein the control system is arranged to control the spatial light modulator and the array of light sources in synchronization with each other so that:
   (a) while the spatial light modulator displays the primary image, at least one additional light source in addition to the at least one primary light source is selectively operated to direct light into an additional optical window, and
   (b) while the spatial light modulator displays the secondary image, the plural light sources include the at least one additional light source and other light sources, the additional light source being operated to output light with higher luminous flux than the other light sources.

6. A directional display apparatus according to claim 1, wherein the at least one additional light source changes in different temporal phases of operation.

7. A directional display apparatus according to claim 1, wherein the control system is arranged to control the spatial light modulator and the array of light sources so that the secondary image has the same luminance as the primary image that modulates the stray light directed outside the primary optical window.

8. A directional display apparatus according to claim 1, wherein the inverted copy of the primary image comprises a copy of the primary image inverted by an inversion function that varies spatially across the image.

9. A directional display apparatus according to claim 8, wherein the inversion function varies spatially across the image in correspondence with a spatial variation of the luminance of the optical windows.

10. A directional display apparatus according to claim 1, wherein the secondary image comprises a disruptive pattern.

11. A directional display apparatus according to claim 10, wherein the primary image comprises an image for display to the primary observer superimposed by an inverted copy of the disruptive pattern arranged to at least partly cancel the disruptive pattern that modulates the stray light directed outside the secondary optical window, as perceived by the primary observer.

12. A directional display apparatus according to claim 1, wherein the control system is arranged to control the spatial light modulator and the array of light sources in synchronization with each other so that the spatial light modulator displays a primary image and the secondary image in a temporally multiplexed manner in time slots of unequal length.

13. A directional display apparatus according to claim 1, wherein the spatial light modulator comprises an array of pixels and the control system is arranged to control the spatial light modulator to control the drive level of each pixel during the temporally multiplexed display of the primary and secondary images taking into account the desired grey level of the pixel and the expected hysteresis of the pixel.

14. A directional display apparatus according to claim 1, wherein the primary image is a two dimensional image.

15. A directional display apparatus according to claim 1, wherein the primary image is a three dimensional image comprising a left eye image and a right eye image, and the control system is arranged to control the spatial light modulator to display the primary image by (a1) controlling the spatial light modulator to display the left eye image and the right eye image in a temporally multiplexed manner, and (a2) in synchronization with the control of the spatial light modulator, controlling the array of light sources to selectively operate different primary light sources to direct light into at least one primary optical window for viewing by the left and right eyes of the primary observer, when the spatial light modulator displays the left eye image and the right eye image, respectively.

16. A directional display apparatus according to claim 15, wherein the secondary image is a two dimensional image.

17. A directional display apparatus according to claim 1, wherein the second guide surface has a stepped shape comprising facets, that are said light extraction features, and the intermediate regions.

18. A directional display apparatus according to claim 17, wherein the directional backlight further comprises a rear reflector comprising a linear array of reflective facets arranged to reflect light from the light sources that is transmitted through the plurality of facets of the waveguide, back through the waveguide to exit through the first guide surface into said optical windows.

19. A directional display apparatus according to claim 1, wherein the light extraction features have positive optical power in the lateral direction.

20. A directional display apparatus according to claim 1, wherein the waveguide further comprises an input end, the array of light sources being arranged along the input end.

21. A directional display apparatus according to claim 1, wherein the waveguide further comprises a reflective end for reflecting input light back through the waveguide, the second guide surface being arranged to deflect light as output light through the first guide surface after reflection from the reflective end.

22. A directional display apparatus according to claim 21, wherein the reflective end has positive optical power in the lateral direction.

23. A directional display apparatus according to claim 1, wherein the waveguide further comprises a reflective end that is elongated in a lateral direction, the first and second guide surfaces extending from laterally extending edges of the reflective end, the waveguide further comprising side surfaces extending between the first and second guide surfaces, and
wherein the light sources include an array of light sources arranged along a side surface to provide said input light through that side surface, and the reflective end comprises first and second facets alternating with each other in the lateral direction, the first facets being reflective and forming reflective facets of a Fresnel reflector having positive optical power in the lateral direction, the second facets forming draft facets of the Fresnel reflector, the Fresnel reflector having an optical axis that is inclined towards the side surface in a direction in which the Fresnel reflector deflects input light from the array of light sources into the waveguide.

24. A directional display apparatus according to claim 1, further comprising a sensor system arranged to detect the position of the head of the primary observer, the control system being arranged to control the light sources in accordance with the detected position of the head of the observer.

25. A directional display apparatus according to claim 24, wherein
the sensor system is arranged to detect a secondary observer outside the primary optical window, and
the control system is arranged, in response to detecting the secondary observer, to perform said control of the spatial light modulator and the array of light sources in synchronization with each other so that the spatial light modulator displays the primary image and the secondary image in a temporally multiplexed manner, and, in response to not detecting the secondary observer, to control the spatial light modulator and the array of light sources so that the spatial light modulator displays the primary image while at least one primary light source is selectively operated to direct light into at least one primary optical window for viewing by a primary observer, without displaying the secondary image in a temporally multiplexed manner.

26. A method of obscuring a primary image that modulates stray light directed outside the primary optical window in a directional display apparatus comprising:
a directional backlight comprising
a waveguide comprising first and second, opposed guide surfaces for guiding input light along the waveguide, and
an array of light sources arranged to generate the input light at different input positions across the waveguide, wherein the first guide surface is arranged to guide light by total internal reflection, the second guide surface comprises a plurality of light extraction features arranged to deflect light guided through the waveguide out of the waveguide through the first guide surface as output light and intermediate regions between the light extraction features that are arranged to guide light along the waveguide, and the waveguide is arranged to direct the output light into optical windows in output directions that are distributed in a lateral direction in dependence on the input position of the input light so that selectively operation of light sources causes light to be directed into corresponding optical windows, wherein stray light in the directional backlight is directed in output directions outside the optical windows corresponding to selectively operated light sources; and a transmissive spatial light modulator arranged to receive the output light from the first guide surface of the waveguide and to modulate it to display an image;

the method comprising controlling the spatial light modulator and the array of light sources in synchronization with each other so that:

(a) the spatial light modulator displays a primary image while at least one primary light source is selectively operated to direct light into at least one primary optical window for viewing by a primary observer, and (b) in a temporally multiplexed manner with the display of the primary image, the spatial light modulator displays a secondary image while at least one light source other than the at least one primary light source is selectively operated to direct light into secondary optical windows outside the at least one primary optical window, the secondary image as perceived by a secondary observer outside the primary optical window obscuring the primary image that modulates the stray light directed outside the primary optical window, wherein the secondary image comprises an inverted copy of the primary image arranged to at least partly cancel the primary image that modulates the stray light directed outside the primary optical window, as perceived by the primary observer.

* * * * *